US011757600B2

(12) United States Patent
Sharma et al.

(10) Patent No.: US 11,757,600 B2
(45) Date of Patent: Sep. 12, 2023

(54) MEASUREMENT WITHOUT GAPS FOR NARROW BANDWIDTH PART (BWP) HOPPING

(71) Applicant: QUALCOMM Incorporated, San Diego, CA (US)

(72) Inventors: Prashant Sharma, San Jose, CA (US); Changhwan Park, San Diego, CA (US); Iyab Issam Sakhnini, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 77 days.

(21) Appl. No.: 17/476,187

(22) Filed: Sep. 15, 2021

(65) Prior Publication Data
US 2023/0084448 A1    Mar. 16, 2023

(51) Int. Cl.
*H04B 1/00*        (2006.01)
*H04L 5/00*        (2006.01)
*H04B 1/7156*      (2011.01)
*H04W 72/23*       (2023.01)
*H04W 72/542*      (2023.01)

(52) U.S. Cl.
CPC ......... *H04L 5/0096* (2013.01); *H04B 1/7156* (2013.01); *H04W 72/23* (2023.01); *H04W 72/542* (2023.01); *H04B 2001/71563* (2013.01)

(58) Field of Classification Search
CPC . H04W 24/10; H04W 36/0088; H04W 48/10; H04L 5/0092; H04L 27/26; H04L 5/0078; H04B 17/309; H04B 17/24; H04B 7/18519
USPC .................................................. 375/133, 130
See application file for complete search history.

(56) References Cited

U.S. PATENT DOCUMENTS

| 2015/0043523 | A1* | 2/2015  | Luo ...................... H04B 1/713 |
|              |     |         |                             370/330 |
| 2020/0305168 | A1* | 9/2020  | Liou ..................... H04L 5/0053 |
| 2021/0297985 | A1  | 9/2021  | Liu |
| 2022/0022064 | A1* | 1/2022  | Raghavan ............. H04L 5/0048 |
| 2022/0022065 | A1* | 1/2022  | Wang ................... H04W 24/08 |
| 2022/0022147 | A1* | 1/2022  | Lei ..................... H04W 56/0015 |
| 2022/0046498 | A1* | 2/2022  | Cheng ................ H04B 7/18519 |
| 2022/0322308 | A1* | 10/2022 | He ....................... H04L 41/0896 |

(Continued)

*Primary Examiner* — Khai Tran
(74) *Attorney, Agent, or Firm* — Arun Swain

(57) ABSTRACT

This disclosure provides systems, methods and apparatus, including computer programs encoded on computer storage media, for measurement without gaps for narrow bandwidth part (BWP) hopping. A user equipment (UE) may measure one or more synchronization signal blocks (SSBs) while performing BWP hopping according to a hopping pattern. The UE may receive data and measure an SSB in a same frequency hop during a same measurement window without a gap. A base station (BS) may transmit a control message to the UE to configure an active BWP for the UE, a set of measurement windows, a hopping pattern, and a set of SSBs that occur within a set of frequency hops to support the measurement without gaps. The active BWP may be defined for measurement purposes to reduce ambiguity. The control (Continued)

message may support alignment of a measurement window with an active frequency hop to support measurement without gaps.

29 Claims, 19 Drawing Sheets

(56) References Cited

U.S. PATENT DOCUMENTS

2022/0329371 A1* 10/2022 Awoniyi-Oteri ............... H04W 52/0212

* cited by examiner

MEASUREMENT WITHOUT GAPS FOR NARROW BANDWIDTH PART (BWP) HOPPING

TECHNICAL FIELD

This disclosure relates to wireless communications, including measurement without gaps for narrow bandwidth part (BWP) hopping.

DESCRIPTION OF THE RELATED TECHNOLOGY

Wireless communications systems are widely deployed to provide various types of communication content such as voice, video, packet data, messaging, broadcast, and so on. These systems may be capable of supporting communication with multiple users by sharing the available system resources (for example, time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations (BSs) or one or more network access nodes, each simultaneously supporting communication for multiple communication devices, which may be otherwise known as user equipment (UE).

SUMMARY

The systems, methods and devices of this disclosure each have several innovative aspects, no single one of which is solely responsible for the desirable attributes disclosed herein.

One innovative aspect of the subject matter described in this disclosure can be implemented in a method for wireless communication at a user equipment (UE). The method may include receiving at least one control message indicating an active bandwidth part (BWP) for the UE, a set of multiple measurement windows, a hopping pattern associated with the active BWP, and a set of multiple synchronization signal blocks (SSBs) occurring within a set of multiple frequency hops of the hopping pattern, performing measurement on a first SSB of the set of multiple SSBs within a first frequency hop of the set of multiple frequency hops during a first measurement window of the set of multiple measurement windows, and transmitting a measurement report associated with the measurement of the first SSB.

Another innovative aspect of the subject matter described in this disclosure can be implemented in an apparatus for wireless communication at a UE. The apparatus may include a first interface, a second interface, and a processing system. The first interface may be configured to obtain at least one control message indicating an active BWP for the UE, a set of multiple measurement windows, a hopping pattern associated with the active BWP, and a set of multiple SSBs occurring within a set of multiple frequency hops of the hopping pattern. The processing system may be configured to perform measurement on a first SSB of the set of multiple SSBs within a first frequency hop of the set of multiple frequency hops during a first measurement window of the set of multiple measurement windows. The first interface or the second interface may be configured to transmit a measurement report associated with the measurement of the first SSB.

Another innovative aspect of the subject matter described in this disclosure can be implemented in an apparatus for wireless communication at a UE. The apparatus may include means for receiving at least one control message indicating an active BWP for the UE, a set of multiple measurement windows, a hopping pattern associated with the active BWP, and a set of multiple SSBs occurring within a set of multiple frequency hops of the hopping pattern, means for performing measurement on a first SSB of the set of multiple SSBs within a first frequency hop of the set of multiple frequency hops during a first measurement window of the set of multiple measurement windows, and means for transmitting a measurement report associated with the measurement of the first SSB.

Another innovative aspect of the subject matter described in this disclosure can be implemented in a non-transitory computer-readable medium storing code for wireless communication at a UE. The code may include instructions executable by a processor to receive at least one control message indicating an active BWP for the UE, a set of multiple measurement windows, a hopping pattern associated with the active BWP, and a set of multiple SSBs occurring within a set of multiple frequency hops of the hopping pattern, perform measurement on a first SSB of the set of multiple SSBs within a first frequency hop of the set of multiple frequency hops during a first measurement window of the set of multiple measurement windows, and transmit a measurement report associated with the measurement of the first SSB.

In some examples of the method, apparatuses, and non-transitory computer-readable medium described herein, receiving the at least one control message may include operations, features, means, or instructions for receiving the at least one control message indicating that the set of multiple frequency hops occur within a bandwidth of the active BWP.

In some examples of the method, apparatuses, and non-transitory computer-readable medium described herein, receiving the at least one control message may include operations, features, means, or instructions for receiving the at least one control message indicating that the active BWP includes the first frequency hop in which the first SSB may be scheduled.

In some examples of the method, apparatuses, and non-transitory computer-readable medium described herein, receiving the at least one control message may include operations, features, means, or instructions for receiving the at least one control message scheduling each SSB of the set of multiple SSBs within a different frequency hop of the hopping pattern that each occur within a respective measurement window of the set of multiple measurement windows.

In some examples of the method, apparatuses, and non-transitory computer-readable medium described herein, the at least one control message indicates a quasi-colocation (QCL) relationship between the set of multiple SSBs.

In some examples of the method, apparatuses, and non-transitory computer-readable medium described herein, each frequency hop of the hopping pattern may be aligned with a beginning boundary, or an ending boundary, or both of a respective measurement window of the set of multiple measurement windows.

Another innovative aspect of the subject matter described in this disclosure can be implemented in a method for wireless communication at a base station (BS). The method may include transmitting, to a UE at least one control message indicating an active BWP for the UE, a set of multiple measurement windows, a hopping pattern associated with the active BWP, and a set of multiple SSBs respectively occurring within a set of multiple frequency hops of the hopping pattern, transmitting, to the UE, a first SSB of the set of multiple SSBs within a first frequency hop of the set of multiple frequency hops during a first measurement window of the set of multiple measurement windows, and receiving, from the UE, a measurement report associated with the transmitting of the first SSB.

Another innovative aspect of the subject matter described in this disclosure can be implemented in an apparatus for wireless communication at a BS. The apparatus may include a first interface and a second interface. The first interface may be configured to output, to a UE at least one control message indicating an active BWP for the UE, a set of multiple measurement windows, a hopping pattern associated with the active BWP, and a set of multiple SSBs respectively occurring within a set of multiple frequency hops of the hopping pattern, and output, to the UE, a first SSB of the set of multiple SSBs within a first frequency hop of the set of multiple frequency hops during a first measurement window of the set of multiple measurement windows. The first interface or the second interface may be configured to obtain, from the UE, a measurement report associated with the transmitting of the first SSB.

Another innovative aspect of the subject matter described in this disclosure can be implemented in an apparatus for wireless communication at a BS. The apparatus may include means for transmitting, to a UE at least one control message indicating an BWP for the UE, a set of multiple measurement windows, a hopping pattern associated with the active BWP, and a set of multiple SSBs respectively occurring within a set of multiple frequency hops of the hopping pattern, means for transmitting, to the UE, a first SSB of the set of multiple SSBs within a first frequency hop of the set of multiple frequency hops during a first measurement window of the set of multiple measurement windows, and means for receiving, from the UE, a measurement report associated with the transmitting of the first SSB.

Another innovative aspect of the subject matter described in this disclosure can be implemented in a non-transitory computer-readable medium storing code for wireless communication at a BS. The code may include instructions executable by a processor to transmit, to a UE at least one control message indicating an active BWP for the UE, a set of multiple measurement windows, a hopping pattern associated with the active BWP, and a set of multiple SSBs respectively occurring within a set of multiple frequency hops of the hopping pattern, transmit, to the UE, a first SSB of the set of multiple SSBs within a first frequency hop of the set of multiple frequency hops during a first measurement window of the set of multiple measurement windows, and receive, from the UE, a measurement report associated with the transmitting of the first SSB.

In some examples of the method, apparatuses, and non-transitory computer-readable medium described herein, transmitting the at least one control message may include operations, features, means, or instructions for transmitting the at least one control message indicating that the set of multiple frequency hops occur within a bandwidth of the active BWP.

In some examples of the method, apparatuses, and non-transitory computer-readable medium described herein, transmitting the at least one control message may include operations, features, means, or instructions for transmitting the at least one control message indicating that the active BWP includes the first frequency hop in which the first SSB may be scheduled.

In some examples of the method, apparatuses, and non-transitory computer-readable medium described herein, transmitting the at least one control message may include operations, features, means, or instructions for transmitting the at least one control message scheduling each SSB of the set of multiple SSBs within a different frequency hop of the hopping pattern that each occur within a respective measurement window of the set of multiple measurement windows.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
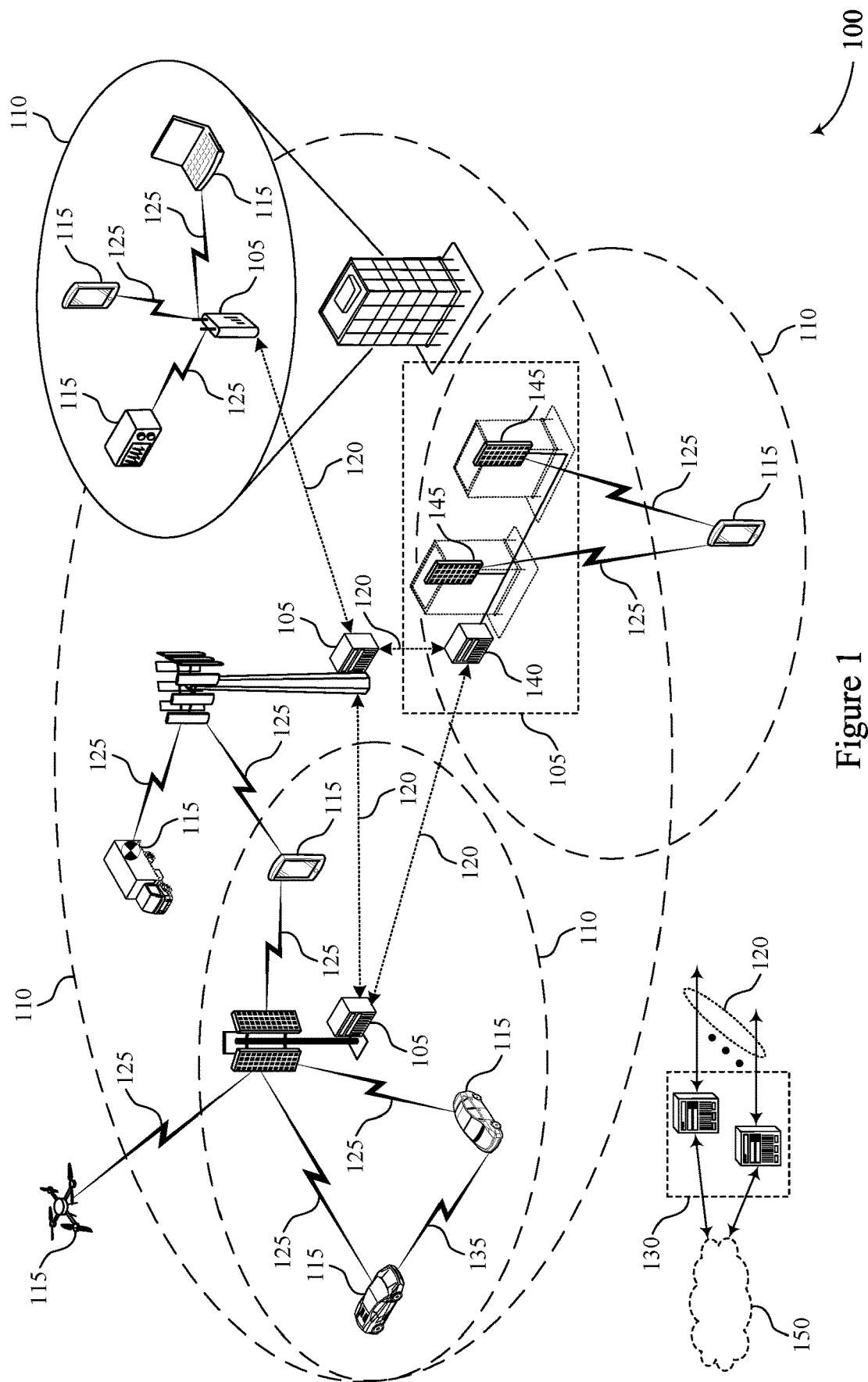
FIG. 1 illustrates an example of a wireless communications system that supports measurement without gaps for narrow bandwidth part (BWP) hopping.

The following description is directed to some implementations for the purposes of describing the innovative aspects of this disclosure. However, a person having ordinary skill in the art will readily recognize that the teachings herein can be applied in a multitude of different ways. The described implementations may be implemented in any device, system or network that is capable of transmitting and receiving radio frequency (RF) signals according to any of the Institute of Electrical and Electronics Engineers (IEEE) 16.11 standards, or any of the IEEE 802.11 standards, the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless, cellular or internet of things (IOT) network, such as a system utilizing 3G, 4G or 5G, or further implementations thereof, technology.

A wireless communications system may include communication devices, such as a network entity or a user equipment (UE) that may support multiple radio access technologies. Examples of radio access technologies include 4G systems such as LTE systems, and 5G systems which may be referred to as New Radio (NR) systems. In some implementations, a network entity as described herein may additionally, or alternatively, represent one or more components of a base station (BS) (for example, an eNodeB (eNB), a next generation NodeB or a giga NodeB, any of which may be referred to as a gNB), an access network entity, a backhaul network entity, a transmission/reception point (TRP), or as one or more components in a disaggregated random access network (RAN) (D-RAN) or Open RAN (O-RAN) architecture. In the wireless communications system, some UEs may be reduced capability UEs that may support one or more UE capability reduction features to promote power saving, such as a reduced bandwidth part (BWP). A UE that supports a reduced BWP may hop between one or more reduced BWPs (or narrow BWPs), which may be referred to as hops or frequency hops, according to a frequency hopping pattern for the UE.

In some implementations, the UE may receive data on a first frequency hop of the hopping pattern and the UE may switch from the first frequency hop to a second frequency hop such that the UE may measure a synchronization signal block (SSB) scheduled to occur within the second frequency hop during a measurement window. The UE may perform measurement on the SSB within the respective measurement window to identify a new cell to switch to on a same or different frequency. The UE may perform the switch between frequency hops during a gap period, which may be referred to as a switching delay period. The gap period may increase latency associated with wireless communication by the UE. In some other implementations, the measurement window may overlap with the first frequency hop and the second frequency hop. The UE may begin measuring the SSB within the first frequency hop and may switch to the second frequency hop during a gap period within the measurement window, which may interrupt the SSB measurement and reduce a reliability of the SSB measurement. Some UEs may not support techniques for aligning a frequency hop with a measurement window such that the respective UE may receive data and the SSB on a same frequency hop without a gap, which may be referred to as measurement without gaps herein. In some implementations, a UE may support measurement without gaps if the SSB is contained within an active BWP for the UE, but an active BWP for measurement purposes may be ambiguous for a UE that dynamically hops within a frequency domain.

Techniques, systems, and devices are described herein to support measurement without gaps for a UE that supports frequency hopping. The active BWP for measurement purposes may be defined as an aggregate of each non-overlapping frequency hop in a hopping pattern supported by the UE to reduce ambiguity. Alternatively, the active BWP for measurement purposes may be defined as a single frequency hop that is used by the UE at a time the measurement is scheduled, such as during a measurement window. One or more rules or configurations described herein may provide for alignment of a measurement window with an active frequency hop of the UE to support measurement without gaps.

In some implementations, the UE may be configured to support a hopping pattern, and a BS or other network entity may schedule a separate SSB for each measurement window such that each SSB occurs within an active frequency hop during the respective measurement window. A duration of each frequency hop of the hopping pattern for the UE may, in some implementations, be greater than a periodicity of one or more measurement windows, and the UE may measure two or more instances of an SSB within a same frequency hop during two or more respective measurement windows. Alternatively, the hopping pattern may be configured for the UE such that a same frequency hop occurs within each measurement window, or the UE may support a pseudo random hopping pattern or a random hopping pattern that includes a same frequency hop in each measurement window. In such implementations, the UE may measure an SSB in the same frequency hop in each measurement window. The UE may be configured to extend, shift, skip, or reduce a duration of one or more frequency hops in a frequency hopping pattern to align with or include a scheduled SSB and a corresponding measurement window. The described techniques may thereby provide for the UE to receive and measure an SSB during a frequency hop without switching between frequency hops during the measurement.

Particular implementations of the subject matter described in this disclosure can be implemented to realize one or more of the following potential advantages. For example, defining an active BWP for measurement purposes may reduce ambiguity and improve SSB-based measurements. The UE may perform frequency hopping in accordance with the active BWP. By aligning one or more frequency hops within the active BWP for the UE with a respective measurement window, the UE may support measurement without gaps. That is, the UE may receive data and perform measurement of an SSB in a same frequency hop, which may reduce latency and improve reliability of the measurements. The UE, a BS, or both may additionally, or alternatively, adjust or shift a duration of one or more hops within the hopping pattern to align with a measurement window. By adjusting or shifting the one or more hops, the UE and the BS may support improved communication reliability and efficiency.

FIG. 1 illustrates an example of a wireless communications system 100 that supports measurement without gaps for narrow BWP hopping. The wireless communications system 100 may include one or more BSs 105, one or more UEs 115, and a core network 130. In some implementations, the wireless communications system 100 may be a Long Term Evolution (LTE) network, an LTE-Advanced (LTE-A) network, an LTE-A Pro network, or a New Radio (NR) network. In some implementations, the wireless communications system 100 may support enhanced broadband communications, ultra-reliable (for example, mission critical)

communications, low latency communications, communications with low-cost and low-complexity devices, or any combination thereof.

The BSs 105 may be dispersed throughout a geographic area to form the wireless communications system 100 and may be devices in different forms or having different capabilities. The BSs 105 and the UEs 115 may wirelessly communicate via one or more communication links 125. Each BS 105 may provide a coverage area 110 over which the UEs 115 and the BS 105 may establish one or more communication links 125. The coverage area 110 may be an example of a geographic area over which a BS 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the BSs 105, or network equipment (for example, core network nodes, relay devices, integrated access and backhaul (IAB) nodes, or other network equipment), as shown in FIG. 1.

The BSs 105 may communicate with the core network 130, or with one another, or both. For example, the BSs 105 may interface with the core network 130 through one or more backhaul links 120 (for example, via an S1, N2, N3, or another interface). The BSs 105 may communicate with one another over the backhaul links 120 (for example, via an X2, Xn, or another interface) either directly (for example, directly between BSs 105), or indirectly (for example, via core network 130), or both. In some implementations, the backhaul links 120 may be or include one or more wireless links.

One or more of the BSs 105 described herein may include or may be referred to by a person having ordinary skill in the art as a base transceiver station, a radio BS, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" also may be referred to as a unit, a station, a terminal, or a client, among other examples. A UE 115 also may include or may be referred to as a personal electronic device such as a cellular phone, a personal digital assistant (PDA), a tablet computer, a laptop computer, or a personal computer. In some implementations, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other implementations.

The UEs 115 described herein may be able to communicate with various types of devices, such as other UEs 115 that may sometimes act as relays as well as the BSs 105 and the network equipment including macro eNBs or gNBs, small cell eNBs or gNBs, or relay BSs, among other implementations, as shown in FIG. 1.

The UEs 115 and the BSs 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (for example, a BWP) that is operated according to one or more physical layer channels for a given radio access technology (for example, LTE, LTE-A, LTE-A Pro, NR). Each physical layer channel may carry acquisition signaling (for example, synchronization signals, system information), control signaling that coordinates operation for the carrier, user data, or other signaling. The wireless communications system 100 may support communication with a UE 115 using carrier aggregation (CA) or multi-carrier operation. A UE 115 may be configured with multiple downlink component carriers and one or more uplink component carriers according to a CA configuration. CA may be used with both frequency division duplexing (FDD) and time division duplexing (TDD) component carriers.

In some implementations (for example, in a CA configuration), a carrier also may have acquisition signaling or control signaling that coordinates operations for other carriers. A carrier may be associated with a frequency channel (for example, an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (for example, of the same or a different radio access technology).

The communication links 125 shown in the wireless communications system 100 may include uplink transmissions from a UE 115 to a BS 105, or downlink transmissions from a BS 105 to a UE 115. Carriers may carry downlink or uplink communications (for example, in an FDD mode) or may be configured to carry downlink and uplink communications (for example, in a TDD mode).

A carrier may be associated with a particular bandwidth of the radio frequency spectrum, and in some implementations the carrier bandwidth may be referred to as a "system bandwidth" of the carrier or the wireless communications system 100. For example, the carrier bandwidth may be one of a number of determined bandwidths for carriers of a particular radio access technology (for example, 1.4, 3, 5, 10, 15, 20, 40, or 80 megahertz (MHz)). Devices of the wireless communications system 100 (for example, the BSs 105, the UEs 115, or both) may have hardware configurations that support communications over a particular carrier bandwidth or may be configurable to support communications over one of a set of carrier bandwidths. In some implementations, the wireless communications system 100 may include BSs 105 or UEs 115 that support simultaneous communications via carriers associated with multiple carrier bandwidths. In some implementations, each served UE 115 may be configured for operating over portions (for example, a sub-band, a BWP) or all of a carrier bandwidth.

Signal waveforms transmitted over a carrier may be made up of multiple subcarriers (for example, using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (for example, a duration of one modulation symbol) and one subcarrier, where the symbol period and subcarrier spacing are inversely related. The quantity of bits carried by each resource element may depend on the modulation scheme (for example, the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (for example, spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some implementations, a UE 115 may be configured with multiple BWPs. In some implementations, a single BWP for a carrier may be active at a given time and communications for the UE 115 may be restricted to one or more active BWPs.

The time intervals for the BSs 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (for example, 10 milliseconds (ms)). Each radio frame may be identified by a system frame number (SFN) (for example, ranging from 0 to 1023).

Each frame may include multiple consecutively numbered subframes or slots, and each subframe or slot may have the same duration. In some implementations, a frame may be divided (for example, in the time domain) into subframes, and each subframe may be further divided into a number of slots. Alternatively, each frame may include a variable number of slots, and the number of slots may depend on subcarrier spacing. Each slot may include a number of symbol periods (for example, depending on the length of the cyclic prefix prepended to each symbol period). In some wireless communications systems 100, a slot may further be divided into multiple mini-slots containing one or more symbols. Excluding the cyclic prefix, each symbol period may contain one or more (for example, $N_f$) sampling periods. The duration of a symbol period may depend on the subcarrier spacing or frequency band of operation.

A subframe, a slot, a mini-slot, or a symbol may be the smallest scheduling unit (for example, in the time domain) of the wireless communications system 100 and may be referred to as a transmission time interval (TTI). In some implementations, the TTI duration (for example, the number of symbol periods in a TTI) may be variable. Additionally, or alternatively, the smallest scheduling unit of the wireless communications system 100 may be dynamically selected (for example, in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (for example, a control resource set (CORESET)) for a physical control channel may be defined by a number of symbol periods and may extend across the system bandwidth or a subset of the system bandwidth of the carrier. One or more control regions (for example, CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (for example, control channel elements (CCEs)) associated with encoded information for a control information format having a given payload size. Search space sets may include common search space sets configured for sending control information to multiple UEs 115 and UE-specific search space sets for sending control information to a specific UE 115.

Each BS 105 may provide communication coverage via one or more cells, for example a macro cell, a small cell, a hot spot, or other types of cells, or any combination thereof. The term "cell" may refer to a logical communication entity used for communication with a BS 105 (for example, over a carrier) and may be associated with an identifier for distinguishing neighboring cells (for example, a physical cell identifier (PCID), a virtual cell identifier (VCID), or others). In some implementations, a cell also may refer to a geographic coverage area 110 or a portion of a geographic coverage area 110 (for example, a sector) over which the logical communication entity operates. Such cells may range from smaller areas (for example, a structure, a subset of structure) to larger areas depending on various factors such as the capabilities of the BS 105. For example, a cell may be or include a building, a subset of a building, or exterior spaces between or overlapping with geographic coverage areas 110, among other implementations.

A macro cell generally covers a relatively large geographic area (for example, several kilometers in radius) and may allow unrestricted access by the UEs 115 with service subscriptions with the network provider supporting the macro cell. A small cell may be associated with a lower-powered BS 105, as compared with a macro cell, and a small cell may operate in the same or different (for example, licensed, unlicensed) frequency bands as macro cells. Small cells may provide unrestricted access to the UEs 115 with service subscriptions with the network provider or may provide restricted access to the UEs 115 having an association with the small cell (for example, the UEs 115 in a closed subscriber group (CSG), the UEs 115 associated with users in a home or office). A BS 105 may support one or multiple cells and also may support communications over the one or more cells using one or multiple component carriers.

In some implementations, a carrier may support multiple cells, and different cells may be configured according to different protocol types (for example, MTC, narrowband IoT (NB-IoT), enhanced mobile broadband (eMBB)) that may provide access for different types of devices.

In some implementations, a BS 105 may be movable and therefore provide communication coverage for a moving geographic coverage area 110. In some implementations, different geographic coverage areas 110 associated with different technologies may overlap, but the different geographic coverage areas 110 may be supported by the same BS 105. In some other implementations, the overlapping geographic coverage areas 110 associated with different technologies may be supported by different BSs 105. The wireless communications system 100 may include, for example, a heterogeneous network in which different types of the BSs 105 provide coverage for various geographic coverage areas 110 using the same or different radio access technologies.

The wireless communications system 100 may support synchronous or asynchronous operation. For synchronous operation, the BSs 105 may have similar frame timings, and transmissions from different BSs 105 may be approximately aligned in time. For asynchronous operation, the BSs 105 may have different frame timings, and transmissions from different BSs 105 may, in some implementations, not be aligned in time. The techniques described herein may be used for either synchronous or asynchronous operations.

Some UEs 115, such as MTC or IoT devices, may be low cost or low complexity devices and may provide for automated communication between machines (for example, via Machine-to-Machine (M2M) communication). M2M communication or MTC may refer to data communication technologies that allow devices to communicate with one another or a BS 105 without human intervention. In some implementations, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (for example, a mode that supports one-way communication via transmission or reception, but not transmission and reception simultaneously). In some implementations, half-duplex communications may be performed at a reduced peak rate. Other power conservation techniques for the UEs 115 include entering a power saving deep sleep mode when not engaging in active communications, operating over a limited bandwidth (for example, according to narrowband communications), or a combination of these techniques. For example, some UEs 115 may be configured for operation using a narrowband protocol type that is associated with a defined portion or range (for example, set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (for example, mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some implementations, a UE 115 also may be able to communicate directly with other UEs 115 over a device-to-device (D2D) communication link 135 (for example, using a peer-to-peer (P2P) or D2D protocol). One or more UEs 115 utilizing D2D communications may be within the geographic coverage area 110 of a BS 105. Other UEs 115 in such a group may be outside the geographic coverage area 110 of a BS 105 or be otherwise unable to receive transmissions from a BS 105. In some implementations, groups of the UEs 115 communicating via D2D communications may utilize a one-to-many (1:M) system in which each UE 115 transmits to every other UE 115 in the group. In some implementations, a BS 105 facilitates the scheduling of resources for D2D communications. In some other implementations, D2D communications are carried out between the UEs 115 without the involvement of a BS 105.

In some implementations, the D2D communication link 135 may be an example of a communication channel, such as a sidelink communication channel, between vehicles (for example, UEs 115). In some implementations, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some implementations, vehicles in a V2X system may communicate with roadside infrastructure, such as roadside units, or with the network via one or more network nodes (for example, BSs 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (for example, a mobility management entity (MME), an access and mobility management function (AMF)) and at least one user plane entity that routes packets or interconnects to external networks (for example, a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the BSs 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a BS 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or TRPs. Each access network transmission entity 145 may include one or more antenna panels. In some configurations, various functions of each access network entity 140 or BS 105 may be distributed across various network devices (for example, radio heads and ANCs) or consolidated into a single network device (for example, a BS 105). In various implementations, a BS 105, or an access network entity 140, or a core network 130, or some subcomponent thereof, may be referred to as a network entity.

As described herein, a BS 105 may include components that are located at a single physical location or components located at various physical locations. In examples in which the BS 105 includes components that are located at various physical locations, the various components may each perform various functions such that, collectively, the various components achieve functionality that is similar to a BS 105 that is located at a single physical location. As such, a BS 105 described herein may equivalently refer to a standalone BS 105 or a BS 105 including components that are located at various physical locations. In some implementations, such a BS 105 including components that are located at various physical locations may be referred to as or may be associated with a D-RAN architecture, such as an O-RAN or Virtualized RAN (VRAN) architecture. In some implementations, such components of a BS 105 may include or refer to one or more of a central unit (CU), a distributed unit (DU), or a radio unit (RU).

The wireless communications system 100 may operate using one or more frequency bands, typically in the range of 300 MHz to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (for example, less than 100 kilometers) compared to transmission using the smaller frequencies and longer waves of the high frequency (HF) or very high frequency (VHF) portion of the spectrum below 300 MHz.

The wireless communications system 100 also may operate in a super high frequency (SHF) region using frequency bands from 3 GHz to 30 GHz, also known as the centimeter band, or in an extremely high frequency (EHF) region of the spectrum (for example, from 30 GHz to 300 GHz), also known as the millimeter band. In some implementations, the wireless communications system 100 may support millimeter wave (mmW) communications between the UEs 115 and the BSs 105, and EHF antennas of the respective devices may be smaller and more closely spaced than UHF antennas. In some implementations, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the BSs 105 and the UEs 115 may employ carrier sensing for collision detection and avoidance. In some implementations, operations in unlicensed bands may be associated with a CA configuration in conjunction with component carriers operating in a licensed band (for example, LAA). Operations in unlicensed spectrum may include downlink transmissions, uplink transmissions, P2P transmissions, or D2D transmissions, among other transmissions.

A BS 105 or a UE 115 may be equipped with multiple antennas, which may be used to employ techniques such as transmit diversity, receive diversity, multiple-input multiple-output (MIMO) communications, or beamforming. The antennas of a BS 105 or a UE 115 may be located within one or more antenna arrays or antenna panels, which may support MIMO operations or transmit or receive beamforming. For example, one or more BS antennas or antenna arrays may be co-located at an antenna assembly, such as an antenna tower. In some implementations, antennas or antenna arrays associated with a BS 105 may be located in diverse geographic locations. A BS 105 may have an antenna array with a number of rows and columns of antenna ports that the BS 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

The BSs 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (for example, the same codeword) or different data streams (for example, different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which also may be referred to as spatial filtering, directional transmission, or directional reception, is a signal processing technique that may be used at a transmitting device or a receiving device (for example, a BS 105, a UE 115) to shape or steer an antenna beam (for example, a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (for example, with respect to the antenna array of the transmitting device or receiving device, or with respect to some other orientation).

A BS 105 or a UE 115 may use beam sweeping techniques as part of beam forming operations. For example, a BS 105 may use multiple antennas or antenna arrays (for example, antenna panels) to conduct beamforming operations for directional communications with a UE 115. Some signals (for example, synchronization signals, reference signals, beam selection signals, or other control signals) may be transmitted by a BS 105 multiple times in different directions. For example, the BS 105 may transmit a signal according to different beamforming weight sets associated with different directions of transmission. Transmissions in different beam directions may be used to identify (for example, by a transmitting device, such as a BS 105, or by a receiving device, such as a UE 115) a beam direction for later transmission or reception by the BS 105.

Some signals, such as data signals associated with a particular receiving device, may be transmitted by a BS 105 in a single beam direction (for example, a direction associated with the receiving device, such as a UE 115). In some implementations, the beam direction associated with transmissions along a single beam direction may be selected, ascertained, or determined in accordance with a signal that was transmitted in one or more beam directions. For example, a UE 115 may receive one or more of the signals transmitted by the BS 105 in different directions and may report to the BS 105 an indication of the signal that the UE 115 received with a highest signal quality or an otherwise acceptable signal quality.

In some implementations, transmissions by a device (for example, by a BS 105 or a UE 115) may be performed using multiple beam directions, and the device may use a combination of digital precoding or radio frequency beamforming to generate a combined beam for transmission (for example, from a BS 105 to a UE 115). The UE 115 may report feedback that indicates precoding weights for one or more beam directions, and the feedback may correspond to a configured number of beams across a system bandwidth or one or more sub-bands. The BS 105 may transmit a reference signal (for example, a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (for example, a multi-panel type codebook, a linear combination type codebook, a port selection type codebook). Although these techniques are described with reference to signals transmitted in one or more directions by a BS 105, a UE 115 may employ similar techniques for transmitting signals multiple times in different directions (for example, for identifying a beam direction for subsequent transmission or reception by the UE 115) or for transmitting a signal in a single direction (for example, for transmitting data to a receiving device).

A receiving device (for example, a UE 115) may try multiple receive configurations (for example, directional listening) when receiving various signals from the BS 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (for example, different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some implementations, a receiving device may use a single receive configuration to receive along a single beam direction (for example, when receiving a data signal). The single receive configuration may be aligned in a beam direction selected, ascertained, or determined in accordance with listening according to different receive configuration directions (for example, a beam direction selected, ascertained, or determined to have a highest signal strength, highest signal-to-noise ratio (SNR), or otherwise acceptable signal quality in accordance with listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer also may use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a BS 105 or a core network 130 supporting radio bearers for user plane data. At the physical layer, transport channels may be mapped to physical channels.

The UEs 115 and the BSs 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (for example, using a cyclic redundancy check (CRC)), forward error correction (FEC), and retransmission (for example, automatic repeat request (ARQ)). HARQ may improve throughput at the MAC layer in poor radio conditions (for example, low signal-to-noise conditions). In some implementations, a device may support same-slot HARQ feedback, where the device may provide HARQ feedback in a specific slot for data received in a previous symbol in the slot. In some other implementations, the device may provide HARQ feedback in a subsequent slot, or according to some other time interval.

In some implementations, a UE 115 may perform frequency hopping. That is, the UE 115 may switch between one or more hops or reduced BWPs in a frequency domain. A UE 115 as described herein may perform measurement of an SSB within a single frequency hop during a respective measurement window without a gap. The UE 115 may receive at least one control message from a BS 105 indicating an active BWP for the UE 115, a set of measurement windows, a hopping pattern associated with the active BWP, and a set of SSBs occurring within a set of frequency hops of the hopping pattern. The UE 115 may receive the set of SSBs within the set of frequency hops in accordance with the control message. The UE 115 may perform measurement on at least a first SSB of the set of SSBs within a first measurement window of the set of measurement windows. The UE 115 may perform the measurement on the first SSB without a gap period. That is, the UE 115 may receive data and the first SSB within a same frequency hop and the UE may refrain from switching between frequency hops to perform the measurement on the first SSB. The UE 115 may transmit a measurement report associated with the measurement of the first SSB and one or more other SSBs of the set of SSBs to a BS 105 or some other network entity.

Figure 2:
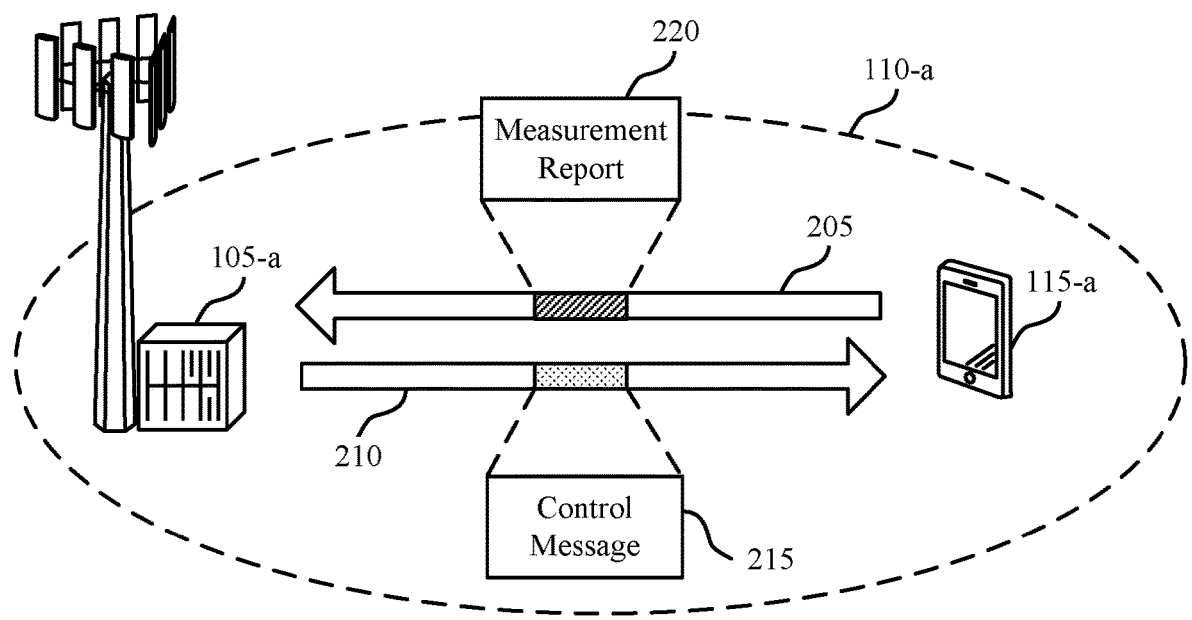
FIG. 2 illustrates an example of a signaling diagram that supports measurement without gaps for narrow BWP hopping.

FIG. 2 illustrates an example of a signaling diagram 200 that supports measurement without gaps for narrow BWP hopping. The signaling diagram 200 may implement or be implemented by aspects of the wireless communications system 100. For example, the signaling diagram 200 may include a BS 105-a and a UE 115-a (among other UEs 115). The UE 115-a may represent an example of a UE 115 as described herein, including with reference to FIG. 1. The BS 105-a may represent an example of a BS 105 as described herein, including with reference to FIG. 1. In various implementations, the BS 105-a may operate as a network entity. In some implementations, a BS 105 or a network entity as described herein may additionally, or alternatively, represent one or more components of a BS 105, an access network entity, a backhaul network entity, or a TRP, such as one or more components in a disaggregated RAN (D-RAN) or O-RAN architecture, including CUs, DUs, or RUs, or one or more radio heads or smart radio heads. For example, a network entity may be distributed across, or may represent, one or more network devices as described herein (for example, radio heads and ANCs), or a network entity may be consolidated into a single network device (for example, the BS 105-a). The BS 105-a may be a monolithic BS 105, or a disaggregated BS 105. Components of the disaggregated BS 105-a may include a CU, one or more DUs, and one or more RUs.

The BS 105-a and the UE 115-a may communicate with each other via an uplink communication link 205 and downlink communication link 210 in a geographic coverage area 110-a. In some implementations, the UE 115-a may perform one or more SSB measurements across one or more frequencies of a BWP used for communications between the UE 115-a and the BS 105-a.

The UE 115-a may, in some implementations, represent an example of a reduced capability UE 115 (a RedCap UE 115). The RedCap UE 115-a may support one or more UE complexity reduction features, such as a reduced bandwidth, to reduce power consumption by the UE 115-a. For example, the RedCap UE 115-a may support less than 100 MHz bandwidth for FR2 or less than 20 MHz for FR1, or some other reduced bandwidth during and after initial access. As another example, the RedCap UE 115-a may support wireless communication having a relatively low data rate that may be achieved using the smaller bandwidth, such as industrial internet of things (IIoT) applications or other communication associated with a reduced data rate. In some implementations, the UE 115-a may support an initial BWP that is relatively wide and the UE 115-a may switch to a narrower BWP for subsequent communications to reduce power consumption. Additionally, or alternatively, the UE 115-a may support an initial reduced BWP.

The UE 115-a configured to support a bandwidth reduction of the active BWP may, in some implementations, reduce narrowband interference effects and improve frequency diversity gains by supporting a reduced BWP frequency hopping operation. That is, the UE 115-a may hop across two or more reduced BWPs in a pre-configured manner, within and across the carrier bandwidth while performing wireless communication to improve diversity gain. The reduced BWPs also may be referred to as BWPs, narrow BWPs, or frequency hops. Reduced BWP hopping is described in further detail elsewhere herein, including with reference to FIG. 3.

The UE 115-a may hop across two or more frequency hops according to a reduced BWP hopping pattern for the UE 115-a, which may be referred to as a frequency hopping pattern or a hopping pattern. The hopping pattern may be signaled to the UE 115-a via control signaling or may be configured (defined or pre-configured) at the UE 115-a. The hopping pattern may indicate the number of frequency hops, a duration of each frequency hop in the hopping pattern, a periodicity associated with the frequency hops, or both. In some implementations, the frequency hop duration may be configured for the UE 115-a in accordance with one or more parameters, such as channel conditions of a channel between the UE 115-a and the BS 105-a. The frequency hop duration may be the same or different for each frequency hop within a hopping pattern or across different hopping patterns. In some implementations, the hop duration may be larger or smaller than the SSB-based measurement timing configuration (SMTC) duration. In an example, the hop duration may be configured based on the channel conditions and may be different within or across hopping patterns. In some implementations, time alignment of SMTCs with the hops may be defined when the SMTC duration is greater than a hop duration, such as when a single SMTC (partially or completely, or both) overlaps with two or more hops. In some other implementations, the SMTC duration may be less than equal to a hop duration, such as when a single SMTC (partially) overlaps with two hops.

The UE 115-a may perform measurement, such as reference signal received power (RSRP) measurement, reference signal received quality (RSRQ) measurement, signal-to-interference-plus-noise ratio (SINR) measurement, or any combination thereof, on one or more SSBs transmitted from the BS 105-a to the UE 115-a. In some implementations, the UE 115-a may perform the measurement to identify new inter-frequency or intra-frequency neighbor cells to switch to. The SSB measurements may be configured along with one or more SMTCs. An SMTC may indicate periodicity, offset, and duration information for a set of measurement windows in which the SSB-based measurements are to be performed. For example, the SMTC may indicate a set of measurement windows, which also may be referred to as SMTC windows, each having a duration of 5 milliseconds (ms) or less and associated with a periodicity of 5 ms, 10 ms, 20 ms, 40 ms, 80 ms, or 160 ms, or some other periodicity. In some implementations, the SMTC window duration may be any of SMTC window duration can be 1 ms, 2 ms, 3 ms, 4 ms, or 5 ms. The UE 115-a may perform measurement on an SSB within a respective measurement window in accordance with the SMTC. The SMTC duration may be greater than, less than, or the same as a frequency hop duration of a hopping pattern for the UE 115-a.

In some implementations, the UE 115-a may receive data on a first frequency hop of the hopping pattern and the UE 115-a may switch from the first frequency hop to a second frequency hop during a gap period to perform one or more measurements on an SSB within the second frequency hop during a configured measurement window. The gap period may degrade throughput and increase latency associated with wireless communication between the UE 115-a and the BS 105-a. Additionally, or alternatively, a measurement window may overlap with two or more frequency hops. In such implementations, an SSB to be measured and the corresponding measurement window may not be aligned with a frequency hop including an active BWP for the UE 115. As such, the UE 115-a may switch between frequency hops during the measurement window, which may interrupt measurement of the SSB and reduce an accuracy and reliability of the SSB measurement.

A UE 115 may, in some implementations, perform inter-frequency or intra-frequency measurements without a gap period for switching between hops if the SSB to be measured is within an active BWP of the UE 115. That is, if the UE 115 receives data and the SSB within the active BWP, the UE 115 may receive data and the SSB on a same frequency hop, which may be referred to as measurement without gaps herein. For example, a UE 115 may perform intra-frequency measurement without a gap if the UE 115 transmits signaling including an IE for intra-frequency measurement, such as the intraFreq-needForGap IE that indicates the UE 115 supports intra-frequency measurements without gaps, such as a no-gap indication via the IE. Additionally, or alternatively, a UE 115 may perform intra-frequency measurement without a gap if the SSB is contained within an active BWP of the UE 115 or the active BWP is an initial BWP. A UE 115 may perform inter-frequency measurement without a gap if the UE 115 indicates support for inter-frequency measurements without gaps and if the SSB is contained within the active BWP of the UE 115. The UE 115 may indicate support for inter-frequency measurements without gaps via an IE, such as the interFrequencyMeas-Nogap-r16IE, by setting an indication, such as the interFrequencyConfig-NoGap-r16 indication.

In some implementations, however, an active BWP for measurement purposes may be ambiguous for a UE 115 that supports frequency hopping. For example, a UE 115 that supports frequency hopping may dynamically switch between different BWPs during communications, such that a reduced BWP of the UE 115 may hop around in the frequency domain. In some such implementations, an active BWP for measurement purposes may not be defined or fixed for the UE 115. Some SSBs scheduled for measurements by the UE 115 may be within the active BWP during a first time instance, but not at other time instances, such that the UE 115 may not perform measurement without gaps.

Aspects of the described techniques may define an active BWP for measurement purposes to support measurement without gaps by a UE 115 that supports frequency hopping, such as the UE 115-a. The described techniques may additionally, or alternatively, provide for the BS 105-a and the UE 115-a to align a measurement window and an active frequency hop of the UE 115-a to improve SSB-based measurements. To support such techniques, the BS 105-a described herein may transmit at least one control message 215 to the UE 115-a via the downlink communication link 210 to indicate an active BWP for the UE 115-a, a set of measurement windows (such as an SMTC), a hopping pattern associated with the active BWP, and a set of SSBs occurring within a set of frequency hops of the hopping pattern. The control message 215 may schedule each SSB of the set of SSBs within a same or different frequency hop of the hopping pattern and during a respective measurement window of the set of measurement windows. Example configurations of SSBs and hopping patterns to support measurement without gaps are described in further detail elsewhere herein, including with reference to FIGS. 4-8.

The UE 115-a may perform measurement on at least a first SSB of the set of SSBs within a first frequency hop of the hopping pattern and during a first measurement window of the set of measurement windows in accordance with the control message 215. In some implementations, the UE 115-a, the BS 105-a, or both may be configured to extend, shrink, skip, or shift a duration of the first frequency hop and one or more other frequency hops of the hopping pattern to support alignment between the first frequency hop and the first measurement window. The UE 115-a may measure the first SSB without hopping during the measurement in accordance with the hop duration adjustment techniques. Example frequency hop duration adjustment configurations to align an active hop with a measurement window are described in further detail elsewhere herein, including with reference to FIGS. 9-14.

The UE 115-a may transmit a measurement report 220 to the BS 105-a via the uplink communication link 205. The measurement report 220 may be associated with the measurement on at least the first SSB. For example, the measurement report 220 may indicate a measured RSRP, RSRQ, SINR, or any combination thereof of the first SSB, one or more other SSBs measured by the UE 115-a, or both. In some implementations, the UE 115-a, the BS 105-a, or both may identify a new inter-frequency or intra-frequency neighbor cell to switch to in accordance with the measurement report 220.

In some implementations, the UE 115-a may transmit a UE capability report to the BS 105-a via the uplink communication link 205. The UE capability report may indicate support for a frequency hopping measurement configuration. The UE capability report may include a first IE, such as intraFreq-needForGap, to indicate support for intra-frequency measurements with or without a gap, a second IE, such as inter-FrequencyConfig-NoGap-r16, to indicate support for inter-frequency measurements without a gap, or both. If the UE 115-a supports intra-frequency measurements without a gap, a field, such as a no-gap field, in the first IE may be set to indicate that intra-frequency measurement without a gap is supported. The first and second IE may, in some implementations, include per-carrier information. As described herein, one or more fields or additional IEs may be defined in the UE capability report for the UE 115-a to indicate support for inter-frequency hopping without gaps, intra-frequency hopping without gaps, or both per reduced BWP of a set of reduced BWPs of a hopping pattern supported by the UE 115-a. Such per reduced BWP indications may improve coordination between devices and improve communication reliability.

The UE 115-a described herein may thereby be configured with an active BWP for measurement purposes and one or more procedures for aligning a frequency hop of a hopping pattern for the UE 115-a with a measurement window to support frequency hopping and measurement without gaps. The described techniques for measurement without gaps and alignment of a frequency hop with a measurement window in time may provide for improved communication reliability and reduced latency.

Figure 3:
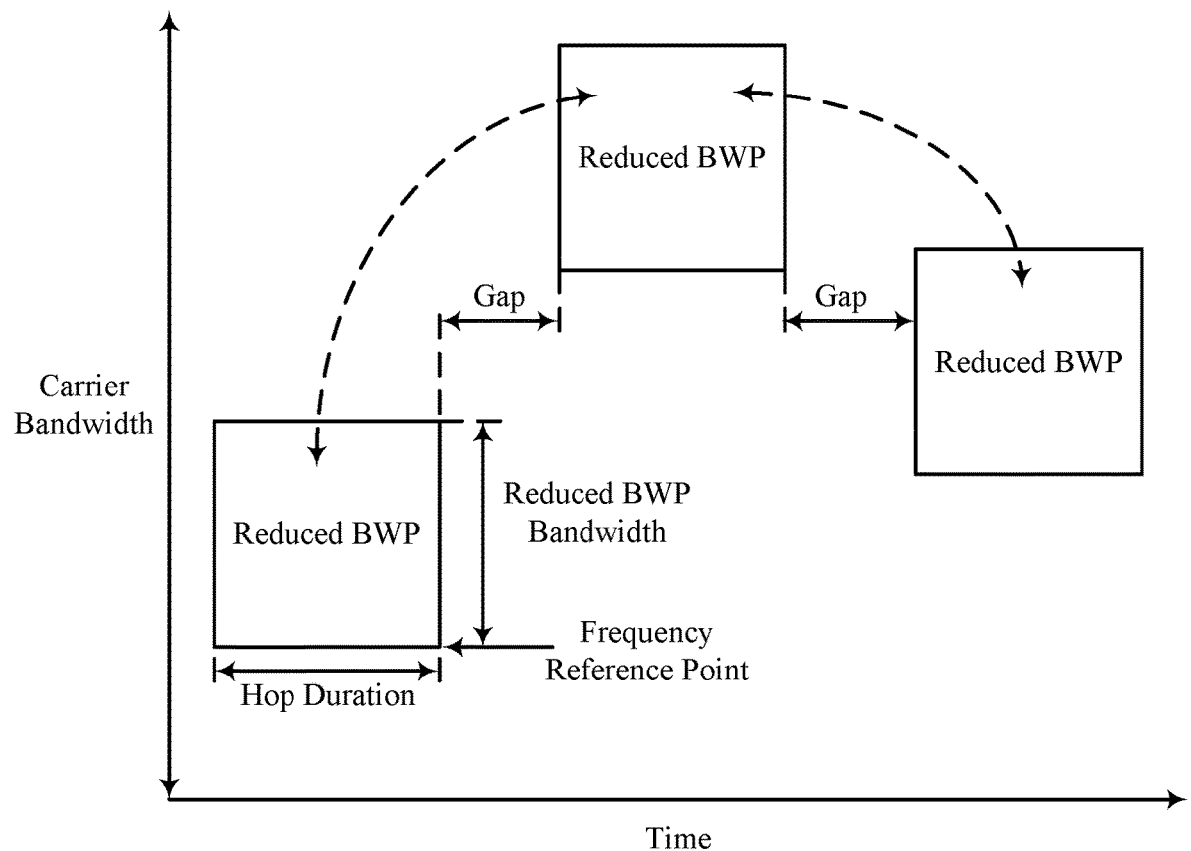
FIG. 3 illustrates an example of a reduced BWP hopping configuration that supports measurement without gaps for narrow BWP hopping.

FIG. 3 illustrates an example of a reduced BWP hopping configuration 300 that supports measurement without gaps for narrow BWP hopping. The reduced BWP hopping configuration 300 may implement or be implemented by aspects of the wireless communications system 100 or the signaling diagram 200. For example, the reduced BWP hopping configuration 300 illustrates an example configuration of reduced BWPs (also referred to as frequency hops) supported by a UE 115 for communications with a BS 105 or some other network entity. The UE 115 may represent an example of a UE 115 as described herein, including with reference to FIGS. 1 and 2. The BS 105 may represent an example of a BS 105 as described herein, including with reference to FIGS. 1 and 2.

The UE 115 may be a reduced capability (a RedCap) UE 115 that supports a reduced bandwidth, as described with reference to FIG. 2. The bandwidth of each reduced BWP may be less than the reduced bandwidth (less than a maximum bandwidth supported by the UE 115). The UE 115 may switch between the reduced BWPs to perform wireless communication. The UE 115 may thereby support a reduced bandwidth at a given time, and may switch between reduced BWPs across a carrier bandwidth, which may reduce power consumption by the UE 115 while improving frequency diversity gain. In some implementations, procedures for wireless communications, such as HARQ procedures, timers, grants, or the like, may be transparent to frequency hopping between the reduced BWPs.

The reduced BWPs illustrated in the reduced BWP hopping configuration 300 may be located at different frequencies in the carrier bandwidth. The UE 115 may remain in a first reduced BWP for a time period (a hop duration) before hopping to another set of frequency resources in another reduced BWP for a second time period. The UE 115 may continue to hop between reduced BWPs to improve frequency diversity gain. Each reduced BWP may include different time and frequency resources that may be relative to a reference point within the reduced BWP that may not change. For example, the frequency resources within a reduced BWP may be relative to a frequency reference point, such as a lowest frequency in the reduced BWP, or some other frequency reference point. The time resources within the reduced BWP may be relative to a time reference point, such as a starting time of the reduced BWP, or some other time reference point.

Each reduced BWP may be associated with a respective hop duration. In some implementations, the hop duration for each reduced BWP may be the same, or each reduced BWP may be associated with a different hop duration. The hop duration for a reduced BWP may, in some implementations, be configured, signaled to the UE 115, or selected by the UE 115 in accordance with one or more parameters, such as channel conditions associated with a channel between the UE 115 and the BS 105.

The UE 115 may switch between reduced BWPs according to one or more random, pseudo-random, or fixed hopping patterns. The UE 115 may perform hopping during a gap period. The gap may provide for the UE 115 to perform RF retuning to support the switch between frequencies. As described with reference to FIG. 2, the UE 115 may perform measurements of an SSB within one or more of the reduced BWPs. If an SSB for the UE 115 to measure is scheduled outside of a reduced BWP in which the UE 115 currently receives data, the UE 115 may switch to a second reduced BWP that includes the SSB to perform the measurement, which may result in a gap during the measurement, increased latency, or both.

Techniques described herein, including with reference to FIGS. 4-15, provide for the UE 115 and the BS 105 to support improved SSB-based inter-frequency and intra-frequency measurement without gaps. For example, an active BWP for the UE 115 may be defined for measurement purposes, such that the UE 115 may perform frequency hopping and SSB measurement without gaps. Additionally, one or more SSBs or a frequency hopping pattern for the UE 115 may be scheduled or configured such that a frequency hop is aligned with a measurement window for the UE 115 to perform an accurate measurement of a respective SSB without a gap, which may improve communication reliability.

Figure 4:
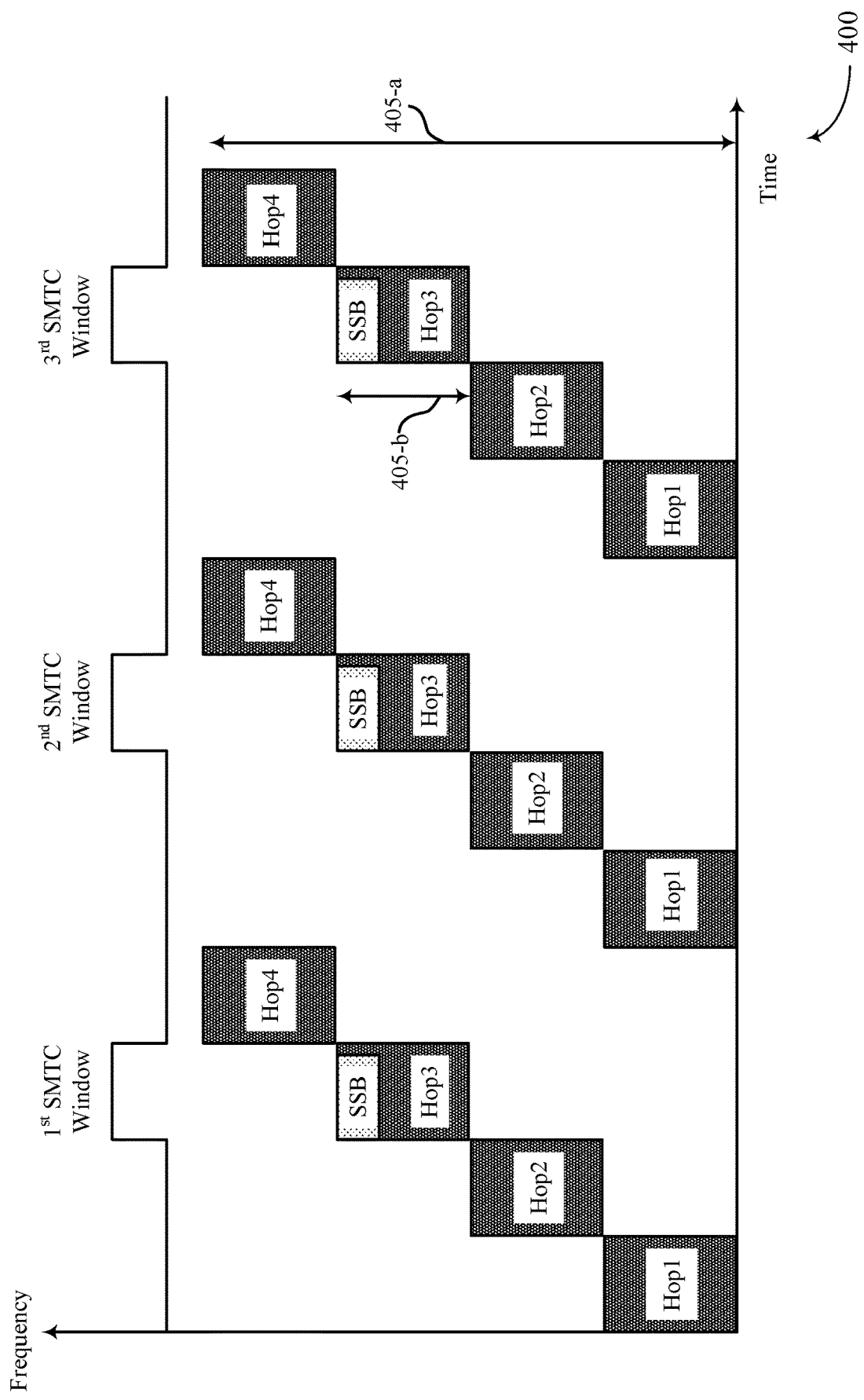
FIGS. 4-8 illustrate examples of frequency hopping timelines that support measurement without gaps for narrow BWP hopping.

FIG. 4 illustrates an example of a frequency hopping timeline 400 that supports measurement without gaps for narrow BWP hopping. The frequency hopping timeline 400 may implement or be implemented by aspects of the wireless communications system 100 or the signaling diagram 200. For example, the frequency hopping timeline 400 illustrates an example configuration of frequency hops, SSBs, and SMTC windows for communications between a BS 105 and a UE 115. The UE 115 may represent an example of a UE 115 as described herein, including with reference to FIGS. 1-3. The BS 105 may represent an example of a BS 105 as described herein, including with reference to FIGS. 1-3.

The UE 115 may hop between frequency hops (reduced BWP hops) according to a frequency hopping pattern for the UE 115, as described with reference to FIG. 2. The UE 115 may perform measurement of an SSB within a hop and during an SMTC window. If the SSB is within an active BWP 405, such as one of the active BWPs 405-*a* and 405-*b*, of the UE 115 during the SMTC window, the UE 115 may support measurement of the SSB without a gap, which may improve communications and reduce latency. In some implementations, however, the UE 115 may switch between frequency hops of the hopping pattern, which may result in ambiguity regarding an active BWP for the UE 115 for measurement purposes.

As described herein, to reduce ambiguity and improve communication, the active BWP 405-*a* or 405-*b* for measurement purposes may be defined as one of an aggregate of each non-overlapping hop in a hopping pattern being used by the UE 115 or a hop being used by the UE 115 at the time the measurement is scheduled during a respective SMTC window. In the example of FIG. 4, an active BWP 405 for the UE 115 may be defined as one of the active BWP 405-*a* or the active BWP 405-*b*.

The active BWP 405-*a* may include each non-overlapping frequency hop in the illustrated hopping pattern. The active BWP 405-*a* may be defined as an aggregate of each of the hop1, the hop2, the hop3, and the hop4. The active BWP 405-*a* may include frequency resources allocated for each hop of the hopping pattern, which may be a hopping pattern being used by the UE 115 at a time of the measurement. Although the UE 115 is illustrated measuring the SSB in the hop3 of the hopping pattern in each of the first, second, and third SMTC windows, it is to be understood that the UE 115 may measure the SSB within any hop of the hopping pattern, and the SSB may be measured within the active BWP 405-*a*. The UE 115 may thereby receive data in any hop of the hopping pattern and perform measurement of the SSB within any hop of the hopping pattern within the active BWP 405-*a* without a gap.

The active BWP 405-*b* may include a single hop (hop3) of the hopping pattern. The hop3 may be a reduced BWP hop being used by the UE 115 at a time the measurement is scheduled. That is, the UE 115 may hop to the hop3 during each of the first, second, and third SMTC windows. The UE 115 may measure the SSB within the hop3 during a respective measurement window. As such, the UE 115 may receive data in the active BWP 405-*b* and perform measurement of the SSB within the active BWP 405-*b* without a gap.

The active BWP 405-*a* or the active BWP 405-*b* for the UE 115 may thereby be defined to reduce ambiguity and improve communication reliability for frequency hopping. In some implementations, the UE 115, the BS 105, or both may configure or schedule the frequency hopping pattern, the SSB, or both, to support measurement without gaps in the active BWP 405-*a* or the active BWP 405-*b*. For example, the UE 115 may perform intelligent hopping, or the BS 105 may schedule an SSB within a hop that is aligned with an SMTC window, or both, such that the UE 115 may receive data in the hop and measure the SSB without a gap. Examples of intelligent frequency hopping and SSB configurations are described in further detail elsewhere herein, including with reference to FIGS. 5-8.

Figure 5:
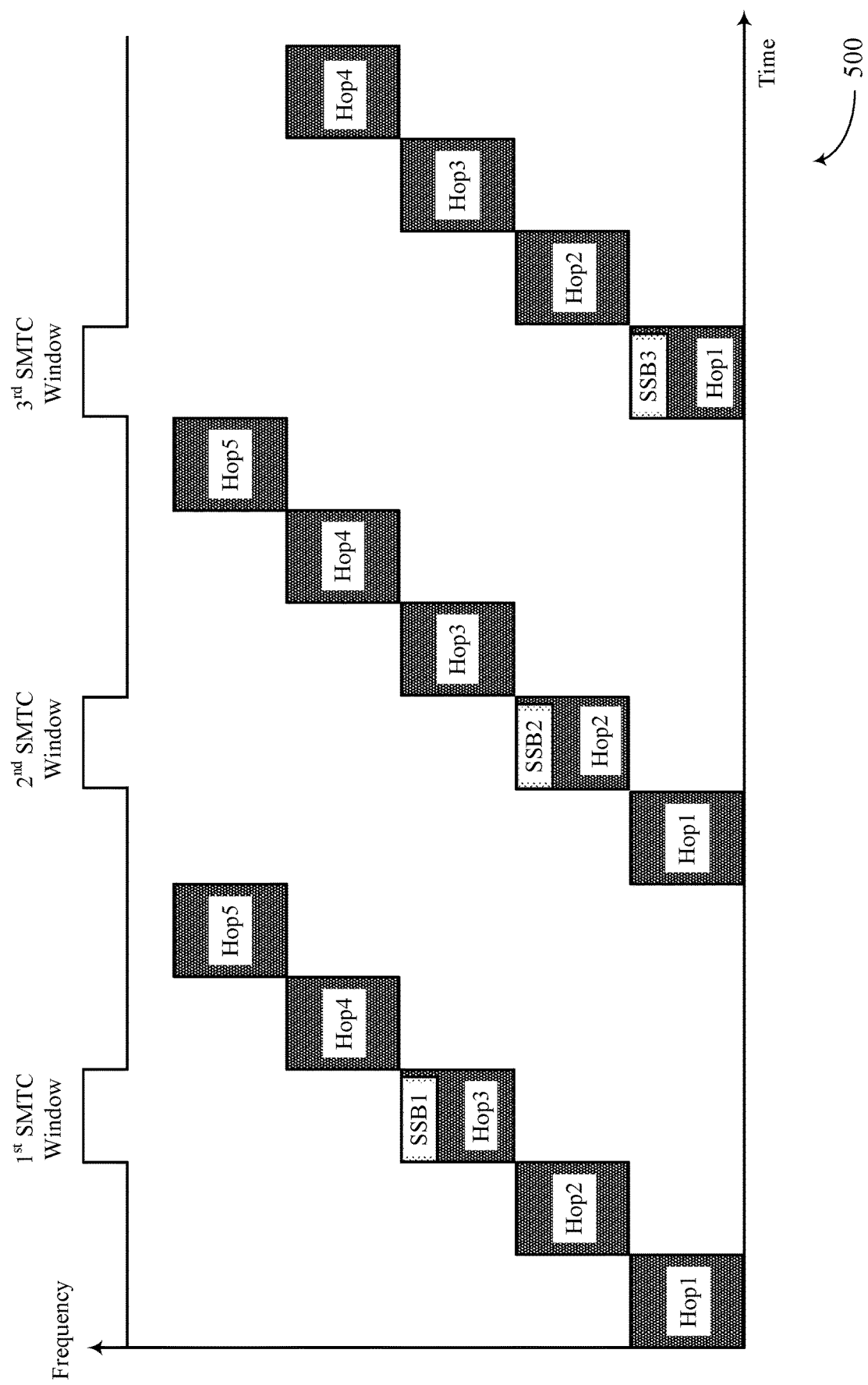

FIG. 5 illustrates an example of a frequency hopping timeline 500 that supports measurement without gaps for narrow BWP hopping. The frequency hopping timeline 500 may implement or be implemented by aspects of the wireless communications system 100 or the signaling diagram 200. For example, the frequency hopping timeline 500 illustrates an example configuration of frequency hops, SSBs, and SMTC windows for communications between a BS 105 and a UE 115. The UE 115 may represent an example of a UE 115 as described herein, including with reference to FIGS. 1-4. The BS 105 may represent an example of a BS 105 as described herein, including with reference to FIGS. 1-4.

The UE 115 may receive a control message from the BS 105 indicating an active BWP for the UE 115, an SMTC window duration, an SMTC periodicity, a hopping pattern associated with the active BWP, a set of SSBs scheduled to occur within one or more hops of the hopping pattern or any combination thereof, as described with reference to FIGS. 2-4. The active BWP may be defined as one of the active BWPs 405-*a* and 405-*b* described with reference to FIG. 4.

The UE 115 may be configured with a hopping pattern that indicates a periodicity of hops, a quantity of hops, a duration of each hop, or any combination thereof within the hopping pattern. The hopping pattern may be configured at the UE 115 or the UE 115 may receive signaling, such as the control message, that indicates the hopping pattern. The UE 115 may switch between the hop1, the hop2, the hop3, the hop4, and the hop5 in the pattern illustrated in FIG. 5 in accordance with the hopping pattern.

In the example of FIG. 5, to support measurement without gaps, the BS 105 may configure an SSB for measurement as a hopping SSB. That is, the BS 105 may schedule a separate SSB to occur during each SMTC window within an active hop of the hopping pattern during the respective SMTC window. For example, the BS 105 may schedule the SSB1 within the hop3 during the first SMTC window, the SSB2 within the hop2 during the second SMTC window, and the SSB3 within the hop1 during the third SMTC window. The UE 115 may measure the respective SSB and receive data in each of the hop1, the hop2, and the hop3 simultaneously or without a gap in accordance with the SSB configuration. The hop1, the hop2, and the hop3 may be active hops for the UE 115 during the first SMTC window, the second SMTC window, and the third SMTC window, respectively due to the UE 115 being scheduled to receive data within each hop during the respective SMTC window. Alternatively, the active BWP for the UE 115 may be defined as an aggregate of each hop in the hopping pattern, and the hop1, the hop2, and the hop3 may each be within the active BWP accordingly.

The BS 105 may dynamically schedule the SSBs in accordance with the hopping pattern. In some implementations, the hopping pattern may be fixed for the UE 115 (a periodic hopping pattern), and the BS 105 may schedule the set of SSBs in a corresponding fixed pattern. The BS 105 may schedule the fixed SSB pattern in accordance with a periodicity of the fixed hopping pattern or a location of each hop in the fixed hopping pattern and the SMTC periodicity. The SSB pattern may be configured using a direct mapping between SSBs and hops, or the SSB pattern may be configured using a quasi-colocation (QCL) relationship.

One or more other UEs 115 may be configured with the same hopping pattern as the UE 115 or a different hopping pattern than the UE 115. If the UEs 115 share a hopping pattern, the BS 105 may schedule a single SSB for the UE 115 and the one or more other UEs 115 within each SMTC window, which may result in increased overhead within the hops. If the UEs 115 are configured with different hopping patterns, the BS 105 may schedule more than one SSB in an interleaving fashion in each SMTC window to reduce crowding in a single reduced BWP hop. For example, the BS 105 may schedule the SSB1 in the hop3 and one or more other SSBs within the first SMTC window and at different frequencies that may be active hops for one or more other UEs 115. Scheduling interleaved SSBs may reduce overhead and interference associated with multiple UEs 115 utilizing a same reduced BWP for measurement.

The UE 115 may perform measurement of each SSB of the set of SSBs scheduled for the UE 115 and filter the measurements over multiple SSBs. The set of SSBs may correspond to a same or different hop index in the hopping pattern for the UE 115. In some implementations, each SSB may be transmitted using a different transmit power. If an SSB power difference is present across the set of SSBs, the BS 105 may broadcast an indication of the SSB power difference to the UE 115. The UE 115 may take the power difference into account when performing the filtering. The UE 115 may transmit a measurement report to the BS 105 in accordance with the measurements and the filtering.

The UE 115 may thereby measure a different SSB in different hops of a frequency hopping pattern during each SMTC window to improve communication reliability and support measurement without gaps.

Figure 6:
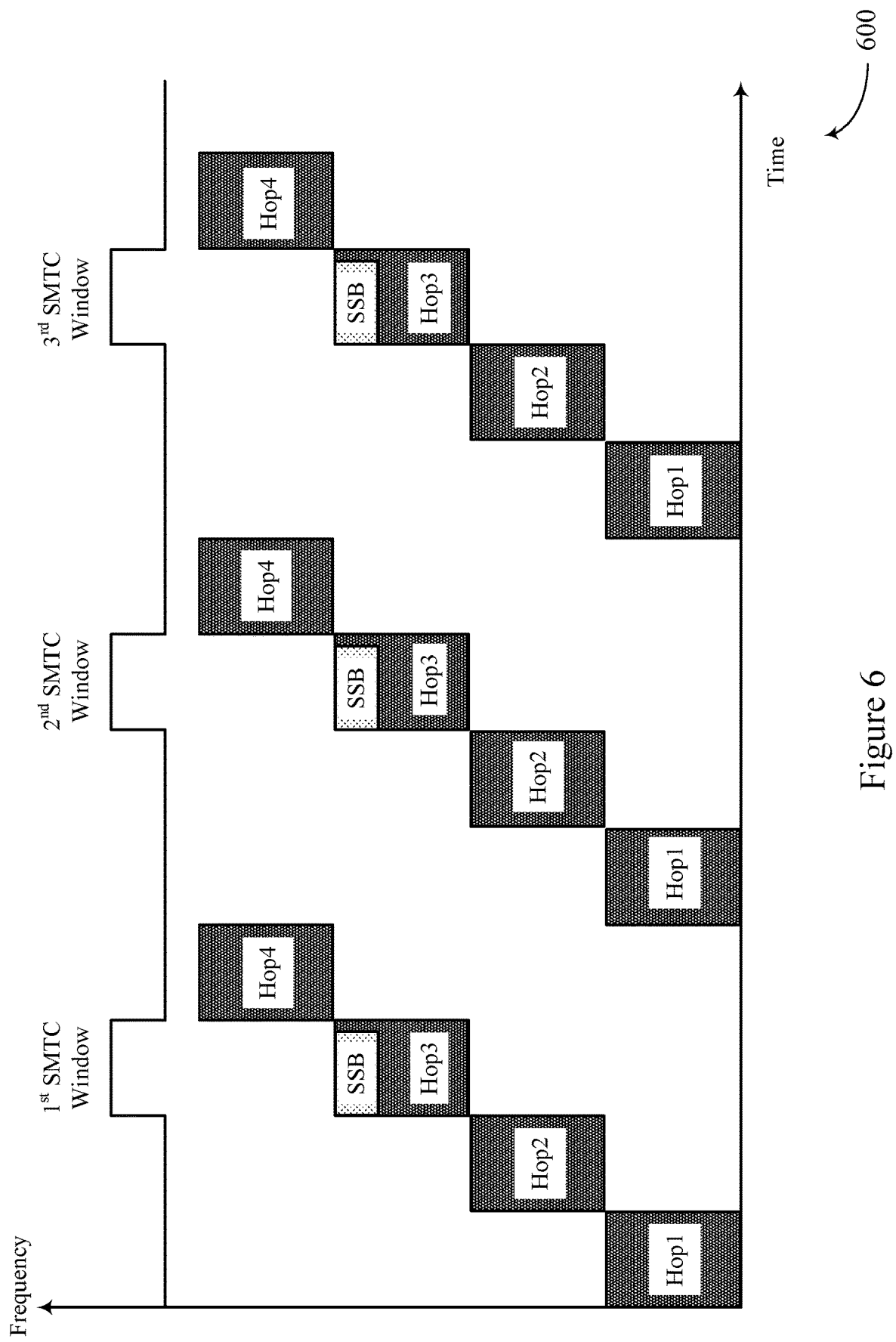

FIG. 6 illustrates an example of a frequency hopping timeline 600 that supports measurement without gaps for narrow BWP hopping. The frequency hopping timeline 600 may implement or be implemented by aspects of the wireless communications system 100 or the signaling diagram 200. For example, the frequency hopping timeline 600 illustrates an example configuration of frequency hops, SSBs, and SMTC windows for communications between a BS 105 and a UE 115. The UE 115 may represent an example of a UE 115 as described herein, including with reference to FIGS. 1-5. The BS 105 may represent an example of a BS 105 as described herein, including with reference to FIGS. 1-5.

The UE 115 may receive a control message from the BS 105 indicating an active BWP for the UE 115, an SMTC window duration, an SMTC periodicity, a hopping pattern associated with the active BWP, a set of SSBs scheduled to occur within one or more hops of the hopping pattern or any combination thereof, as described with reference to FIGS. 2-5. The active BWP may be defined as one of the active BWPs 405-*a* and 405-*b* described with reference to FIG. 4. In the example of FIG. 6, the BS 105 may schedule a single SSB for the UE 115 to measure during each SMTC window. That is, the BS 105 may indicate the SSB and a periodicity associated with the SSB. The periodicity of the SSB may be the same as the SMTC periodicity such that the SSB may be scheduled to occur within each of the first, second, and third SMTC windows.

The UE 115 may be configured with a fixed periodic hopping pattern in accordance with the SSB periodicity. That is, the hopping pattern for the UE 115 may be designed such that the SSB for measurement by the UE 115 occurs within a same hop of the hopping pattern during each SMTC window. In the example of FIG. 6, the hopping pattern for the UE 115 may be designed such that the SSB is scheduled within the hop3 of the hopping pattern during each SMTC window. The UE 115 may receive data and perform measurement of the SSB within the hop3 of the hopping pattern without switching between frequency hops during a gap period.

In some implementations, the BS 105 may schedule the SSB and one or more other SSBs in an interleaving fashion to reduce crowding in a single reduced BWP hop. For example, the UE 115 may measure the SSB in the hop3 of the hopping pattern during each SMTC window and a second UE 115 may measure a second SSB within the hop2 of the hopping pattern during each SMTC window. In such implementations, the hopping pattern for the second UE 115 may be configured such that the hop2 occurs within each SMTC window.

The UE 115 may perform measurement of each SSB scheduled for the UE 115 and filter the measurements over multiple SSBs. The set of SSBs may correspond to a same hop index, or a different hop index (for example, if multiple SSBs are interleaved) in different hopping cycles of the hopping pattern for the UE 115. In some implementations, each SSB may be transmitted using a different transmit power. If an SSB power difference is present across the set of SSBs, the BS 105 may broadcast an indication of the SSB power difference to the UE 115. The UE 115 may take the power difference into account when performing the filtering. The UE 115 may transmit a measurement report to the BS 105 in accordance with the measurements and the filtering.

The UE 115 may thereby be configured with a hopping pattern that supports measurement of a same SSB in a same frequency hop during each SMTC window to improve communication reliability and support measurement without gaps.

Figure 7:
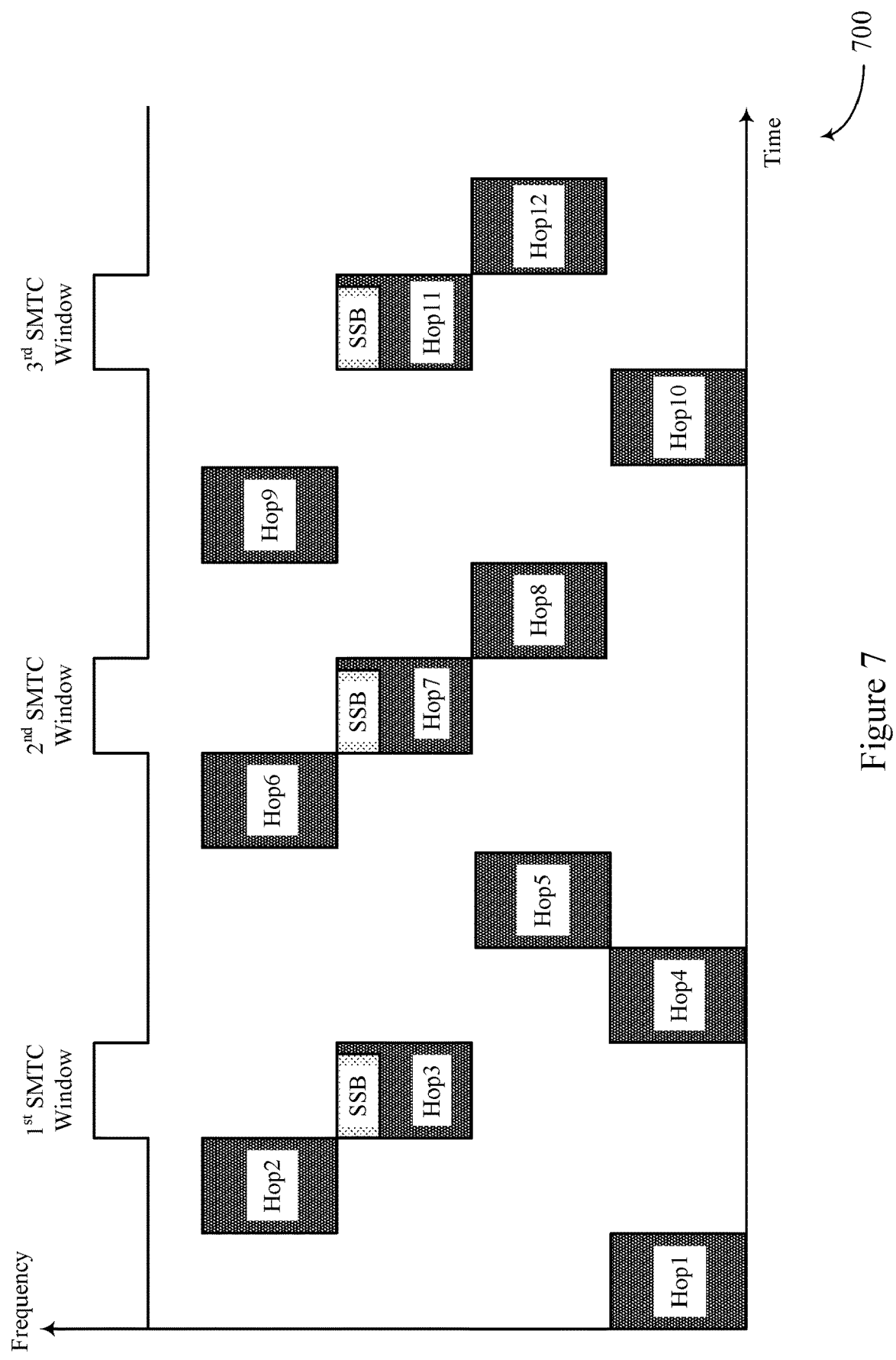

FIG. 7 illustrates an example of a frequency hopping timeline 700 that supports measurement without gaps for narrow BWP hopping. The frequency hopping timeline 700 may implement or be implemented by aspects of the wireless communications system 100 or the signaling diagram 200. For example, the frequency hopping timeline 700 illustrates an example configuration of frequency hops, SSBs, and SMTC windows for communications between a BS 105 and a UE 115. The UE 115 may represent an example of a UE 115 as described herein, including with reference to FIGS. 1-6. The BS 105 may represent an example of a BS 105 as described herein, including with reference to FIGS. 1-6.

The UE 115 may receive a control message from the BS 105 indicating an active BWP for the UE 115, an SMTC window duration, an SMTC periodicity, a hopping pattern associated with the active BWP, a set of SSBs scheduled to occur within one or more hops of the hopping pattern or any combination thereof, as described with reference to FIGS. 2-6. The active BWP may be defined as one of the active BWPs 405-*a* and 405-*b* described with reference to FIG. 4. In the example of FIG. 7, the BS 105 may schedule a single SSB for the UE 115 to measure during each SMTC window. That is, the BS 105 may indicate the SSB and a periodicity associated with the SSB. The periodicity of the SSB may be the same as the SMTC periodicity such that the SSB may be scheduled to occur during each of the first, second, and third SMTC windows.

The UE 115 may be configured with a pseudo-random hopping pattern or a random hopping pattern. That is, the UE 115 may randomly or pseudo-randomly hop between reduced BWP hops of the hopping pattern. In the example of FIG. 7, the random or pseudo-random hopping pattern may be designed in such a way that a same reduced BWP hop includes a same SSB during each SMTC occasion. For example, the hop3, the hop7, and the hop11 of the hopping pattern may each include the SSB and occur during a respective SMTC window. The hop3, the hop7, and the hop11 may correspond to a same frequency within the hopping pattern.

In some implementations, the pseudo random hopping pattern may include a first hopping pattern and a second hopping pattern. The first hopping pattern may be a fixed hopping pattern that may indicate to hop to a same frequency hop during each SMTC window, and the second hopping pattern may be a pseudo-random or a random hopping pattern that may indicate to randomly hop or pseudo randomly hop outside of the SMTC windows. That is, the BS 105 may generate a random hopping pattern and a fixed hopping pattern corresponding to the SMTC occasions for the UE 115. For example, the first hopping pattern may correspond to the hop3, the hop7, and the hop11, which may each correspond to a same hop index in the hopping pattern. In some examples, the UE 115 may partially or completely generate the random or pseudo random hopping pattern.

The first hopping pattern may be configured in accordance with the SSB-based measurements. For example, the hops in the first hopping pattern may include the SSB in frequency and a periodicity of the hops in the first hopping pattern may be the same as the SMTC periodicity. The hops of the first (fixed) hopping pattern may override or take precedence over the hops in the second (random or pseudo random) hopping pattern. That is, if a hop in the random hopping pattern overlaps with a hop in the fixed hopping pattern, such as the hop3, the UE 115 may be configured to switch to the hop3 of the fixed hopping pattern. As such, the UE 115 may measure the SSB and receive data without a gap within a same frequency hop during each SMTC window, and the UE 115 may randomly or pseudo randomly hop between hops outside of the SMTC windows.

In some implementations, the BS 105 may schedule the SSB and one or more other SSBs in an interleaving fashion to reduce crowding in a single reduced BWP hop. For example, the UE 115 may measure the SSB in the hop3 of the hopping pattern and a second UE 115 may measure a second SSB at a second frequency hop. In such implementations, the hopping pattern for the second UE 115 may be configured such that the second frequency hop occurs within each SMTC window.

The UE 115 may perform measurement of each SSB scheduled for the UE 115 and filter the measurements over multiple SSBs. The set of SSBs may correspond to a same hop index, or a different hop index (for example, if multiple SSBs are interleaved) in different hopping cycles of the hopping pattern for the UE 115. In some implementations, each SSB may be transmitted using a different transmit power. If an SSB power difference is present across the set of SSBs, the BS 105 may broadcast an indication of the SSB power difference to the UE 115. The UE 115 may take the power difference into account when performing the filtering. The UE 115 may transmit a measurement report to the BS 105 in accordance with the measurements and the filtering.

The UE 115 may thereby be configured with a random hopping pattern or a pseudo random hopping pattern that supports measurement of a same SSB in a respective frequency hop during each SMTC window to improve communication reliability and support measurement without gaps.

Figure 8:
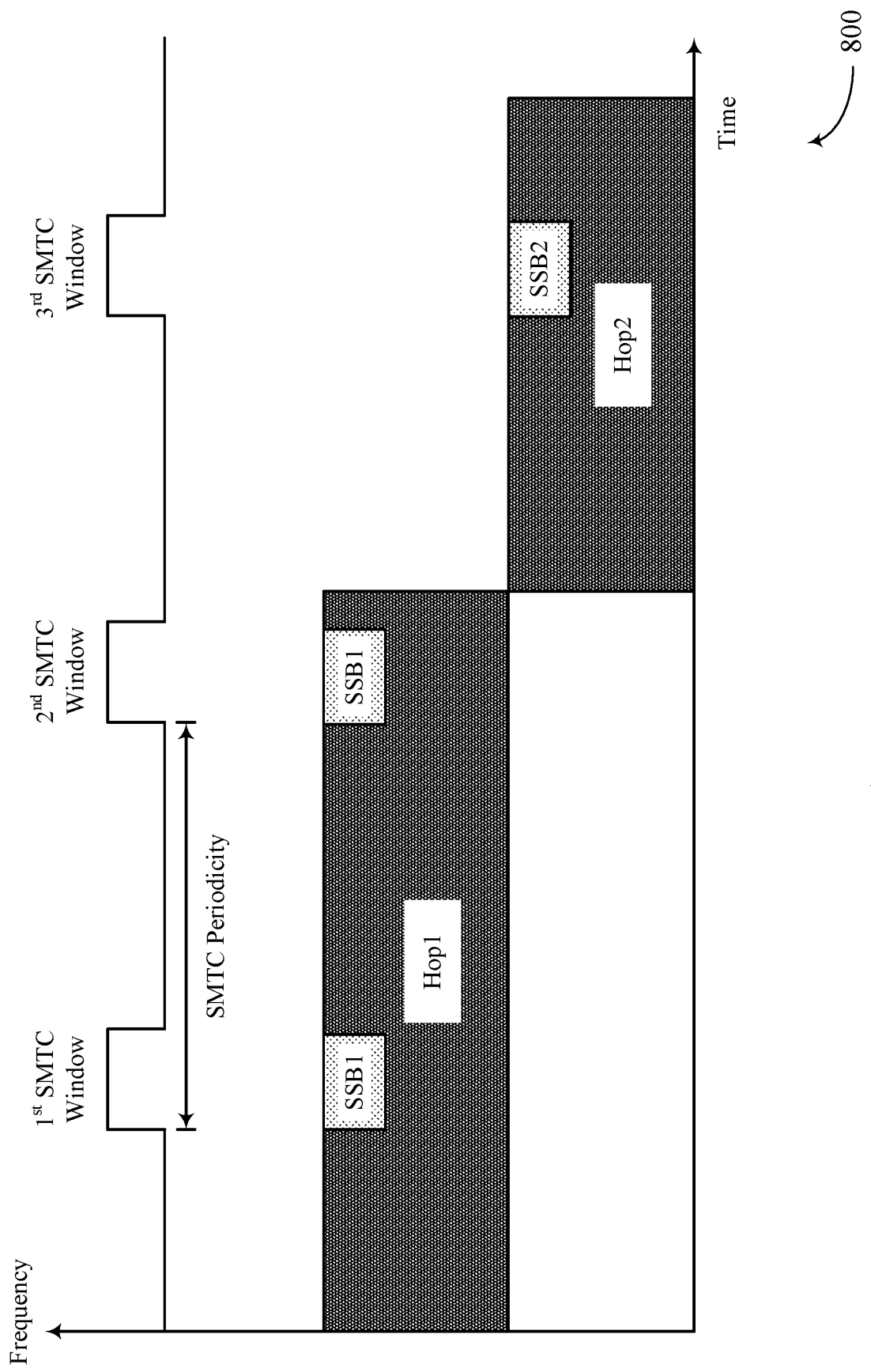

FIG. 8 illustrates an example of a frequency hopping timeline 800 that supports measurement without gaps for narrow BWP hopping. The frequency hopping timeline 800 may implement or be implemented by aspects of the wireless communications system 100 or the signaling diagram

200. For example, the frequency hopping timeline 800 illustrates an example configuration of frequency hops, SSBs, and SMTC windows for communications between a BS 105 and a UE 115. The UE 115 may represent an example of a UE 115 as described herein, including with reference to FIGS. 1-7. The BS 105 may represent an example of a BS 105 as described herein, including with reference to FIGS. 1-7.

The UE 115 may receive a control message from the BS 105 indicating an active BWP for the UE 115, an SMTC window duration, an SMTC periodicity, a hopping pattern associated with the active BWP, a set of SSBs scheduled to occur within one or more hops of the hopping pattern or any combination thereof, as described with reference to FIGS. 2-7. The active BWP may be defined as one of the active BWPs 405-*a* and 405-*b* described with reference to FIG. 4. In the example of FIG. 8, the BS 105 may configure the SMTC periodicity and the hopping pattern such that a hop duration for each reduced BWP hop is longer than the SMTC periodicity. For example, a duration of the hop1 and a duration of the hop2 of the hopping pattern for the UE 115 may each be longer than the SMTC periodicity.

If the hop duration is greater than the SMTC periodicity, a separate SSB may be configured for each hop. For example, the BS 105 may configure a first SSB1 for the hop1 and a second SSB2 for the hop2. In some implementations, the BS 105 may configure the SSB1 for the hop1, and the BS 105 may refrain from configuring the SSB2 until the switch between the hop1 and the hop2 occurs. If a duration of the hop1 is relatively large, the BS 105 may reduce overhead by refraining from configuring the SSB2 until the switch between hops. Additionally, or alternatively, the BS 105 may configure a fixed SSB pattern that corresponds to the hopping pattern.

The UE 115 may perform measurement on a first instance of the SSB1 within the hop1 during the first SMTC window and a second instance of the SSB1 within the hop1 during the second SMTC window. The UE 115 may hop from the hop1 to the hop2 in accordance with the hopping pattern configured for the UE 115. The UE 115 may measure the SSB2 within the hop2 during the third SMTC window.

The UE 115 may perform measurement of each SSB scheduled for the UE 115 within a same hop and filter the measurements over multiple SSBs. Additionally, or alternatively, the UE 115 may filter measurements associated with each SSB scheduled for the UE 115 irrespective of a hop index associated with the SSB. In some implementations, each SSB may be transmitted using a different transmit power. If an SSB power difference is present across the set of SSBs, the BS 105 may broadcast an indication of the SSB power difference to the UE 115. The UE 115 may take the power difference into account when performing the filtering. The UE 115 may transmit a measurement report to the BS 105 in accordance with the measurements and the filtering.

The UE 115 may thereby be configured with one or more hops having a duration greater than the SMTC periodicity, such that the UE 115 may measure an SSB, such as the SSB1, within a same frequency hop during one or more SMTC windows. Such techniques may improve communication reliability and support measurement without gaps.

FIGS. 5-8 illustrate example configurations of SSBs and hopping patterns that support SSB measurement without gaps. Although the SSB configurations and hopping patterns are illustrated in separate figures, it is to be understood that a UE 115 may support one or more hopping patterns during wireless communication. For example, the UE 115 may switch between a first hopping pattern, such as a fixed hopping pattern, and a second hopping pattern, such as a different fixed hopping pattern, a pseudo random hopping pattern, or a random hopping pattern, during communication with a BS 105. Additionally, or alternatively, the BS 105 may schedule one or more SSBs according to different SSB patterns during communications with the UE 115. For example, the BS 105 may schedule a first set of SSBs for the UE 115 according to a fixed SSB pattern and a second set of SSBs for the UE 115 according to a hopping SSB pattern. The SSB and frequency hopping patterns may be ascertained, selected, or determined by the UE 115, the BS 105, or both in accordance with channel parameters, a type of communications, a capability of the UE 115, or any combination thereof.

A QCL relationship may be configured across SSBs configured for measurements of an intra-frequency cell, or an inter-frequency cell, or both. That is, multiple SSBs belonging to a same or different hop index in a same hopping pattern (as illustrated in FIG. 5) or belonging to a same or different hop index in a different hopping pattern may be configured with or correspond to the same QCL information. The QCL relationship between SSBs may provide for the UE 115 to measure an SSB in accordance with a first hopping pattern and to switch to measuring the same SSB for a same cell in accordance with a second hopping pattern and the same QCL information. Additionally, or alternatively, the QCL relationship may provide for the UE 115 to measure SSBs associated with different hopping indices in a hopping pattern in each SMTC window. The UE 115 and the BS 105 may thereby support configurations of SSBs, hopping patterns, or both, to improve SSB-based measurements without gaps for frequency hopping.

Figure 9A:
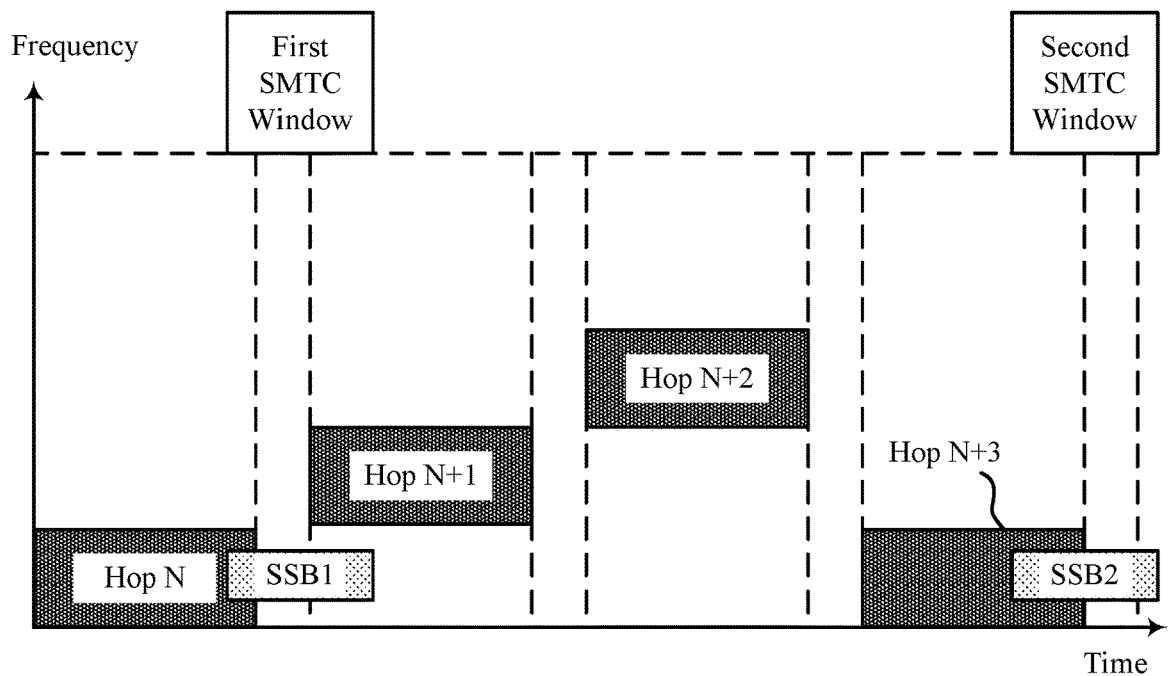
FIGS. 9A-14 illustrate examples of hopping configurations that support measurement without gaps for narrow BWP hopping.
Figure 9B:
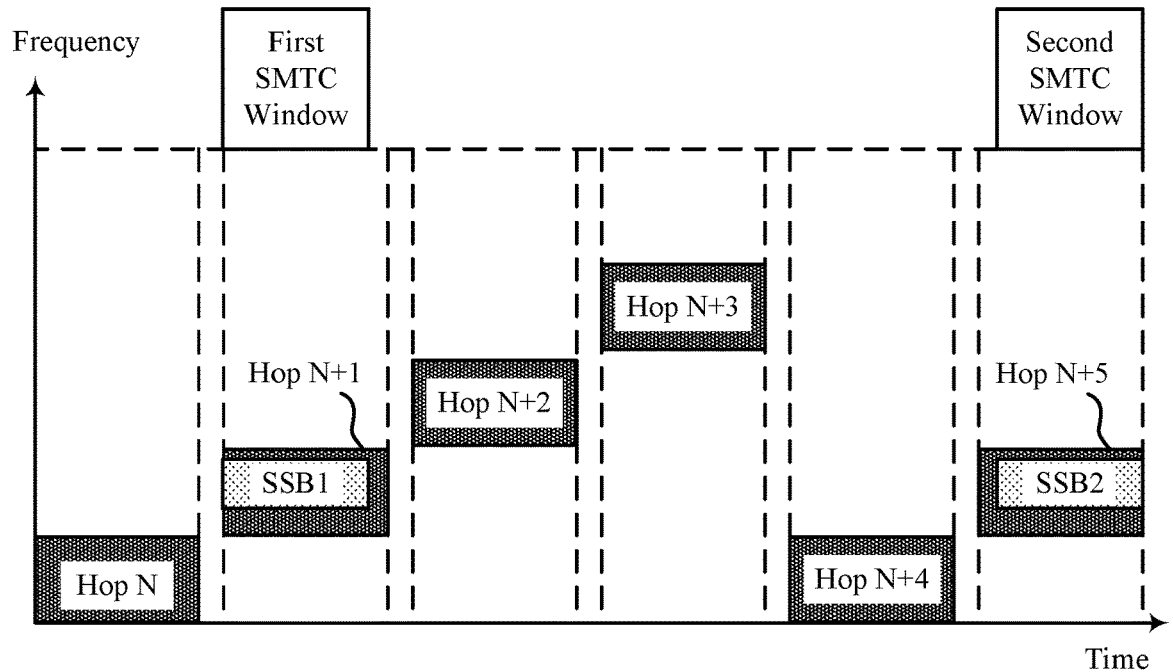

FIGS. 9A and 9B illustrate examples of hopping configurations 900 that supports measurement without gaps for narrow BWP hopping. The hopping configurations 900-*a* and 900-*b* may implement or be implemented by aspects of the wireless communications system 100 or the signaling diagram 200. For example, the hopping configurations 900-*a* and 900-*b* illustrate example configurations of frequency hops, SSBs, and SMTC windows for communications between a BS 105 and a UE 115. The UE 115 may represent an example of a UE 115 as described herein, including with reference to FIGS. 1-8. The BS 105 may represent an example of a BS 105 as described herein, including with reference to FIGS. 1-8. In the example of FIGS. 9A and 9B, a duration of one or more hops in a hopping pattern for the UE 115 may be greater than or the same as an SMTC window duration.

In the example of FIG. 9A, the UE 115 may hop between each of the hop N, the hop N+1, the hop N+2, and the hop N+3 in accordance with the hopping configuration 900-*a* and a hopping pattern for the UE 115. The UE 115 may switch between hops of the hopping pattern during a gap or switching delay period, as illustrated by the null space between hops in FIG. 9A. In some implementations, a duration of each hop may be greater than or the same as an SMTC window duration ($T_{SMTC} \leq T_{Hop}$). As such, a single SMTC window may partially or completely overlap with two hops in time. For example, the first SMTC window may overlap with the hop N and the hop N+1.

The UE 115 may switch between the hop N and the hop N+1 during the first SMTC window, which may interrupt a measurement. For example, the SSB1 may be scheduled for measurement by the UE 115 during the first SMTC window. The UE 115 may start measuring the SSB1 within the hop N. If the UE 115 switches to the hop N+1 during a gap period in accordance with the hopping pattern, the UE 115 will not complete the measurement of the SSB1. Additionally, the SSB1 may not occur within the active BWP for the hop N+1. As such, switching between hops during an SMTC window may reduce an accuracy of the measurement and reduce communication reliability.

Techniques described herein provide for the BS 105, the UE 115, or both to ensure each SMTC window duration is included in a single hop duration to improve SSB measurements and to refrain from switching between hops while performing a measurement. The BS 105, the UE 115, or both may be configured to align a hop with a respective SMTC window, extend a duration of a hop, reduce a duration of a hop, shift a hop within a hopping pattern, or any combination thereof to improve SSB measurements. In some implementations, the BS 105 may adjust a duration of one or more hops in a hopping pattern for the UE 115, and the BS 105 may transmit an indication of the adjustment to the UE 115. In some other implementations, the UE 115 may perform the adjustments to the one or more hop durations in accordance with a configuration for the UE 115, a type of communications performed by the UE 115, or both. Techniques for aligning a hopping pattern with one or more SMTC windows when a hop duration is greater than the SMTC duration are described in further detail with reference to FIGS. 9B-13.

FIG. 9B illustrates the hopping configuration 900-b. The hopping pattern illustrated by the hopping configuration 900-b may be designed such that each SMTC window is contained within a corresponding hop duration, which may improve SSB measurement reliability. For example, the first SMTC window may occur within a duration of the hop N+1 and the second SMTC window may occur within a duration of the hop N+5.

The BS 105, the UE 115, or both may configure the hopping pattern to include the SMTC window duration within a respective hop duration by aligning a beginning boundary, an ending boundary, or both, of a hop with the SMTC window. That is, each hop of the hopping pattern may be aligned with a beginning boundary, or an ending boundary, or both of a respective SMTC window. In the example of FIG. 9B, the hopping pattern may be configured such that the hop N+1 is aligned with a beginning of the first SMTC window and the SSB1 and the hop N+5 is aligned with an ending of the second SMTC window and the SSB2.

The UE 115 may thereby measure the SSB1 and the SSB2 within the hop N+1 and the hop N+5, respectively during the first and second SMTC windows, respectively without a gap. By refraining from switching between hops during the measurement, the UE 115 may obtain a more accurate measurement of the SSB, which may improve communication reliability.

Figure 10A:
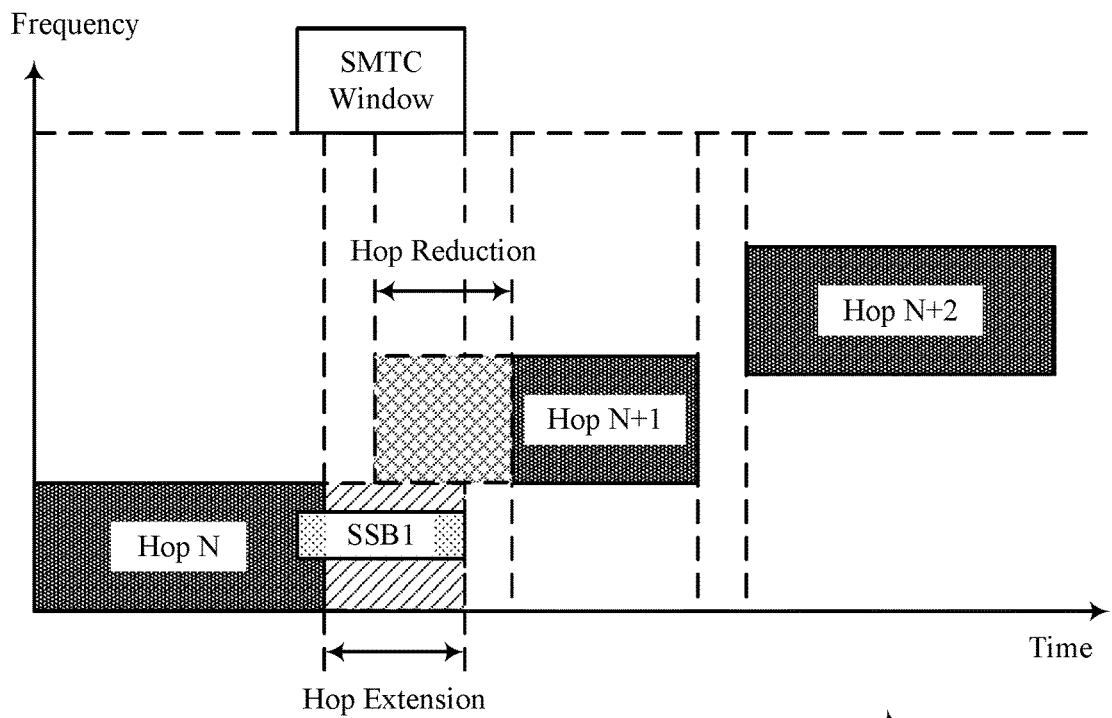
Figure 10B:
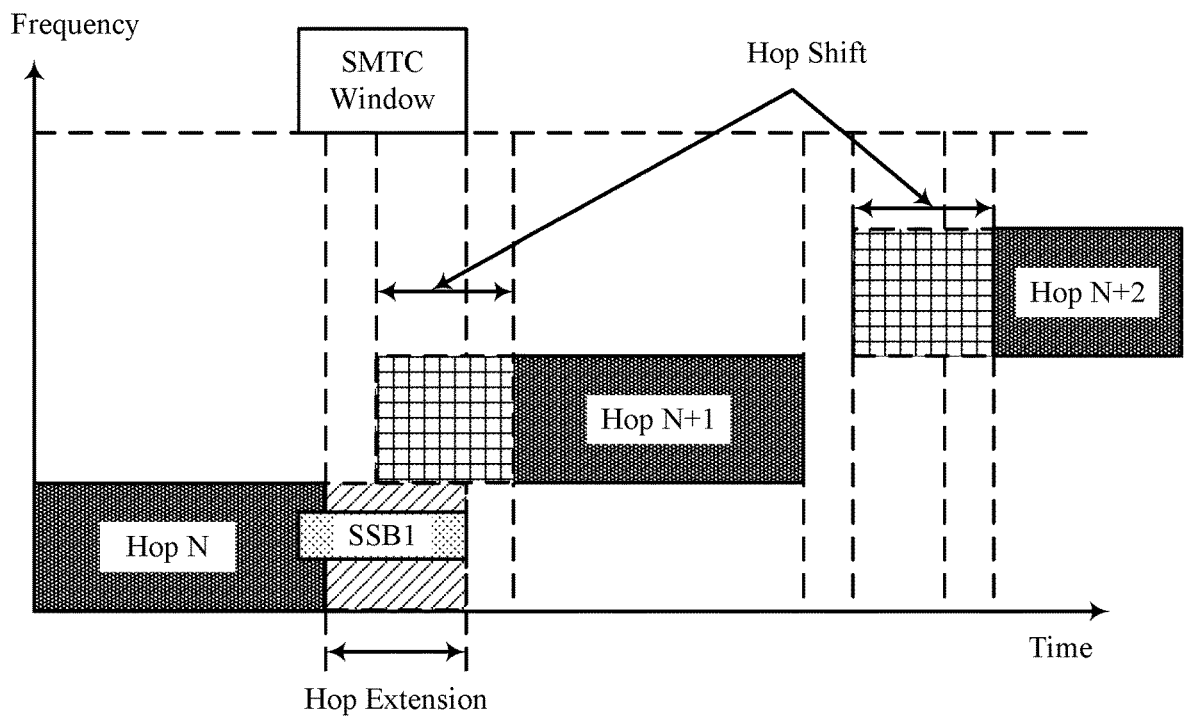

FIGS. 10A and 10B illustrate examples of hopping configurations 1000 that support measurement without gaps for narrow BWP hopping. The hopping configurations 1000-a and 1000-b may implement or be implemented by aspects of the wireless communications system 100 or the signaling diagram 200. For example, the hopping configurations 1000-a and 1000-b illustrate example configurations of frequency hops, SSBs, and SMTC windows for communications between a BS 105 and a UE 115. The UE 115 may represent an example of a UE 115 as described herein, including with reference to FIGS. 1-9. The BS 105 may represent an example of a BS 105 as described herein, including with reference to FIGS. 1-9.

In the example of FIG. 10A and FIG. 10B, a duration of one or more hops in a hopping pattern for the UE 115 may be greater than or the same as an SMTC window duration, such that an SMTC window may partially overlap with a hop N and a hop N+1 of a hopping pattern for the UE 115, as described with reference to FIG. 9A. To improve measurement of an SSB scheduled within the SMTC window, such as the SSB1, the UE 115 may be configured to extend a duration of a hop containing an SMTC window (the hop N) until an end of the SMTC window ($T_{hop}(N)=T_{hop}(N)+T_{SMTC}$) By extending the duration of the hop N to include the hop extension region illustrated in FIG. 10A and FIG. 10B, the UE 115 may perform measurement on the SSB1 within the SMTC window without switching between hops during the measurement.

In the example of FIG. 10A, to accommodate for the hop extension of the hop N, the UE 115 may be configured to reduce a duration of the hop N+1 that is subsequent to the hop N in the hopping pattern for the UE 115 ($T_{hop}(N+1)=T_{hop}(N+1)-T_{SMTC}$). That is, the UE 115 may refrain from switching to the hop N+1 until an end of the SMTC window after the hop reduction region illustrated in FIG. 10A. By shrinking the hop N+1, the UE 115 may maintain a duration of the hop N+2 and other remaining hops in the hopping pattern that are subsequent to the hop N in time. For example, the UE 115 may switch to the hop N+2 after the hop N+1 at a same time at which the UE 115 would switch to the hop N+2 if the UE 115 had not extended the hop N.

In the example of FIG. 10B, to accommodate for the hop extension of the hop N, the UE 115 may be configured to shift the hop N+1, the hop N+2, and one or more remaining hops in the hopping pattern for the UE 115 in time. For example, the UE 115 may shift the hop N+1 and the hop N+2 by a hop shift duration that is the same as a duration of the hop extension. By shifting the hops in time, the UE 115 may account for the hop extension while maintaining a duration of remaining hops in the hopping pattern.

The UE 115 may thereby be configured to extend a duration of the hop N to an end of the SMTC window in accordance with at least a portion of the SSB1 being scheduled outside of the initial duration of the hop N and an ending boundary of the initial duration of the hop N occurring prior to an ending boundary of the SMTC window in time. The UE 115 may reduce a duration of a subsequent hop N+1 or shift remaining hops in the hopping pattern in time to account for the hop extension. In some implementations, the BS 105 may transmit signaling to the UE 115 to indicate the configuration or to dynamically indicate the hop extension, hop skip, or hop reduction durations.

Figure 11A:
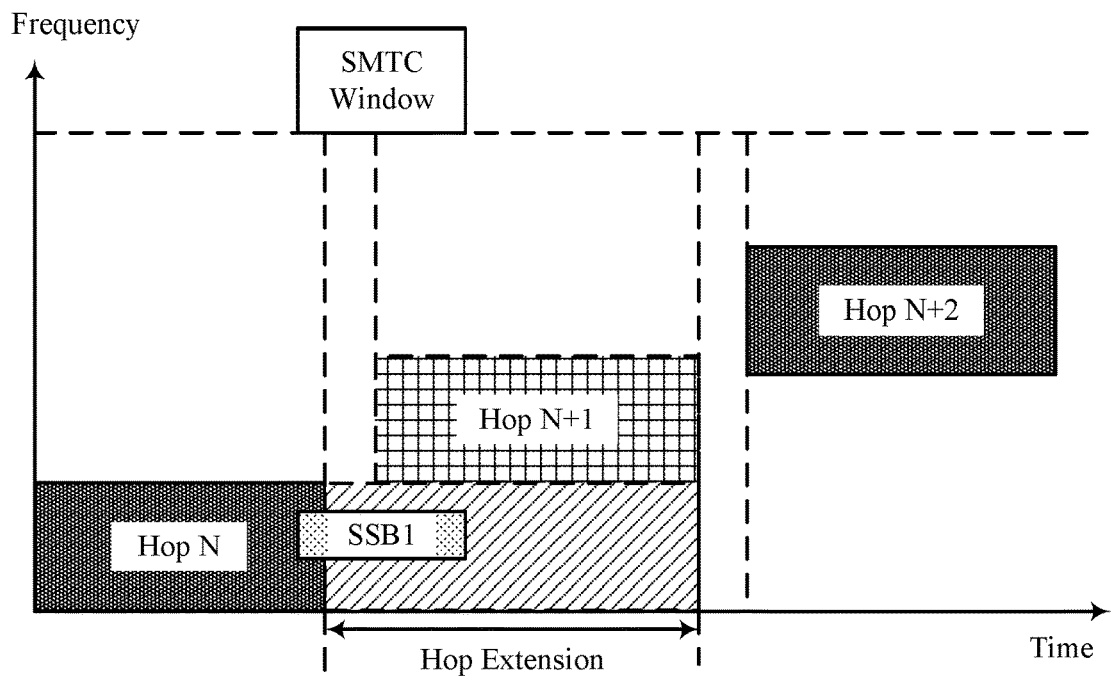
Figure 11B:
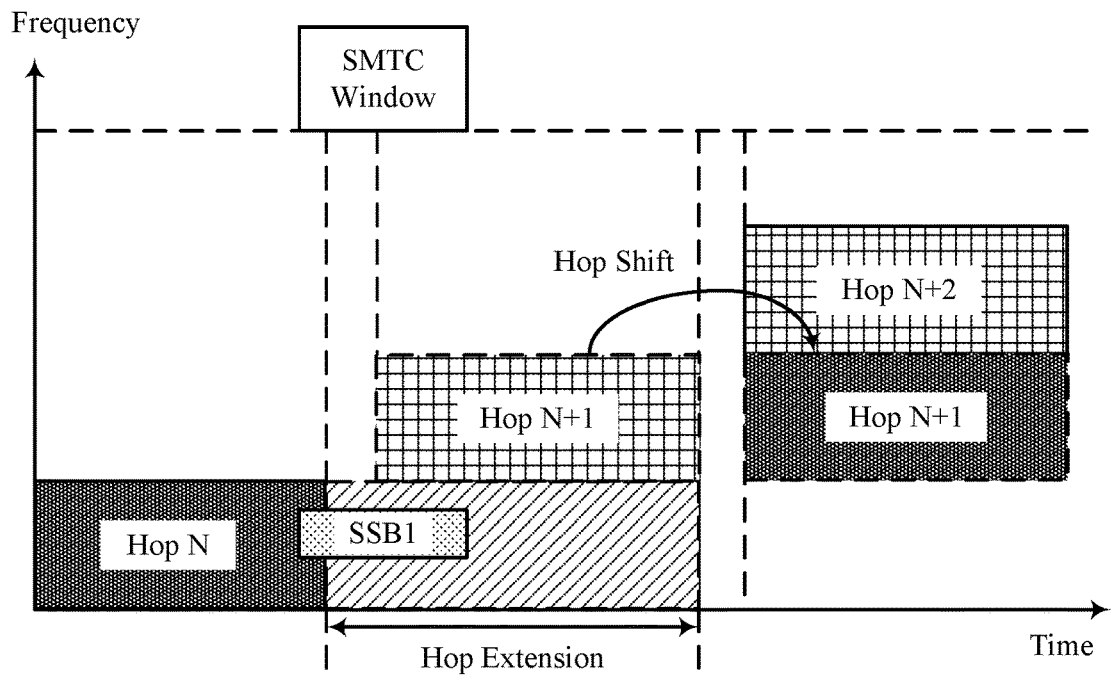

FIGS. 11A and 11B illustrate examples of hopping configurations 1100 that supports measurement without gaps for narrow BWP hopping. The hopping configurations 1100-a and 1100-b may implement or be implemented by aspects of the wireless communications system 100 or the signaling diagram 200. For example, the hopping configurations 1100-a and 1100-b illustrate example configurations of frequency hops, SSBs, and SMTC windows for communications between a BS 105 and a UE 115. The UE 115 may represent an example of a UE 115 as described herein, including with reference to FIGS. 1-10. The BS 105 may represent an example of a BS 105 as described herein, including with reference to FIGS. 1-10.

In the example of FIG. 11A and FIG. 11B, a duration of one or more hops in a hopping pattern for the UE 115 may be greater than or the same as an SMTC window duration, such that an SMTC window may partially overlap with a hop N and a hop N+1 of a hopping pattern for the UE 115, as described with reference to FIG. 9A. To improve measurement of an SSB scheduled within the SMTC window, such as the SSB1, the UE 115, the BS 105, or both may be configured to extend a duration of a hop containing an SMTC window (the hop N) until an end of a subsequent hop, such as the hop N+1, in the hopping pattern ($T_{hop}(N)=T_{hop}(N)+T_{hop}(N+_1)+T_{HopSwitchDelay}$) By extending the duration of the hop N to include the hop extension region illustrated in FIG. 11A and FIG. 11B, the UE 115 may perform measurement of the SSB1 within the SMTC window without switching between hops during the measurement.

In the example of FIG. 11A, to accommodate for the hop extension of the hop N, the UE 115 may be configured to skip the hop N+1 that is subsequent to the hop N in the hopping pattern for the UE 115. That is, the UE 115 may refrain from switching to the hop N+1. Instead, the UE 115 may hop from the extended duration of the hop N to the hop N+2 during a gap period for a switching delay. By skipping the hop N+1, the UE 115 may maintain a duration and timing of the hop N+2 and other remaining hops in the hopping pattern. For example, the UE 115 may switch to the hop N+2 after the hop N at a same time at which the UE 115 would switch to the hop N+2 if the UE 115 had not extended the hop N.

In the example of FIG. 11B, to accommodate for the hop extension of the hop N, the UE 115 may be configured to shift the hop N+1, the hop N+2, and one or more remaining hops in the hopping pattern for the UE 115 in time. For example, the UE 115 may shift the hop N+1 and the hop N+2 by a hop shift duration that is the same as a duration of the hop extension. The hop N+1 may be shifted to overlap with an initial occurrence of the hop N+2, but at a different frequency than the hop N+2. The UE 115 may similarly shift each remaining hop in the hopping pattern by the same duration. By shifting the hops in time, the UE 115 may account for the hop extension while maintaining a duration of remaining hops in the hopping pattern.

The UE 115 may thereby be configured to extend a duration of the hop N to an end of a subsequent hop N+1 in the hopping pattern for the UE 115 in accordance with at least a portion of the SSB1 being scheduled outside of the initial duration of the hop N and an ending boundary of the initial duration of the hop N occurring prior to an ending boundary of the SMTC window in time. The UE 115 may skip the subsequent hop N+1 or shift remaining hops in the hopping pattern in time to account for the hop extension. In some implementations, the BS 105 may transmit signaling to the UE 115 to indicate the configuration or to dynamically indicate the hop extension, hop skip, or hop reduction durations.

Figure 12A:
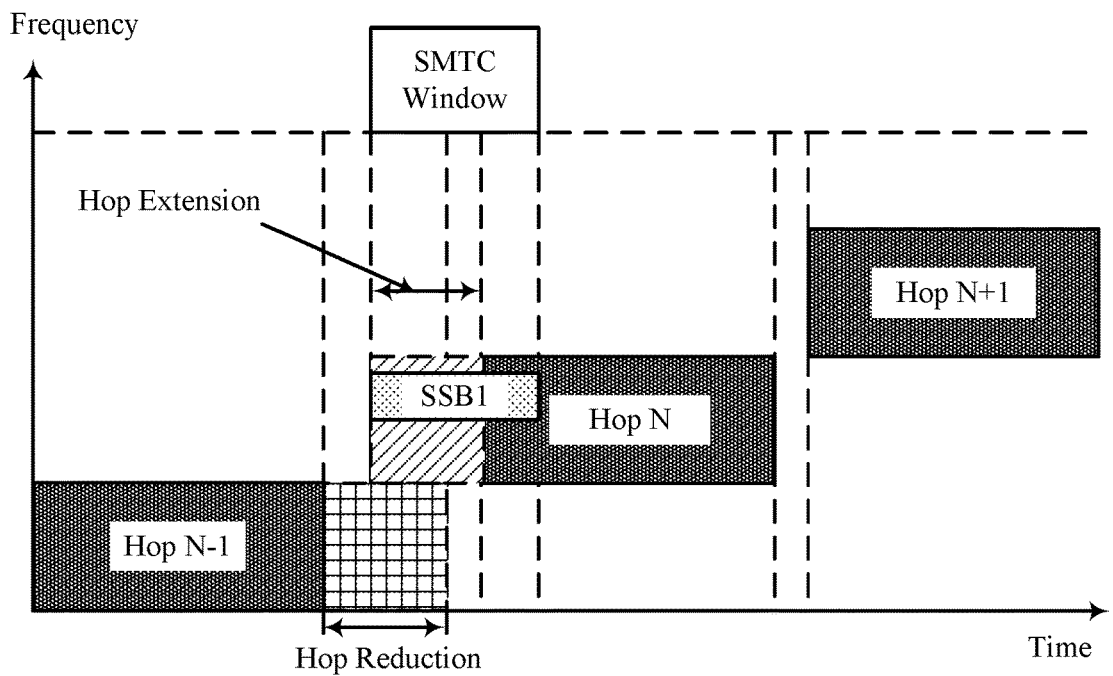
Figure 12B:
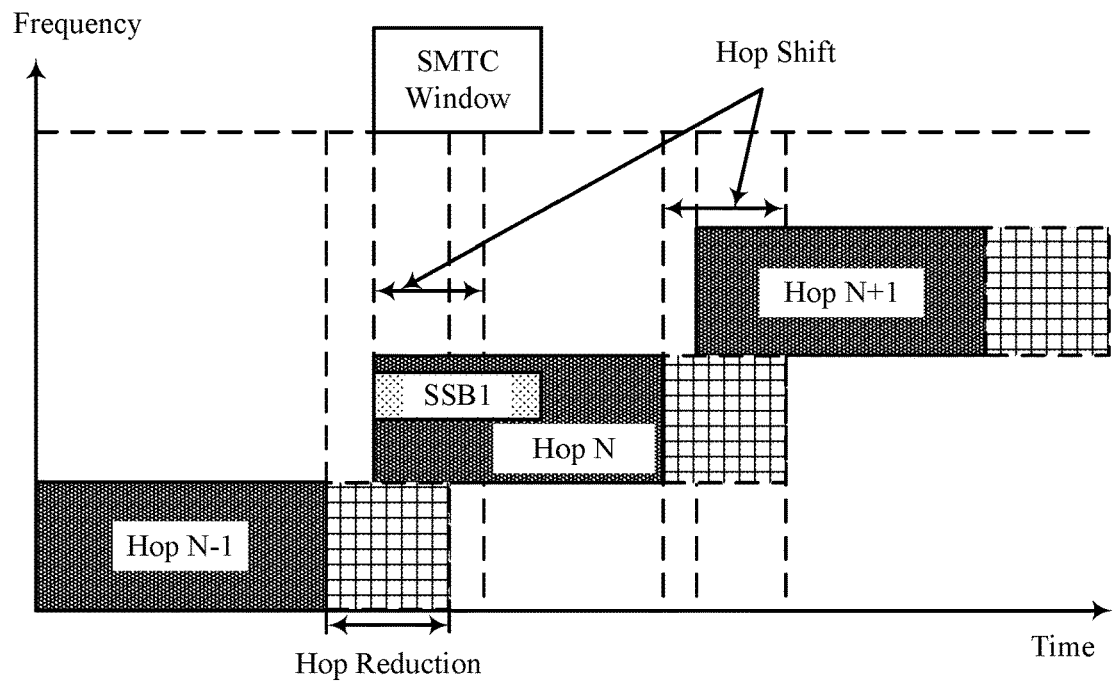

FIGS. 12A and 12B illustrate examples of hopping configurations 1200 that supports measurement without gaps for narrow BWP hopping. The hopping configurations 1200-a and 1200-b may implement or be implemented by aspects of the wireless communications system 100 or the signaling diagram 200. For example, the hopping configurations 1200-a and 1200-b illustrate example configurations of frequency hops, SSBs, and SMTC windows for communications between a BS 105 and a UE 115. The UE 115 may represent an example of a UE 115 as described herein, including with reference to FIGS. 1-11. The BS 105 may represent an example of a BS 105 as described herein, including with reference to FIGS. 1-11.

In the example of FIG. 12A and FIG. 12B, a duration of one or more hops in a hopping pattern for the UE 115 may be greater than or the same as an SMTC window duration, such that an SMTC window may partially overlap with a hop N−1 and a hop N of a hopping pattern for the UE 115, as described with reference to FIG. 9A. To improve measurement of an SSB scheduled within the SMTC window, such as the SSB1, the UE 115 may be configured to reduce a duration of a previous hop (the hop N−1) to extend or shift a duration of a hop (the hop N) containing an SMTC window (the hop N). For example, the UE 115 may extend a duration of the hop N such that $T_{hop}(N)=T_{hop}(N)+T_{SMTC}$. By extending or shifting the duration of the hop N to a beginning of the SMTC window, the UE 115 may perform measurement of the SSB1 within the SMTC window without switching between hops during the measurement.

In the example of FIG. 12A, the UE 115 may extend a duration of the hop N to the beginning boundary of the SMTC window. That is, the hop N may be extended to include the hop extension region illustrated in FIG. 12A. To accommodate for the hop extension of the hop N, the UE 115 may be configured to reduce or shrink a duration of the hop N+1 that is prior to the hop N in the hopping pattern for the UE 115 ($T_{hop}(N-1)=T_{hop}(N-1)-T_{SMTC}$). That is, the UE 115 may switch from the hop N−1 to the hop N at a time that is earlier than an initial hopping time indicated by the initial hopping pattern for the UE 115. The UE 115 may perform the hop during a gap period prior to the SMTC window such that the UE 115 may switch to the hop N before or at the same time as a beginning boundary of the SMTC window and the scheduled SSB1. The UE 115 may perform measurement of the SSB1 without switching between hops, which may improve accuracy and reliability of communications.

By reducing the duration of the hop N−1, the UE 115 may maintain a duration and timing of the hop N+1 and other remaining hops in the hopping pattern that are subsequent to the hop N. For example, the UE 115 may switch to the hop N+1 after the hop N at a same time at which the UE 115 would switch to the hop N+1 if the UE 115 had not extended the hop N.

In the example of FIG. 12B, the UE 115 may be configured to shift the hop N, the hop N+1, and one or more remaining hops that are subsequent to the hop N in the hopping pattern for the UE 115 in time. The UE 115 may be configured to reduce or shrink a duration of the previous hop N−1 in time. For example, the UE 115 may shift the hop N and the hop N+1 earlier in time by a hop shift duration that is the same as a duration of the hop reduction of the hop N−1. The hop N may be shifted to the beginning boundary of the SMTC window. The UE 115 may similarly shift each remaining hop in the hopping pattern by the same duration. By shifting the hops in time, the UE 115 may account for the hop reduction of the hop N−1 while maintaining a duration of remaining hops in the hopping pattern.

The UE 115 may thereby be configured to extend or shift a duration of the hop N to a beginning boundary of the SMTC window in accordance with at least a portion of the SSB1 being scheduled outside of the initial duration of the hop N and a beginning boundary of the initial duration of the hop N occurring subsequent to the beginning boundary of the SMTC window in time. The UE 115 may shrink a duration of a previous hop N−1 in time to account for the extension or shift of the hop N. In some implementations, the BS 105 may transmit signaling to the UE 115 to indicate the configuration or to dynamically indicate the hop extension, hop shift, or hop reduction durations.

Figure 13:
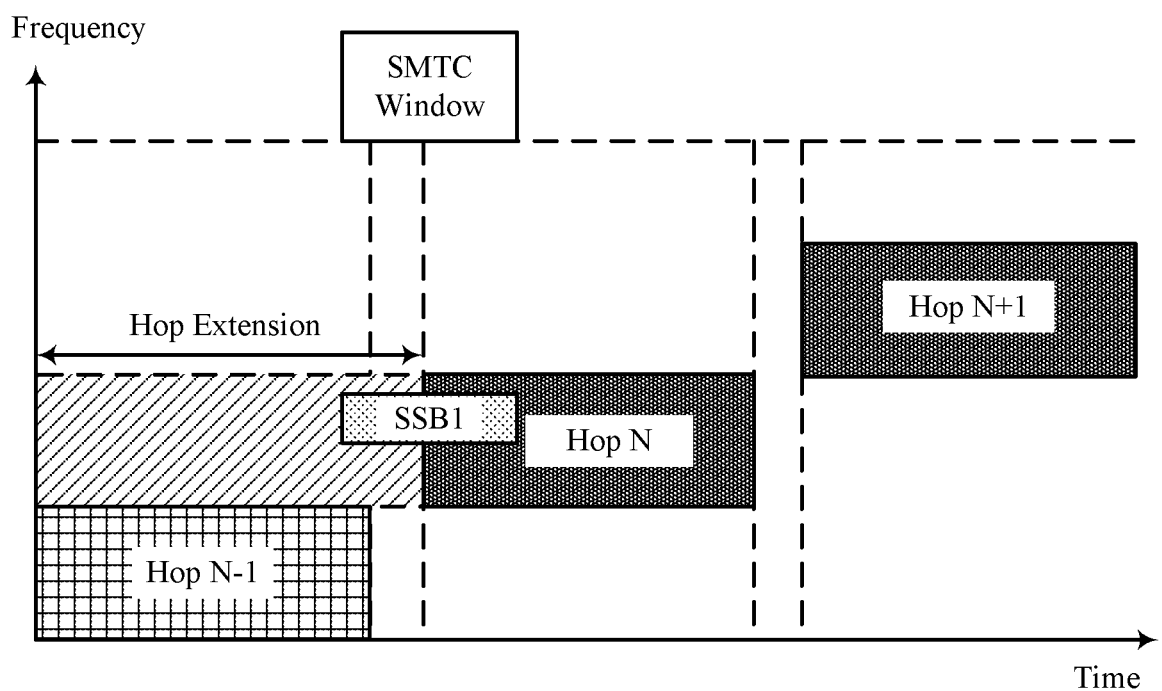

FIG. 13 illustrates an example of a hopping configuration 1300 that supports measurement without gaps for narrow BWP hopping. The hopping configuration 1300 may implement or be implemented by aspects of the wireless communications system 100 or the signaling diagram 200. For example, the hopping configuration 1300 may illustrate example configurations of frequency hops, SSBs, and SMTC windows for communications between a BS 105 and a UE 115. The UE 115 may represent an example of a UE 115 as described herein, including with reference to FIGS. 1-12. The BS 105 may represent an example of a BS 105 as described herein, including with reference to FIGS. 1-12.

In the example of FIG. 13, a duration of one or more hops in a hopping pattern for the UE 115 may be greater than or the same as an SMTC window duration, such that an SMTC window may partially overlap with a hop N−1 and a hop N of a hopping pattern for the UE 115, as described with reference to FIG. 9A. To improve measurement of an SSB scheduled within the SMTC window, such as the SSB1, the UE 115 may be configured to extend a duration of a hop containing the SMTC window (the hop N) to a beginning boundary of a hop (the hop N−1) that is prior to the hop N in time. For example, the initial duration of the hop N may be extended such that $T_{hop}(N) = T_{hop}(N) + T_{hop}(N-1) + T_{HopSwitchDelay}$. By extending the duration of the hop N to include the hop extension region illustrated in FIG. 13, the UE 115 may perform measurement of the SSB1 within the SMTC window without switching between hops during the measurement.

To accommodate for the hop extension of the hop N, the UE 115 may be configured to skip the previous hop N−1 that is prior to the hop N in the hopping pattern for the UE 115. By skipping the hop N−1, the UE 115 may maintain a duration and timing of the hop N+1 and other remaining hops in the hopping pattern that are subsequent to the hop N. For example, the UE 115 may switch to the hop N+1 after the hop N at a same time at which the UE 115 would switch to the hop N+1 if the UE 115 had not extended the hop N.

The UE 115 may thereby be configured to extend a duration of the hop N to a beginning boundary of a previous hop in accordance with at least a portion of the SSB1 being scheduled outside of the initial duration of the hop N and a beginning boundary of the initial duration of the hop N occurring subsequent to the beginning boundary of the SMTC window in time. In some implementations, the BS 105 may transmit signaling to the UE 115 to indicate the configuration for the UE 115 or to dynamically indicate the hop extension duration of the hop N and to skip the hop N−1.

Figure 14:
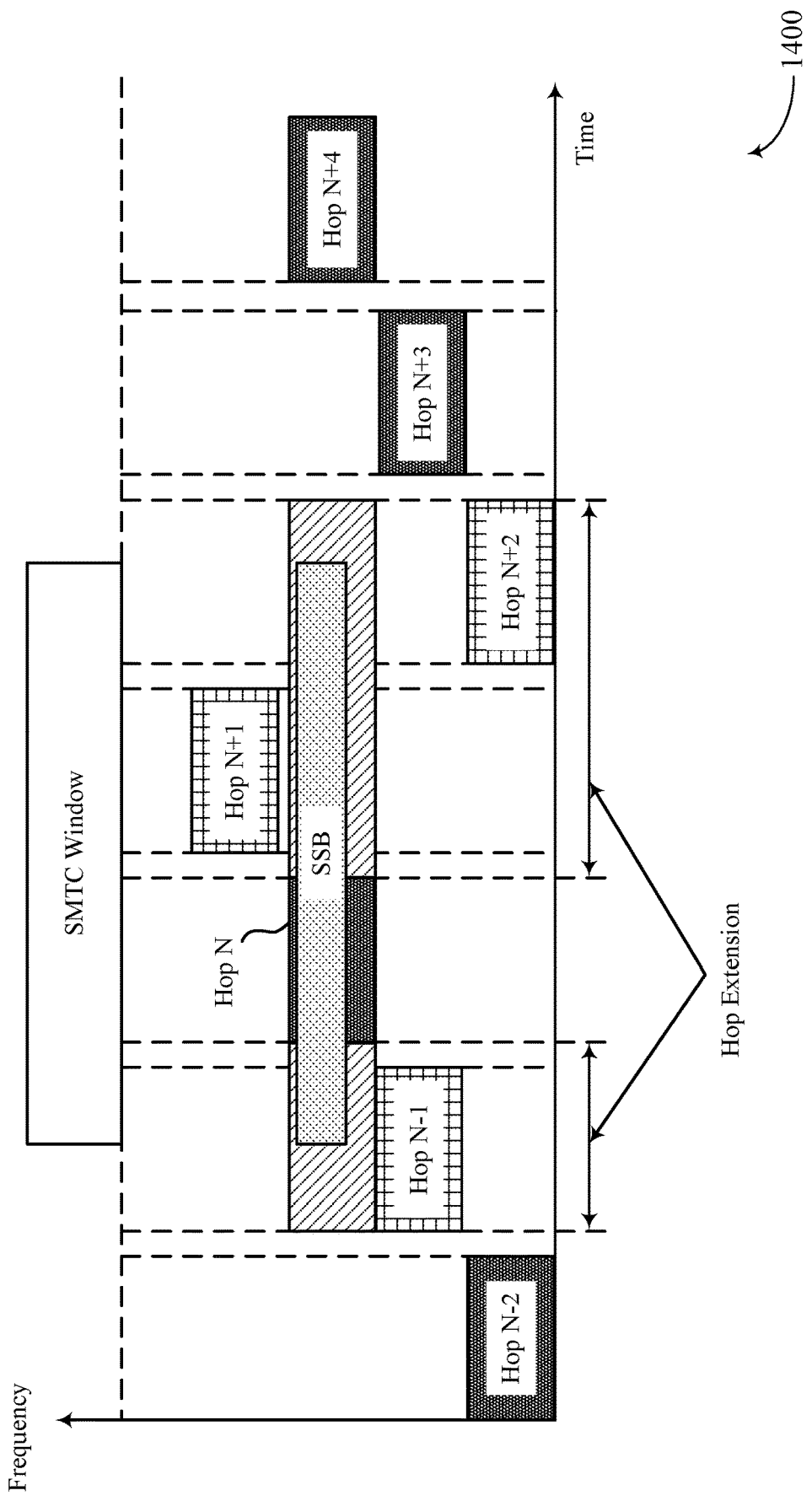

FIG. 14 illustrates an example of a hopping configuration 1400 that supports measurement without gaps for narrow BWP hopping. The hopping configuration 1400 may implement or be implemented by aspects of the wireless communications system 100 or the signaling diagram 200. For example, the hopping configuration 1400 may illustrate example configurations of frequency hops, SSBs, and SMTC windows for communications between a BS 105 and a UE 115. The UE 115 may represent an example of a UE 115 as described herein, including with reference to FIGS. 1-13. The BS 105 may represent an example of a BS 105 as described herein, including with reference to FIGS. 1-13.

In the example of FIG. 14, a duration of one or more hops in a hopping pattern for the UE 115 may be less than an SMTC window duration ($T_{SMTC} > T_{Hop}$). As such, a single SMTC window may partially or completely overlap with two or more hops. For example, the SMTC window illustrated in FIG. 14 may overlap with initial durations of a hop N−1, a hop N, a hop N+1, and a hop N+2 in a hopping pattern for the UE 115. The BS 105 may schedule the SSB within the SMTC window, such that the SSB also overlaps with the hops N−1 through N+2. If the UE 115 is configured to operate according to the hopping pattern and to measure the scheduled SSB within the SMTC window, the UE 115 may hop between one or more hops while measuring the SSB. The UE 115 may not complete a measurement of the SSB due to gap periods associated with the hopping, or due to the active BWPs of one or more hops being different than the bandwidth on which the SSB is scheduled.

To improve the SSB-based measurement and communication reliability, the UE 115 may be configured to extend a duration of the hop N containing the SMTC and the SSB in frequency to include the SMTC window duration. As such, the UE 115 may refrain from hopping during the SMTC window, which may improve measurement accuracy and efficiency.

In some implementations, the UE 115 may be configured to extend the hop duration of the hop N that includes the SSB in frequency until the end of the SMTC window and the beginning of the SMTC window. In the example of FIG. 14, the SSB is scheduled within a frequency of the hop N. As such, the UE 115 may be configured to extend an initial duration of the hop N to a beginning of the SMTC window and an end of the SMTC window. By extending the initial duration of the hop N to include the extension regions illustrated in FIG. 14, the UE 115 may hop to the hop N prior to or at a same time as a beginning boundary of the SMTC window, measure the SSB within the hop N, and hop to a subsequent hop, such as the hop N+3, subsequent to or at the same time as an ending boundary of the SMTC window, which may improve measurement reliability.

The hop boundaries may or may not align with the beginning and ending boundaries of the SMTC window. If the hop boundaries do not align with the SMTC window, the UE 115 may extend the duration of the hop N to a beginning boundary of the hop N−1 that overlaps with a beginning boundary of the SMTC window and to an ending boundary of the hop N+2 that overlaps with an ending boundary of the SMTC window. In such implementations, the UE 115 may be configured to skip one or more of the hop N−1, the hop N+1, and the hop N+2. Instead of hopping to the hop N−1, the hop N+1, and the hop N+2, the UE 115 may remain on the hop N until the UE 115 finishes measuring the SSB. Additionally, or alternatively, the UE 115 may skip the hop N−1, and the UE 115 may be configured to shift the hop N+1, the hop N+2, the hop N+3, the hop N+4, and one or more other hops in the hopping pattern for the UE 115 that are subsequent to the hop N in time. That is, the UE 115 may shift the hopping pattern by a number of hops that overlap with the SMTC window after the hop N.

In some implementations, the SSB may be scheduled to occur in a same frequency as the hop N−1 or another hop that overlaps with or is aligned with the beginning boundary of the SMTC window. In such implementations, the UE 115 may be configured to extend an initial duration of the hop N−1 to the ending boundary of the SMTC window. The UE 115 may skip the following hops overlapping with the SMTC window in time, such as the hop N, the hop N+1, and the hop N+2, or the UE 115 may shift the hopping pattern by the number of subsequent overlapping hops.

In some other implementations, the SSB may be scheduled to occur in a same frequency as the hop N+2 or another hop that overlaps with or is aligned with the ending boundary of the SMTC window. In such implementations, the UE 115 may be configured to extend an initial duration of the hop N+2 to the beginning boundary of the SMTC window. The UE 115 may skip the previous hops overlapping with the SMTC window in time, such as the hop N+1, the hop N, and the hop N−1.

The UE 115 may thereby be configured to extend a duration of a hop that includes the SSB in frequency to include the duration of the SMTC window and the duration of the corresponding SSB. In some implementations, the UE 115 may perform the hop extension in accordance with a configuration. Additionally, or alternatively, the BS 105 may transmit signaling to the UE 115 to dynamically indicate the hop extension duration and whether to skip or shift remaining hops in the hopping pattern. By extending the duration of a hop, the UE 115 may improve measurement of an SSB when an SMTC window overlaps with two or more hops of a hopping pattern for the UE 115.

Figure 15:
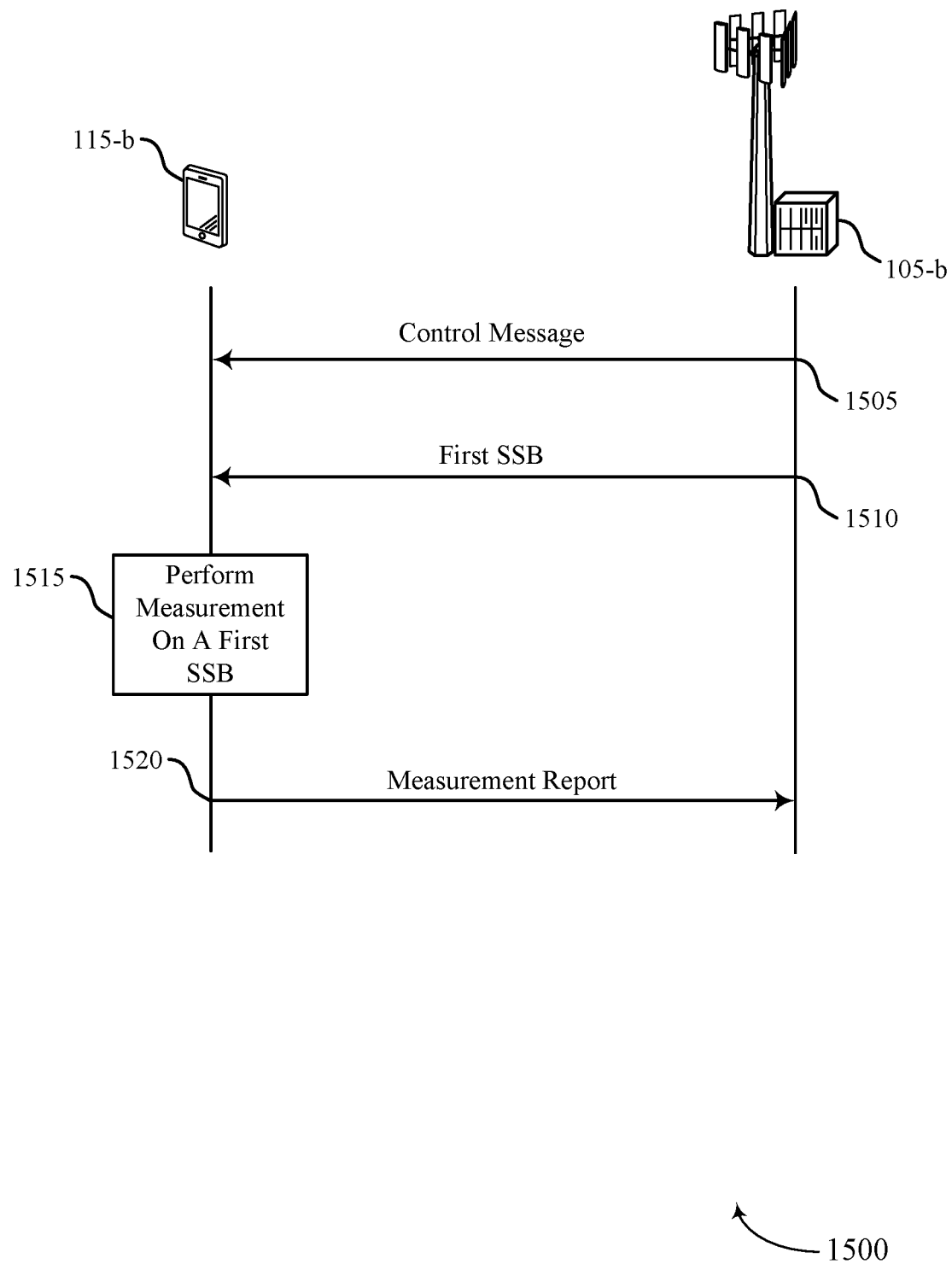
FIG. 15 illustrates an example of a process flow that supports measurement without gaps for narrow BWP hopping.

FIG. 15 illustrates an example of a process flow 1500 that supports measurement without gaps for narrow BWP hopping. The process flow 1500 may implement or be implemented by aspects of the wireless communications system 100 or the signaling diagram 200. For example, the process flow 1500 may illustrate communications between a BS 105-*b* (for example, a network entity) and a UE 115-*b*. The UE 115-*b* may represent an example of a UE 115 as described herein, including with reference to FIGS. 1-14. The BS 105-*b* may represent an example of a BS 105 as described herein, including with reference to FIGS. 1-14.

In the following description of the process flow 1500, the operations may be performed in a different order than the order shown, or the operations performed by the UE 115-*b* and the BS 105-*b* may be performed in different orders or at different times. For example, specific operations also may be left out of the process flow 1500, or other operations may be added to the process flow 1500. Although the UE 115-*b* and the BS 105-*b* are shown performing the operations of the process flow 1500, some aspects of some operations also may be performed by one or more other wireless devices.

At 1505, the BS 105-*b* may transmit at least one control message to the UE 115-*b*. The at least one control message may indicate an active BWP for the UE, a set of measurement windows (an SMTC duration and periodicity), a hopping pattern associated with the active BWP, and a set of SSBs occurring within a set of frequency hops of the hopping pattern. The at least one control message may additionally indicate an SMTC duration, periodicity, and offset associated with the set of measurement windows and a quantity, duration, and periodicity of the set of frequency hops of the hopping pattern for the UE 115-*b*.

At 1510, the BS 105-*b* may transmit a first SSB of the set of SSBs to the UE 115-*b* within a first frequency hop of the set of frequency hops during a first measurement window of the set of measurement windows. The BS 105-*b* may transmit, and the UE 115-*b* may receive, the first SSB within the first frequency hop and during the first measurement window in accordance with the at least one control message. At 1515, the UE 115-*b* may perform measurement of the first SSB within the first frequency hop during the first measurement window. The UE 115-*b* may obtain one or more of an RSRP measurement, an RSRQ measurement, or an SINR measurement of the first SSB.

At 1520, the UE 115-*b* may transmit a measurement report to the BS 105-*b*. The measurement report may be associated with, based on, or in response to the measurement of the first SSB. In some implementations, the measurement report may include measurement information associated with the first SSB and one or more other SSBs of the set of SSBs.

Figure 16:
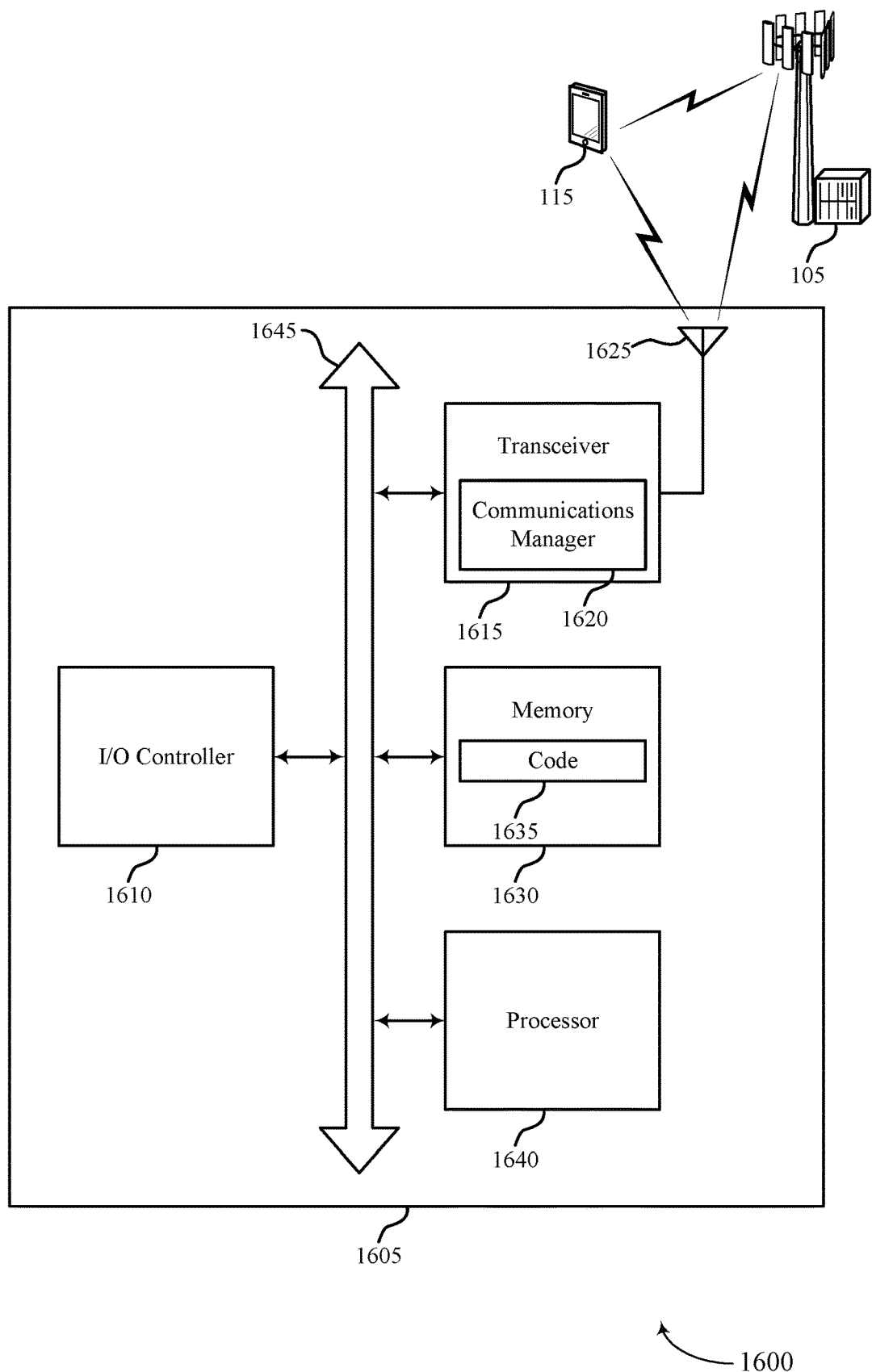
FIG. 16 shows a diagram of an example system including a device that supports measurement without gaps for narrow BWP hopping.

FIG. 16 shows a diagram of an example system 1600 including a device 1605 that supports measurement without gaps for narrow BWP hopping. The device 1605 may communicate wirelessly with one or more BSs 105, UEs 115, or any combination thereof. The device 1605 may include components for bi-directional voice and data communications including components for transmitting and receiving communications, such as a communications manager 1620, an input/output (I/O) controller 1610, a transceiver 1615, an antenna 1625, a memory 1630, code 1635, and a processor 1640. These components may be in electronic communication or otherwise coupled (for example, operatively, communicatively, functionally, electronically, electrically) via one or more buses, such as a bus 1645.

The I/O controller 1610 may manage input and output signals for the device 1605. The I/O controller 1610 also may manage peripherals not integrated into the device 1605. In some implementations, the I/O controller 1610 may represent a physical connection or port to an external peripheral. In some implementations, the I/O controller 1610 may utilize an operating system such as iOS®, ANDROID®, MS-DOS®, MS-WINDOWS®, OS/2®, UNIX®, LINUX®, or another known operating system. Additionally, or alternatively, the I/O controller 1610 may represent or interact with a modem, a keyboard, a mouse, a touchscreen, or a similar device. In some implementations, the I/O controller 1610 may be implemented as part of a processor or processing system, such as the processor 1640. In some implementations, a user may interact with the device 1605 via the I/O controller 1610 or via hardware components controlled by the I/O controller 1610.

In some implementations, the device 1605 may include a single antenna 1625. However, in some other implementations, the device 1605 may have more than one antenna 1625, which may be capable of concurrently transmitting or receiving multiple wireless transmissions. The transceiver 1615 may communicate bi-directionally, via the one or more antennas 1625, wired, or wireless links as described herein. For example, the transceiver 1615 may represent a wireless transceiver and may communicate bi-directionally with another wireless transceiver. The transceiver 1615 also may include a modem to modulate the packets, to provide the modulated packets to one or more antennas 1625 for transmission, and to demodulate packets received from the one or more antennas 1625. In some implementations, the transceiver 1615 may include one or more interfaces, such as one or more interfaces coupled with the one or more antennas 1625 that are configured to support various receiving or obtaining operations, or one or more interfaces coupled with the one or more antennas 1625 that are configured to support various transmitting or outputting operations, or a combination thereof. In some implementations, the transceiver 1615 may include or be configured for coupling with one or more processors or memory components that are operable to perform or support operations in accordance with received or obtained information or signals, or to generate information or other signals for transmission or other outputting, or any combination thereof. In some implementations, the transceiver 1615, or the transceiver 1615 and the one or more antennas 1625, or the transceiver 1615 and the one or more antennas 1625 and one or more processors or memory components (for example, the processor 1640, or the memory 1630, or both), may be included in a chip or chip assembly that is installed in the device 1605.

The memory 1630 may include random access memory (RAM) and read-only memory (ROM). The memory 1630 may store computer-readable, computer-executable code 1635 including instructions that, when executed by the processor 1640, cause the device 1605 to perform various functions described herein. The code 1635 may be stored in a non-transitory computer-readable medium such as system memory or another type of memory. In some implementations, the code 1635 may not be directly executable by the processor 1640 but may cause a computer (for example, when compiled and executed) to perform functions described herein. In some implementations, the memory 1630 may contain, among other things, a basic I/O system (BIOS) which may control basic hardware or software operation such as the interaction with peripheral components or devices.

The processor 1640 may be any one or more suitable processors capable of executing scripts or instructions of one or more software programs stored in the device 1605 (such as within the memory 1630). In some implementations, the processor 1640 may be a component of a processing system. A processing system may generally refer to a system or series of machines or components that receives inputs and processes the inputs to produce a set of outputs (which may be passed to other systems or components of, for example, the device 1605). For example, a processing system of the device 1605 may refer to a system including the various other components or subcomponents of the device 1605, such as the processor 1640, or the transceiver 1615, or the communications manager 1620, or other components or combinations of components of the device 1605. The processing system of the device 1605 may interface with other components of the device 1605, and may process information received from other components (such as inputs or signals) or output information to other components. For example, a chip or modem of the device 1605 may include a processing system, a first interface to output information, and a second interface to obtain information. In some implementations, the first interface may refer to an interface between the processing system of the chip or modem and a transmitter, such that the device 1605 may transmit information output from the chip or modem. In some implementations, the second interface may refer to an interface between the processing system of the chip or modem and a receiver, such that the device 1605 may obtain information or signal inputs, and the information may be passed to the processing system. A person having ordinary skill in the art will readily recognize that the first interface also may obtain information or signal inputs, and the second interface also may output information or signal outputs.

The communications manager 1620 may support wireless communication at a UE in accordance with examples as disclosed herein. For example, the communications manager 1620 may be configured as or otherwise support a means for receiving at least one control message indicating an active BWP for the UE, a set of multiple measurement windows, a hopping pattern associated with the active BWP, and a set of multiple SSBs occurring within a set of multiple frequency hops of the hopping pattern. The communications manager 1620 may be configured as or otherwise support a means for performing measurement on a first SSB of the set of multiple SSBs within a first frequency hop of the set of multiple frequency hops during a first measurement window of the set of multiple measurement windows. The communications manager 1620 may be configured as or otherwise support a means for transmitting a measurement report associated with the measurement of the first SSB.

In some implementations, to receive the at least one control message, the communications manager 1620 may be configured as or otherwise support a means for receiving the at least one control message indicating that the set of multiple frequency hops occur within a bandwidth of the active BWP.

In some implementations, to receive the at least one control message, the communications manager 1620 may be configured as or otherwise support a means for receiving the at least one control message indicating that the active BWP includes the first frequency hop in which the first SSB may be scheduled.

In some implementations, to receive the at least one control message, the communications manager 1620 may be configured as or otherwise support a means for receiving the at least one control message scheduling each SSB of the set of multiple SSBs within a different frequency hop of the hopping pattern that each occur within a respective measurement window of the set of multiple measurement windows.

In some implementations, the communications manager 1620 may be configured as or otherwise support a means for performing measurements on each SSB of the set of multiple SSBs at each occurrence of the first frequency hop within the hopping pattern during each measurement window of the set of multiple measurement windows, where the hopping pattern includes a periodic hopping pattern.

In some implementations the communications manager 1620 may be configured as or otherwise support a means for performing measurements on each SSB of the set of multiple SSBs at each occurrence of the first frequency hop within the hopping pattern during each measurement window of the set of multiple measurement windows, where the hopping pattern includes a random hopping pattern or a pseudo random hopping pattern.

In some implementations, to receive the at least one control message, the communications manager 1620 may be configured as or otherwise support a means for receiving the at least one control message indicating the hopping pattern that includes a first hopping pattern that indicates to hop to the first frequency hop during each of the set of multiple measurement windows, and the random hopping pattern or the pseudo random hopping pattern that indicates to randomly hop or pseudo randomly hop for hops outside of the set of multiple measurement windows.

In some implementations the communications manager 1620 may be configured as or otherwise support a means for performing measurement on the first SSB within the first frequency hop during a second measurement window of the set of multiple measurement windows, where at least the first measurement window and the second measurement window occur within a duration of the first frequency hop and performing measurement on a second SSB of the set of multiple SSBs within a second frequency hop of the set of multiple frequency hops during a third measurement window and a fourth measurement window of the set of multiple measurement windows, where at least the third measurement window and the fourth measurement window occur within a duration of the second frequency hop.

In some implementations, the at least one control message indicates a QCL relationship between the set of multiple SSBs.

In some implementations, each frequency hop of the hopping pattern may be aligned with a beginning boundary, or an ending boundary, or both of a respective measurement window of the set of multiple measurement windows.

In some implementations the communications manager 1620 may be configured as or otherwise support a means for performing measurement on the first SSB within the first frequency hop having a duration that may be extended to an ending boundary of the first measurement window based on at least a portion of the first SSB being scheduled outside of an initial duration of the first frequency hop, where an ending boundary of the initial duration of the first frequency hop occurs prior to the ending boundary of the first measurement window in time, and where the extended duration of the first frequency hop may be greater than or equal to a duration of the first measurement window.

In some implementations the communications manager 1620 may be configured as or otherwise support a means for performing measurement on the first SSB within the first frequency hop having a duration that may be extended to an ending boundary of a second frequency hop of the set of multiple frequency hops that may be subsequent to the first frequency hop in the hopping pattern based on at least a portion of the first SSB being scheduled outside of an initial duration of the first frequency hop, where the extended duration of the first frequency hop may be greater than or equal to a duration of the first measurement window.

In some implementations the communications manager 1620 may be configured as or otherwise support a means for performing measurement on the first SSB within the first frequency hop having a duration that may be extended to a beginning boundary of the first measurement window based on at least a portion of the first SSB being scheduled outside of an initial duration of the first frequency hop, where a beginning boundary of the initial duration of the first frequency hop occurs subsequent to the beginning boundary of the first measurement window in time, and where the extended duration of the first frequency hop may be greater than or equal to a duration of the first measurement window.

In some implementations the communications manager 1620 may be configured as or otherwise support a means for performing measurement on the first SSB within the first frequency hop having a duration that may be extended to a beginning boundary of a second frequency hop of the set of multiple frequency hops that may be prior to the first frequency hop in the hopping pattern based on at least a portion of the first SSB being scheduled outside of an initial duration of the first frequency hop, where the extended duration of the first frequency hop may be greater than or equal to a duration of the first measurement window.

In some implementations the communications manager 1620 may be configured as or otherwise support a means for performing measurement on the first SSB within the first frequency hop having a duration that may be extended to an ending boundary of the first measurement window based on at least a portion of the first SSB being scheduled within an initial duration of the first frequency hop and the initial duration of the first frequency hop overlapping or aligning with a beginning boundary of the first measurement window, where the initial duration of the first frequency hop may be less than a duration of the first measurement window.

In some implementations the communications manager 1620 may be configured as or otherwise support a means for performing measurement on the first SSB within the first frequency hop having a duration that may be extended to a beginning boundary of the first measurement window based on at least a portion of the first SSB being scheduled within an initial duration of the first frequency hop and the initial duration of the first frequency hop overlapping or aligning with an ending boundary of the first measurement window, where the initial duration of the first frequency hop may be less than a duration of the first measurement window.

In some implementations the communications manager 1620 may be configured as or otherwise support a means for performing measurement on the first SSB within the first frequency hop having a duration that may be extended to a beginning boundary and an ending boundary of the first measurement window based on at least a portion of the first SSB being scheduled within a frequency including the first frequency hop, where an initial duration of the first frequency hop may be less than a duration of the first measurement window.

In some implementations the communications manager 1620 may be configured as or otherwise support a means for transmitting a UE capability report indicating support for a frequency hopping measurement configuration and receiving the at least one control message indicating the set of multiple SSBs each scheduled within a respective frequency hop of the hopping pattern that each occur within a respective measurement window of the set of multiple measurement windows in accordance with the UE capability report.

In some implementations, the communications manager 1620 may be configured to perform various operations (for example, receiving, monitoring, transmitting) using or otherwise in cooperation with the transceiver 1615, the one or more antennas 1625, or any combination thereof. Although the communications manager 1620 is illustrated as a separate component, in some implementations, one or more functions described with reference to the communications manager 1620 may be supported by or performed by the processor 1640, the memory 1630, the code 1635, or any combination thereof. For example, the code 1635 may include instructions executable by the processor 1640 to cause the device 1605 to perform various aspects of measurement without gaps for narrow BWP hopping as described herein, or the processor 1640 and the memory 1630 may be otherwise configured to perform or support such operations.

Figure 17:
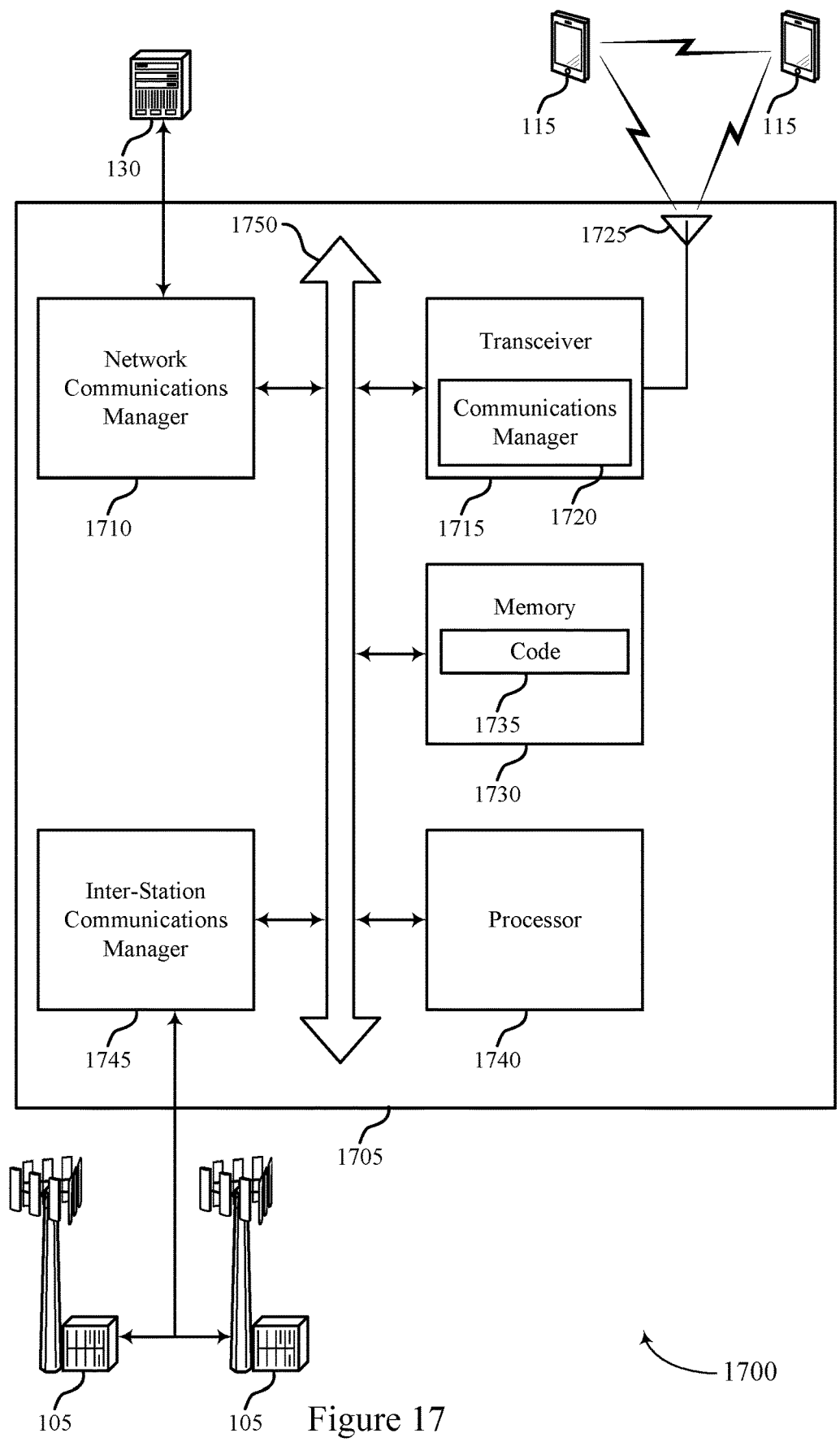
FIG. 17 shows a diagram of an example system including a device that supports measurement without gaps for narrow BWP hopping.

FIG. 17 shows a diagram of an example system 1700 including a device 1705 that supports measurement without gaps for narrow BWP hopping. The device 1705 may communicate wirelessly with one or more BSs 105, UEs 115, or any combination thereof. The device 1705 may include components for bi-directional voice and data communications including components for transmitting and receiving communications, such as a communications manager 1720, a network communications manager 1710, a transceiver 1715, an antenna 1725, a memory 1730, code 1735, a processor 1740, and an inter-station communications manager 1745. These components may be in electronic communication or otherwise coupled (operatively, communicatively, functionally, electronically, electrically) via one or more buses, such as a bus 1750). In some implementations, the device 1705 may be illustrative of one or more aspects of a network entity.

The network communications manager 1710 may manage communications with a core network 130 (for example, via one or more wired backhaul links). For example, the network communications manager 1710 may manage the transfer of data communications for client devices, such as one or more UEs 115.

In some implementations, the device 1705 may include a single antenna 1725. However, in some other implementations, the device 1705 may have more than one antenna 1725, which may be capable of concurrently transmitting or receiving multiple wireless transmissions. The transceiver 1715 may communicate bi-directionally, via the one or more antennas 1725, wired, or wireless links as described herein. For example, the transceiver 1715 may represent a wireless transceiver and may communicate bi-directionally with another wireless transceiver. The transceiver 1715 also may include a modem to modulate the packets, to provide the modulated packets to one or more antennas 1725 for transmission, and to demodulate packets received from the one or more antennas 1725. In some implementations, the transceiver 1715 may include one or more interfaces, such as one or more interfaces coupled with the one or more antennas 1725 that are configured to support various receiving or obtaining operations, or one or more interfaces coupled with the one or more antennas 1725 that are configured to support various transmitting or outputting operations, or a combination thereof. In some implementations, the transceiver 1715 may include or be configured for coupling with one or more processors or memory components that are operable to perform or support operations in accordance with received or obtained information or signals, or to generate information or other signals for transmission or other outputting, or any combination thereof. In some implementations, the transceiver 1715, or the transceiver 1715 and the one or more antennas 1725, or the transceiver 1715 and the one or more antennas 1725 and one or more processors or memory components (for example, the processor 1740, or the memory 1730, or both), may be included in a chip or chip assembly that is installed in the device 1705.

The memory 1730 may include RAM and ROM. The memory 1730 may store computer-readable, computer-executable code 1735 including instructions that, when executed by the processor 1740, cause the device 1705 to perform various functions described herein. The code 1735 may be stored in a non-transitory computer-readable medium such as system memory or another type of memory. In some implementations, the code 1735 may not be directly executable by the processor 1740 but may cause a computer (for example, when compiled and executed) to perform functions described herein. In some implementations, the memory 1730 may contain, among other things, a BIOS which may control basic hardware or software operation such as the interaction with peripheral components or devices.

The processor 1740 may be any one or more suitable processors capable of executing scripts or instructions of one or more software programs stored in the device 1705 (such as within the memory 1730). In some implementations, the processor 1740 may be a component of a processing system. A processing system may generally refer to a system or series of machines or components that receives inputs and processes the inputs to produce a set of outputs (which may be passed to other systems or components of, for example, the device 1705). For example, a processing system of the device 1705 may refer to a system including the various other components or subcomponents of the device 1705, such as the processor 1740, or the transceiver 1715, or the communications manager 1720, or other components or combinations of components of the device 1705. The processing system of the device 1705 may interface with other components of the device 1705, and may process information received from other components (such as inputs or signals) or output information to other components. For example, a chip or modem of the device 1705 may include a processing system, a first interface to output information, and a second interface to obtain information. In some implementations, the first interface may refer to an interface between the processing system of the chip or modem and a transmitter, such that the device 1705 may transmit information output from the chip or modem. In some implementations, the second interface may refer to an interface between the processing system of the chip or modem and a receiver, such that the device 1705 may obtain information or signal inputs, and the information may be passed to the processing system. A person having ordinary skill in the art will readily recognize that the first interface also may obtain information or signal inputs, and the second interface also may output information or signal outputs.

The inter-station communications manager 1745 may manage communications with other BSs 105, and may include a controller or scheduler for controlling communications with UEs 115 in cooperation with other BSs 105. For example, the inter-station communications manager 1745 may coordinate scheduling for transmissions to UEs 115 for various interference mitigation techniques such as beamforming or joint transmission. In some implementations, the inter-station communications manager 1745 may provide an X2 interface within an LTE/LTE-A wireless communications network technology to provide communication between BSs 105.

The communications manager 1720 may support wireless communication at a network entity in accordance with examples as disclosed herein. For example, the communications manager 1720 may be configured as or otherwise support a means for transmitting, to a UE at least one control message indicating an active BWP for the UE, a set of multiple measurement windows, a hopping pattern associated with the active BWP, and a set of multiple SSBs respectively occurring within a set of multiple frequency hops of the hopping pattern. The communications manager 1720 may be configured as or otherwise support a means for transmitting, to the UE, a first SSB of the set of multiple SSBs within a first frequency hop of the set of multiple frequency hops during a first measurement window of the set of multiple measurement windows. The communications manager 1720 may be configured as or otherwise support a means for receiving, from the UE, a measurement report associated with the transmitting of the first SSB.

In some implementations, to transmit the at least one control message, the communications manager 1720 may be configured as or otherwise support a means for transmitting the at least one control message indicating that the set of multiple frequency hops occur within a bandwidth of the active BWP.

In some implementations, to transmit the at least one control message, the communications manager 1720 may be configured as or otherwise support a means for transmitting the at least one control message indicating that the active BWP includes the first frequency hop in which the first SSB may be scheduled.

In some implementations, to transmit the at least one control message, the communications manager 1720 may be configured as or otherwise support a means for transmitting the at least one control message scheduling each SSB of the set of multiple SSBs within a different frequency hop of the hopping pattern that each occur within a respective measurement window of the set of multiple measurement windows.

In some implementations the communications manager 1720 may be configured as or otherwise support a means for transmitting each SSB of the set of multiple SSBs at each occurrence of the first frequency hop within the hopping pattern during each measurement window of the set of multiple measurement windows, where the hopping pattern includes a periodic hopping pattern.

In some implementations the communications manager 1720 may be configured as or otherwise support a means for transmitting each SSB of the set of multiple SSBs at each occurrence of the first frequency hop within the hopping pattern during each measurement window of the set of multiple measurement windows, where the hopping pattern includes a random hopping pattern or a pseudo random hopping pattern.

In some implementations, to transmit the at least one control message, the communications manager 1720 may be configured as or otherwise support a means for transmitting the at least one control message indicating the hopping pattern includes a first hopping pattern that that indicates to hop to the first frequency hop during each of the set of multiple measurement windows, and the random hopping pattern or the pseudo random hopping pattern that indicates to randomly hop or pseudo randomly hop for hops outside of the set of multiple measurement windows.

In some implementations the communications manager 1720 may be configured as or otherwise support a means for transmitting the first SSB within the first frequency hop during a second measurement window of the set of multiple measurement windows, where at least the first measurement window and the second measurement window occur within a duration of the first frequency hop and transmitting a second SSB of the set of multiple SSBs within a second frequency hop of the set of multiple frequency hops during a third measurement window and a fourth measurement window of the set of multiple measurement windows, where at least the third measurement window and the fourth measurement window occur within a duration of the second frequency hop.

In some implementations, the communications manager 1720 may be configured to perform various operations (for example, receiving, monitoring, transmitting) using or otherwise in cooperation with the transceiver 1715, the one or more antennas 1725, or any combination thereof. Although the communications manager 1720 is illustrated as a separate component, in some implementations, one or more functions described with reference to the communications manager 1720 may be supported by or performed by the processor 1740, the memory 1730, the code 1735, or any combination thereof. For example, the code 1735 may include instructions executable by the processor 1740 to cause the device 1705 to perform various aspects of measurement without gaps for narrow BWP hopping as described herein, or the processor 1740 and the memory 1730 may be otherwise configured to perform or support such operations.

Figure 18:
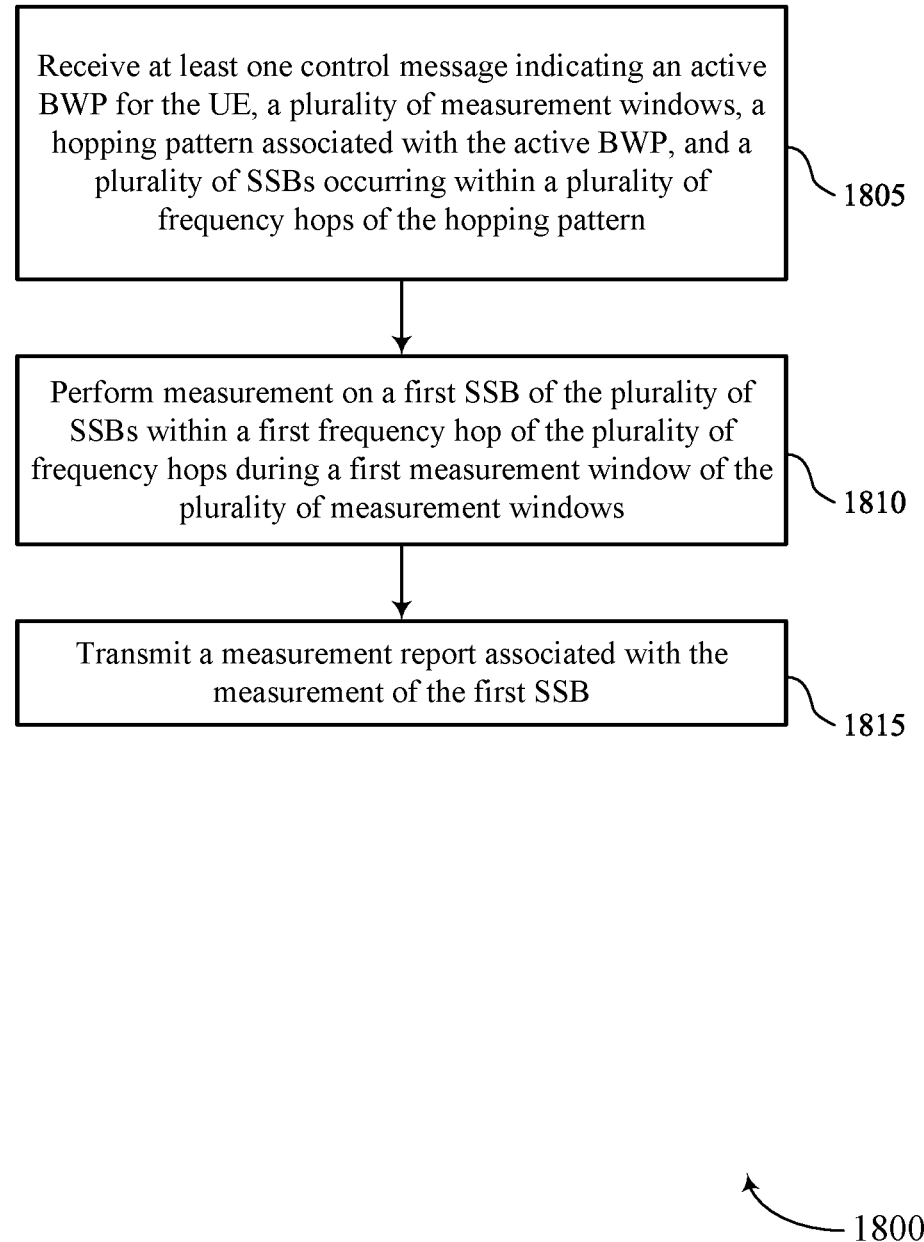
FIGS. 18 and 19 show flowcharts illustrating example methods that support measurement without gaps for narrow BWP hopping.

FIG. 18 shows a flowchart illustrating an example method 1800 that supports measurement without gaps for narrow BWP hopping. The operations of the method 1800 may be implemented by a UE or its components as described herein. For example, the operations of the method 1800 may be performed by a UE 115 as described with reference to FIGS. 1-16. In some implementations, a UE may execute a set of instructions to control the functional elements of the UE to perform the described functions. Additionally, or alternatively, the UE may perform aspects of the described functions using special-purpose hardware.

At 1805, the method may include receiving at least one control message indicating an active BWP for the UE, a set of multiple measurement windows, a hopping pattern associated with the active BWP, and a set of multiple SSBs occurring within a set of multiple frequency hops of the hopping pattern. The operations of 1805 may be performed in accordance with examples as disclosed herein.

At 1810, the method may include performing measurement on a first SSB of the set of multiple SSBs within a first frequency hop of the set of multiple frequency hops during a first measurement window of the set of multiple measurement windows. The operations of 1810 may be performed in accordance with examples as disclosed herein.

At 1815, the method may include transmitting a measurement report associated with the measurement of the first SSB. The operations of 1815 may be performed in accordance with examples as disclosed herein.

Figure 19:
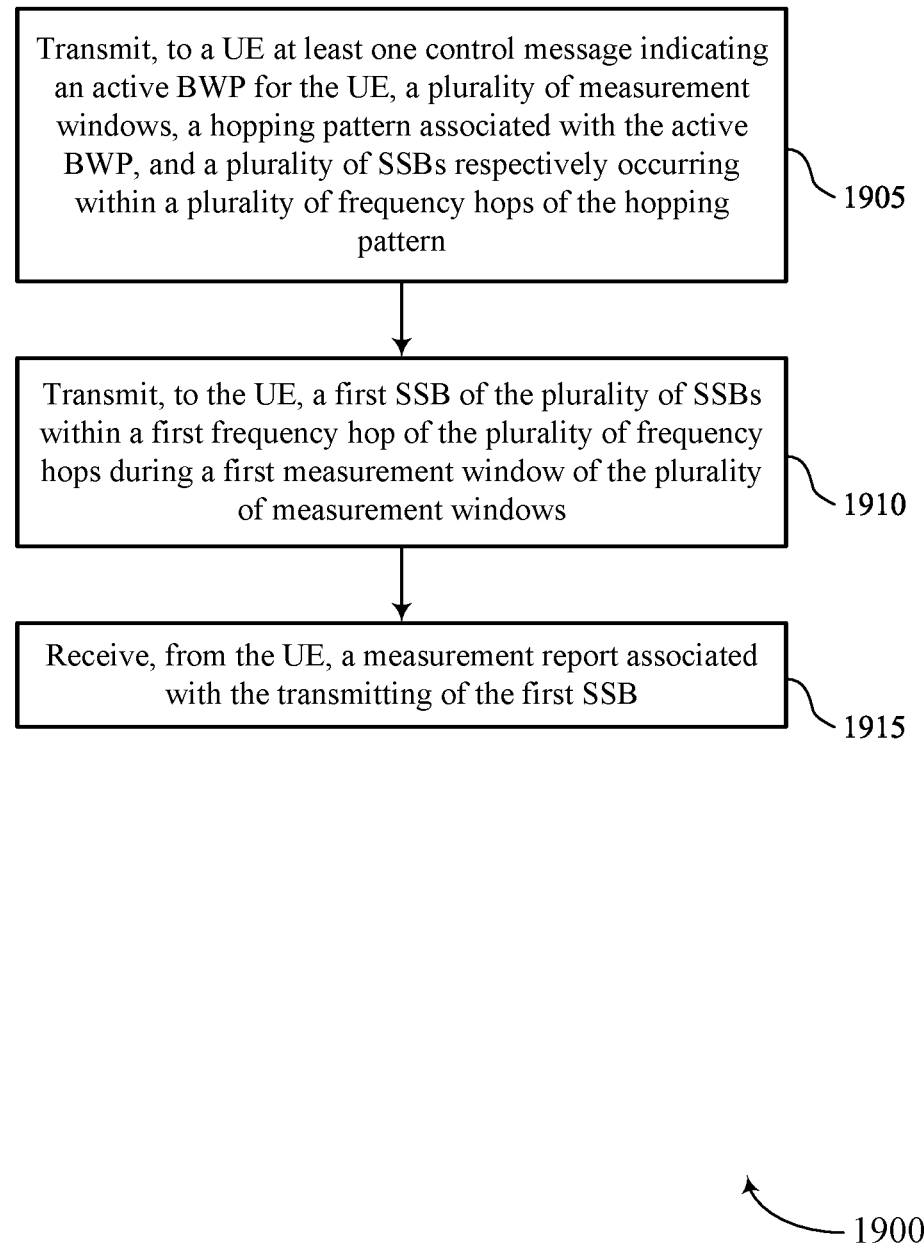

FIG. 19 shows a flowchart illustrating an example method 1900 that supports measurement without gaps for narrow BWP hopping. The operations of the method 1900 may be implemented by a network entity, such as a BS, or its components as described herein. For example, the operations of the method 1900 may be performed by a BS 105 as described with reference to FIGS. 1-15 and 17. In some implementations, a BS may execute a set of instructions to control the functional elements of the network entity to perform the described functions. Additionally, or alternatively, the network entity may perform aspects of the described functions using special-purpose hardware.

At 1905, the method may include transmitting, to a UE at least one control message indicating an active BWP for the UE, a set of multiple measurement windows, a hopping pattern associated with the active BWP, and a set of multiple SSBs respectively occurring within a set of multiple frequency hops of the hopping pattern. The operations of 1905 may be performed in accordance with examples as disclosed herein.

At 1910, the method may include transmitting, to the UE, a first SSB of the set of multiple SSBs within a first frequency hop of the set of multiple frequency hops during a first measurement window of the set of multiple measurement windows. The operations of 1910 may be performed in accordance with examples as disclosed herein.

At 1915, the method may include receiving, from the UE, a measurement report associated with the transmitting of the first SSB. The operations of 1915 may be performed in accordance with examples as disclosed herein.

The following provides an overview of some aspects of the present disclosure:

Aspect 1: An apparatus for wireless communication at a UE, including: a first interface configured to: obtain at least one control message indicate an active BWP for the UE, a set of multiple measurement windows, a hop pattern associated with the active BWP, and a set of multiple SSBs occur within a set of multiple frequency hops of the hopping pattern; a processing system configured to: perform measurement on a first SSB of the set of multiple SSBs within a first frequency hop of the set of multiple frequency hops during a first measurement window of the set of multiple measurement windows; and the first interface or a second interface configured to: output a measurement report associated with the measurement of the first SSB.

Aspect 2: The apparatus of aspect 1, to obtain the at least one control message, the first interface is further configured to: obtain the at least one control message indicating that the set of multiple frequency hops occur within a bandwidth of the active BWP.

Aspect 3: The apparatus of aspect 1, where to obtain the at least one control message, the first interface is further configured to: obtain the at least one control message indicating that the active BWP includes the first frequency hop in which the first SSB is scheduled.

Aspect 4: The apparatus of any of aspects 1 through 3, to obtain the at least one control message, the first interface is further configured to: obtain the at least one control message scheduling each SSB of the set of multiple SSBs within a different frequency hop of the hopping pattern that each occur within a respective measurement window of the set of multiple measurement windows.

Aspect 5: The apparatus of any of aspects 1 through 3, where the processing system is further configured to: perform measurements on each SSB of the set of multiple SSBs at each occurrence of the first frequency hop within the hopping pattern during each measurement window of the set of multiple measurement windows, where the hopping pattern includes a periodic hopping pattern.

Aspect 6: The apparatus of any of aspects 1 through 3, where the processing system is further configured to: perform measurements on each SSB of the set of multiple SSBs at each occurrence of the first frequency hop within the hopping pattern during each measurement window of the set of multiple measurement windows, where the hopping pattern includes a random hopping pattern or a pseudo random hopping pattern.

Aspect 7: The apparatus of aspect 6, where to obtain the at least one control message, the first interface is further configured to: obtain the at least one control message indicating the hopping pattern that includes a first hopping pattern that indicates to hop to the first frequency hop during each of the set of multiple measurement windows, and the random hopping pattern or the pseudo random hopping pattern that indicates to randomly hop or pseudo randomly hop for hops outside of the set of multiple measurement windows.

Aspect 8: The apparatus of any of aspects 1 through 3, where the processing system is further configured to: perform measurement on the first SSB within the first frequency hop during a second measurement window of the set of multiple measurement windows, where at least the first measurement window and the second measurement window occur within a duration of the first frequency hop; and perform measurement on a second SSB of the set of multiple SSBs within a second frequency hop of the set of multiple frequency hops during a third measurement window and a fourth measurement window of the set of multiple measurement windows, where at least the third measurement window and the fourth measurement window occur within a duration of the second frequency hop.

Aspect 9: The apparatus of any of aspects 1 through 8, where the at least one control message indicates a QCL relationship between the set of multiple SSBs.

Aspect 10: The apparatus of any of aspects 1 through 9, where each frequency hop of the hopping pattern is aligned with a beginning boundary, or an ending boundary, or both of a respective measurement window of the set of multiple measurement windows.

Aspect 11: The apparatus of any of aspects 1 through 9, where the processing system is further configured to: perform measurement on the first SSB within the first frequency hop having a duration that is extended to an ending boundary of the first measurement window based on at least a portion of the first SSB being scheduled outside of an initial duration of the first frequency hop, where an ending boundary of the initial duration of the first frequency hop occurs prior to the ending boundary of the first measurement window in time, and where the extended duration of the first frequency hop is greater than or equal to a duration of the first measurement window.

Aspect 12: The apparatus of any of aspects 1 through 9, where the processing system is further configured to: perform measurement on the first SSB within the first frequency hop having a duration that is extended to an ending boundary of a second frequency hop of the set of multiple frequency hops that is subsequent to the first frequency hop in the hopping pattern based on at least a portion of the first SSB being scheduled outside of an initial duration of the first frequency hop, where the extended duration of the first frequency hop is greater than or equal to a duration of the first measurement window.

Aspect 13: The apparatus of any of aspects 1 through 9, where the processing system is further configured to: perform measurement on the first SSB within the first frequency hop having a duration that is extended to a beginning boundary of the first measurement window based on at least a portion of the first SSB being scheduled outside of an initial duration of the first frequency hop, where a beginning boundary of the initial duration of the first frequency hop occurs subsequent to the beginning boundary of the first measurement window in time, and where the extended duration of the first frequency hop is greater than or equal to a duration of the first measurement window.

Aspect 14: The apparatus of any of aspects 1 through 9, where the processing system is further configured to: perform measurement on the first SSB within the first frequency hop having a duration that is extended to a beginning boundary of a second frequency hop of the set of multiple frequency hops that is prior to the first frequency hop in the hopping pattern based on at least a portion of the first SSB being scheduled outside of an initial duration of the first frequency hop, where the extended duration of the first frequency hop is greater than or equal to a duration of the first measurement window.

Aspect 15: The apparatus of any of aspects 1 through 9, where the processing system is further configured to: perform measurement on the first SSB within the first frequency hop having a duration that is extended to an ending boundary of the first measurement window based on at least a portion of the first SSB being scheduled within an initial duration of the first frequency hop and the initial duration of the first frequency hop overlapping or aligning with a beginning boundary of the first measurement window, where the initial duration of the first frequency hop is less than a duration of the first measurement window.

Aspect 16: The apparatus of any of aspects 1 through 9, where the processing system is further configured to: perform measurement on the first SSB within the first frequency hop having a duration that is extended to a beginning boundary of the first measurement window based on at least a portion of the first SSB being scheduled within an initial duration of the first frequency hop and the initial duration of the first frequency hop overlapping or aligning with an ending boundary of the first measurement window, where the initial duration of the first frequency hop is less than a duration of the first measurement window.

Aspect 17: The apparatus of any of aspects 1 through 9, where the processing system is further configured to: perform measurement on the first SSB within the first frequency hop having a duration that is extended to a beginning boundary and an ending boundary of the first measurement window based on at least a portion of the first SSB being scheduled within a frequency including the first frequency hop, where an initial duration of the first frequency hop is less than a duration of the first measurement window.

Aspect 18: The apparatus of any of aspects 1 through 17, where the first interface or the second interface is further configured to: output a UE capability report indicating support for a frequency hopping measurement configuration; and obtain the at least one control message indicating the set of multiple SSBs each scheduled within a respective frequency hop of the hopping pattern that each occur within a respective measurement window of the set of multiple measurement windows in accordance with the UE capability report.

Aspect 19: An apparatus for wireless communication at a network entity, including: a first interface configured to: output, to a UE: at least one control message indicate an active BWP for the UE, a set of multiple measurement windows, a hop pattern associated with the active BWP, and a set of multiple SSBs respectively occur within a set of multiple frequency hops of the hopping pattern; output, to the UE, a first SSB of the set of multiple SSBs within a first frequency hop of the set of multiple frequency hops during a first measurement window of the set of multiple measurement windows; and the first interface or a second interface configured to: obtain, from the UE, a measurement report associated with the transmitting of the first SSB.

Aspect 20: The apparatus of aspect 19, where to output the at least one control message, the first interface is further configured to: output the at least one control message indicating that the set of multiple frequency hops occur within a bandwidth of the active BWP.

Aspect 21: The apparatus of aspect 19, where to output the at least one control message, the first interface is further configured to: output the at least one control message indicating that the active BWP includes the first frequency hop in which the first SSB is scheduled.

Aspect 22: The apparatus of any of aspects 19 through 21, where to output the at least one control message, the first interface is further configured to: output the at least one control message scheduling each SSB of the set of multiple SSBs within a different frequency hop of the hopping pattern that each occur within a respective measurement window of the set of multiple measurement windows.

Aspect 23: The apparatus of any of aspects 19 through 21, where the first interface is further configured to: output each SSB of the set of multiple SSBs at each occurrence of the first frequency hop within the hopping pattern during each measurement window of the set of multiple measurement windows, where the hopping pattern includes a periodic hopping pattern.

Aspect 24: The apparatus of any of aspects 19 through 21, where the first interface is further configured to: output each SSB of the set of multiple SSBs at each occurrence of the first frequency hop within the hopping pattern during each measurement window of the set of multiple measurement windows, where the hopping pattern includes a random hopping pattern or a pseudo random hopping pattern.

Aspect 25: The apparatus of aspect 24, where to output the at least one control message, the first interface is further configured to: output the at least one control message indicating the hopping pattern includes a first hopping pattern that that indicates to hop to the first frequency hop during each of the set of multiple measurement windows, and the random hopping pattern or the pseudo random hopping pattern that indicates to randomly hop or pseudo randomly hop for hops outside of the set of multiple measurement windows.

Aspect 26: The apparatus of any of aspects 19 through 21, where the first interface is further configured to: output the first SSB within the first frequency hop during a second measurement window of the set of multiple measurement windows, where at least the first measurement window and the second measurement window occur within a duration of the first frequency hop; and transmit a second SSB of the set of multiple SSBs within a second frequency hop of the set of multiple frequency hops during a third measurement window and a fourth measurement window of the set of multiple measurement windows, where at least the third measurement window and the fourth measurement window occur within a duration of the second frequency hop.

Aspect 27: A method for wireless communication at a UE, including: receiving: at least one control message indicating an active BWP for the UE, a set of multiple measurement windows, a hopping pattern associated with the active BWP, and a set of multiple SSBs occurring within a set of multiple frequency hops of the hopping pattern; performing measurement on a first SSB of the set of multiple SSBs within a first frequency hop of the set of multiple frequency hops during a first measurement window of the set of multiple measurement windows; and transmitting a measurement report associated with the measurement of the first SSB.

Aspect 28: The method of aspect 27, where receiving the at least one control message includes: receiving the at least one control message indicating that the set of multiple frequency hops occur within a bandwidth of the active BWP.

Aspect 29: The method of any of aspect 27, where receiving the at least one control message includes: receiving the at least one control message indicating that the active BWP includes the first frequency hop in which the first SSB is scheduled.

Aspect 30: The method of any of aspects 27 through 29, where receiving the at least one control message includes: receiving the at least one control message scheduling each SSB of the set of multiple SSBs within a different frequency hop of the hopping pattern that each occur within a respective measurement window of the set of multiple measurement windows.

Aspect 31: The method of any of aspects 27 through 29, further including: performing measurements on each SSB of the set of multiple SSBs at each occurrence of the first frequency hop within the hopping pattern during each measurement window of the set of multiple measurement windows, where the hopping pattern includes a periodic hopping pattern.

Aspect 32: The method of any of aspects 27 through 29, further including: performing measurements on each SSB of the set of multiple SSBs at each occurrence of the first frequency hop within the hopping pattern during each measurement window of the set of multiple measurement windows, where the hopping pattern includes a random hopping pattern or a pseudo random hopping pattern.

Aspect 33: The method of aspect 32, where receiving the at least one control message includes: receiving the at least one control message indicating the hopping pattern that includes a first hopping pattern that indicates to hop to the first frequency hop during each of the set of multiple measurement windows, and the random hopping pattern or the pseudo random hopping pattern that indicates to randomly hop or pseudo randomly hop for hops outside of the set of multiple measurement windows.

Aspect 34: The method of any of aspects 27 through 29, further including: performing measurement on the first SSB within the first frequency hop during a second measurement window of the set of multiple measurement windows, where at least the first measurement window and the second measurement window occur within a duration of the first frequency hop; and performing measurement on a second SSB of the set of multiple SSBs within a second frequency hop of the set of multiple frequency hops during a third measurement window and a fourth measurement window of the set of multiple measurement windows, where at least the third measurement window and the fourth measurement window occur within a duration of the second frequency hop.

Aspect 35: The method of any of aspects 27 through 34, where the at least one control message indicates a QCL relationship between the set of multiple SSBs.

Aspect 36: The method of any of aspects 27 through 35, where each frequency hop of the hopping pattern is aligned with a beginning boundary, or an ending boundary, or both of a respective measurement window of the set of multiple measurement windows.

Aspect 37: The method of any of aspects 27 through 35, further including: performing measurement on the first SSB within the first frequency hop having a duration that is extended to an ending boundary of the first measurement window based on at least a portion of the first SSB being scheduled outside of an initial duration of the first frequency hop, where an ending boundary of the initial duration of the first frequency hop occurs prior to the ending boundary of the first measurement window in time, and where the extended duration of the first frequency hop is greater than or equal to a duration of the first measurement window.

Aspect 38: The method of any of aspects 27 through 35, further including: performing measurement on the first SSB within the first frequency hop having a duration that is extended to an ending boundary of a second frequency hop of the set of multiple frequency hops that is subsequent to the first frequency hop in the hopping pattern based on at least a portion of the first SSB being scheduled outside of an initial duration of the first frequency hop, where the extended duration of the first frequency hop is greater than or equal to a duration of the first measurement window.

Aspect 39: The method of any of aspects 27 through 35, further including: performing measurement on the first SSB within the first frequency hop having a duration that is extended to a beginning boundary of the first measurement window based on at least a portion of the first SSB being scheduled outside of an initial duration of the first frequency hop, where a beginning boundary of the initial duration of the first frequency hop occurs subsequent to the beginning boundary of the first measurement window in time, and where the extended duration of the first frequency hop is greater than or equal to a duration of the first measurement window.

Aspect 40: The method of any of aspects 27 through 35, further including: performing measurement on the first SSB within the first frequency hop having a duration that is extended to a beginning boundary of a second frequency hop of the set of multiple frequency hops that is prior to the first frequency hop in the hopping pattern based on at least a portion of the first SSB being scheduled outside of an initial duration of the first frequency hop, where the extended duration of the first frequency hop is greater than or equal to a duration of the first measurement window.

Aspect 41: The method of any of aspects 27 through 35, further including: performing measurement on the first SSB within the first frequency hop having a duration that is extended to an ending boundary of the first measurement window based on at least a portion of the first SSB being scheduled within an initial duration of the first frequency hop and the initial duration of the first frequency hop overlapping or aligning with a beginning boundary of the first measurement window, where the initial duration of the first frequency hop is less than a duration of the first measurement window.

Aspect 42: The method of any of aspects 27 through 35, further including: performing measurement on the first SSB within the first frequency hop having a duration that is extended to a beginning boundary of the first measurement window based on at least a portion of the first SSB being scheduled within an initial duration of the first frequency hop and the initial duration of the first frequency hop overlapping or aligning with an ending boundary of the first measurement window, where the initial duration of the first frequency hop is less than a duration of the first measurement window.

Aspect 43: The method of any of aspects 27 through 35, further including: performing measurement on the first SSB within the first frequency hop having a duration that is extended to a beginning boundary and an ending boundary of the first measurement window based on at least a portion of the first SSB being scheduled within a frequency including the first frequency hop, where an initial duration of the first frequency hop is less than a duration of the first measurement window.

Aspect 44: The method of any of aspects 27 through 43, further including: transmitting a UE capability report indicating support for a frequency hopping measurement configuration; and receiving the at least one control message indicating the set of multiple SSBs each scheduled within a respective frequency hop of the hopping pattern that each occur within a respective measurement window of the set of multiple measurement windows in accordance with the UE capability report.

Aspect 45: A method for wireless communication at a network entity, including: transmitting, to a UE: at least one control message indicating an active BWP for the UE, a set of multiple measurement windows, a hopping pattern associated with the active BWP, and a set of multiple SSBs respectively occurring within a set of multiple frequency hops of the hopping pattern; transmitting, to the UE, a first SSB of the set of multiple SSBs within a first frequency hop of the set of multiple frequency hops during a first measurement window of the set of multiple measurement windows; and receiving, from the UE, a measurement report associated with the transmitting of the first SSB.

Aspect 46: The method of aspect 45, where transmitting the at least one control message includes: transmitting the at least one control message indicating that the set of multiple frequency hops occur within a bandwidth of the active BWP.

Aspect 47: The method of aspect 45, where transmitting the at least one control message includes: transmitting the at least one control message indicating that the active BWP includes the first frequency hop in which the first SSB is scheduled.

Aspect 48: The method of any of aspects 45 through 47, where transmitting the at least one control message includes: transmitting the at least one control message scheduling each SSB of the set of multiple SSBs within a different frequency hop of the hopping pattern that each occur within a respective measurement window of the set of multiple measurement windows.

Aspect 49: The method of any of aspects 45 through 4748, further including: transmitting each SSB of the set of multiple SSBs at each occurrence of the first frequency hop within the hopping pattern during each measurement window of the set of multiple measurement windows, where the hopping pattern includes a periodic hopping pattern.

Aspect 50: The method of any of aspects 45 through 47, further including: transmitting each SSB of the set of multiple SSBs at each occurrence of the first frequency hop within the hopping pattern during each measurement window of the set of multiple measurement windows, where the hopping pattern includes a random hopping pattern or a pseudo random hopping pattern.

Aspect 51: The method of aspect 50, where transmitting the at least one control message includes: transmitting the at least one control message indicating the hopping pattern includes a first hopping pattern that that indicates to hop to the first frequency hop during each of the set of multiple measurement windows, and the random hopping pattern or the pseudo random hopping pattern that indicates to randomly hop or pseudo randomly hop for hops outside of the set of multiple measurement windows.

Aspect 52: The method of any of aspects 45 through 47, further including: transmitting the first SSB within the first frequency hop during a second measurement window of the set of multiple measurement windows, where at least the first measurement window and the second measurement window occur within a duration of the first frequency hop; and transmitting a second SSB of the set of multiple SSBs within a second frequency hop of the set of multiple frequency hops during a third measurement window and a fourth measurement window of the set of multiple measurement windows, where at least the third measurement window and the fourth measurement window occur within a duration of the second frequency hop.

Aspect 53: An apparatus for wireless communication at a UE, including: means for receiving: means for at least one control message indicating an active BWP for the UE, means for a set of multiple measurement windows, means for a hopping pattern associated with the active BWP, and means for a set of multiple SSBs occurring within a set of multiple frequency hops of the hopping pattern; means for performing measurement on a first SSB of the set of multiple SSBs within a first frequency hop of the set of multiple frequency hops during a first measurement window of the set of multiple measurement windows; and means for transmitting a measurement report associated with the measurement of the first SSB.

Aspect 54: The apparatus of aspect 53, where the means for receiving the at least one control message include: means for receiving the at least one control message indicating that the set of multiple frequency hops occur within a bandwidth of the active BWP.

Aspect 55: The apparatus of aspect 53, where the means for receiving the at least one control message include: means for receiving the at least one control message indicating that the active BWP includes the first frequency hop in which the first SSB is scheduled.

Aspect 56: The apparatus of any of aspects 53 through 55, where the means for receiving the at least one control message include: means for receiving the at least one control message scheduling each SSB of the set of multiple SSBs within a different frequency hop of the hopping pattern that each occur within a respective measurement window of the set of multiple measurement windows.

Aspect 57: The apparatus of any of aspects 53 through 55, further including: means for performing measurements on each SSB of the set of multiple SSBs at each occurrence of the first frequency hop within the hopping pattern during each measurement window of the set of multiple measurement windows, where the hopping pattern includes a periodic hopping pattern.

Aspect 58: The apparatus of any of aspects 53 through 55, further including: means for performing measurements on each SSB of the set of multiple SSBs at each occurrence of the first frequency hop within the hopping pattern during each measurement window of the set of multiple measurement windows, where the hopping pattern includes a random hopping pattern or a pseudo random hopping pattern.

Aspect 59: The apparatus of aspect 58, where the means for receiving the at least one control message include: means for receiving the at least one control message indicating the hopping pattern that includes a first hopping pattern that indicates to hop to the first frequency hop during each of the set of multiple measurement windows, and the random hopping pattern or the pseudo random hopping pattern that indicates to randomly hop or pseudo randomly hop for hops outside of the set of multiple measurement windows.

Aspect 60: The apparatus of any of aspects 53 through 55, further including: means for performing measurement on the first SSB within the first frequency hop during a second measurement window of the set of multiple measurement windows, where at least the first measurement window and the second measurement window occur within a duration of the first frequency hop; and means for performing measurement on a second SSB of the set of multiple SSBs within a second frequency hop of the set of multiple frequency hops during a third measurement window and a fourth measurement window of the set of multiple measurement windows, where at least the third measurement window and the fourth measurement window occur within a duration of the second frequency hop.

Aspect 61: The apparatus of any of aspects 53 through 60, where the at least one control message indicates a QCL relationship between the set of multiple SSBs.

Aspect 62: The apparatus of any of aspects 53 through 61, where each frequency hop of the hopping pattern is aligned with a beginning boundary, or an ending boundary, or both of a respective measurement window of the set of multiple measurement windows.

Aspect 63: The apparatus of any of aspects 53 through 61, further including: means for performing measurement on the first SSB within the first frequency hop having a duration that is extended to an ending boundary of the first measurement window based on at least a portion of the first SSB being scheduled outside of an initial duration of the first frequency hop, where an ending boundary of the initial duration of the first frequency hop occurs prior to the ending boundary of the first measurement window in time, and where the extended duration of the first frequency hop is greater than or equal to a duration of the first measurement window.

Aspect 64: The apparatus of any of aspects 53 through 61, further including: means for performing measurement on the first SSB within the first frequency hop having a duration that is extended to an ending boundary of a second frequency hop of the set of multiple frequency hops that is subsequent to the first frequency hop in the hopping pattern based on at least a portion of the first SSB being scheduled outside of an initial duration of the first frequency hop, where the extended duration of the first frequency hop is greater than or equal to a duration of the first measurement window.

Aspect 65: The apparatus of any of aspects 53 through 61, further including: means for performing measurement on the first SSB within the first frequency hop having a duration that is extended to a beginning boundary of the first measurement window based on at least a portion of the first SSB being scheduled outside of an initial duration of the first frequency hop, where a beginning boundary of the initial duration of the first frequency hop occurs subsequent to the beginning boundary of the first measurement window in time, and where the extended duration of the first frequency hop is greater than or equal to a duration of the first measurement window.

Aspect 66: The apparatus of any of aspects 53 through 61, further including: means for performing measurement on the first SSB within the first frequency hop having a duration that is extended to a beginning boundary of a second frequency hop of the set of multiple frequency hops that is prior to the first frequency hop in the hopping pattern based on at least a portion of the first SSB being scheduled outside of an initial duration of the first frequency hop, where the extended duration of the first frequency hop is greater than or equal to a duration of the first measurement window.

Aspect 67: The apparatus of any of aspects 53 through 61, further including: means for performing measurement on the first SSB within the first frequency hop having a duration that is extended to an ending boundary of the first measurement window based on at least a portion of the first SSB being scheduled within an initial duration of the first frequency hop and the initial duration of the first frequency hop overlapping or aligning with a beginning boundary of the first measurement window, where the initial duration of the first frequency hop is less than a duration of the first measurement window.

Aspect 68: The apparatus of any of aspects 53 through 61, further including: means for performing measurement on the first SSB within the first frequency hop having a duration that is extended to a beginning boundary of the first measurement window based on at least a portion of the first SSB being scheduled within an initial duration of the first frequency hop and the initial duration of the first frequency hop overlapping or aligning with an ending boundary of the first measurement window, where the initial duration of the first frequency hop is less than a duration of the first measurement window.

Aspect 69: The apparatus of any of aspects 53 through 61, further including: means for performing measurement on the first SSB within the first frequency hop having a duration that is extended to a beginning boundary and an ending boundary of the first measurement window based on at least a portion of the first SSB being scheduled within a frequency including the first frequency hop, where an initial duration of the first frequency hop is less than a duration of the first measurement window.

Aspect 70: The apparatus of any of aspects 53 through 69, further including: means for transmitting a UE capability report indicating support for a frequency hopping measurement configuration; and means for receiving the at least one control message indicating the set of multiple SSBs each scheduled within a respective frequency hop of the hopping pattern that each occur within a respective measurement window of the set of multiple measurement windows in accordance with the UE capability report.

Aspect 71: An apparatus for wireless communication at a network entity, including: means for transmitting, to a UE: means for at least one control message indicating an active BWP for the UE, means for a set of multiple measurement windows, means for a hopping pattern associated with the active BWP, and means for a set of multiple SSBs respectively occurring within a set of multiple frequency hops of the hopping pattern; means for transmitting, to the UE, a first SSB of the set of multiple SSBs within a first frequency hop of the set of multiple frequency hops during a first measurement window of the set of multiple measurement windows; and means for receiving, from the UE, a measurement report associated with the transmitting of the first SSB.

Aspect 72: The apparatus of aspect 71, where the means for transmitting the at least one control message include: means for transmitting the at least one control message indicating that the set of multiple frequency hops occur within a bandwidth of the active BWP.

Aspect 73: The apparatus of aspect 71, where the means for transmitting the at least one control message include: means for transmitting the at least one control message indicating that the active BWP includes the first frequency hop in which the first SSB is scheduled.

Aspect 74: The apparatus of any of aspects 71 through 73, where the means for transmitting the at least one control message include: means for transmitting the at least one control message scheduling each SSB of the set of multiple SSBs within a different frequency hop of the hopping pattern that each occur within a respective measurement window of the set of multiple measurement windows.

Aspect 75: The apparatus of any of aspects 71 through 73, further including: means for transmitting each SSB of the set of multiple SSBs at each occurrence of the first frequency hop within the hopping pattern during each measurement window of the set of multiple measurement windows, where the hopping pattern includes a periodic hopping pattern.

Aspect 76: The apparatus of any of aspects 71 through 73, further including: means for transmitting each SSB of the set of multiple SSBs at each occurrence of the first frequency hop within the hopping pattern during each measurement window of the set of multiple measurement windows, where the hopping pattern includes a random hopping pattern or a pseudo random hopping pattern.

Aspect 77: The apparatus of aspect 76, where the means for transmitting the at least one control message include: means for transmitting the at least one control message indicating the hopping pattern includes a first hopping pattern that that indicates to hop to the first frequency hop during each of the set of multiple measurement windows, and the random hopping pattern or the pseudo random hopping pattern that indicates to randomly hop or pseudo randomly hop for hops outside of the set of multiple measurement windows.

Aspect 78: The apparatus of any of aspects 71 through 73, further including: means for transmitting the first SSB within the first frequency hop during a second measurement window of the set of multiple measurement windows, where at least the first measurement window and the second measurement window occur within a duration of the first frequency hop; and means for transmitting a second SSB of the set of multiple SSBs within a second frequency hop of the set of multiple frequency hops during a third measurement window and a fourth measurement window of the set of multiple measurement windows, where at least the third measurement window and the fourth measurement window occur within a duration of the second frequency hop.

Aspect 79: A non-transitory computer-readable medium storing code for wireless communication at a UE, the code including instructions executable by a processor to: receive: at least one control message indicate an active BWP for the UE, a set of multiple measurement windows, a hop pattern associated with the active BWP, and a set of multiple SSBs occur within a set of multiple frequency hops of the hopping pattern; perform measurement on a first SSB of the set of multiple SSBs within a first frequency hop of the set of multiple frequency hops during a first measurement window of the set of multiple measurement windows; and transmit a measurement report associated with the measurement of the first SSB.

Aspect 80: The non-transitory computer-readable medium of aspect 79, where the instructions to receive the at least one control message are executable by the processor to: receive the at least one control message indicating that the set of multiple frequency hops occur within a bandwidth of the active BWP.

Aspect 81: The non-transitory computer-readable medium of aspect 79, where the instructions to receive the at least one control message are executable by the processor to: receive the at least one control message indicating that the active BWP includes the first frequency hop in which the first SSB is scheduled.

Aspect 82: The non-transitory computer-readable medium of any of aspects 79 through 81, where the instructions to receive the at least one control message are executable by the processor to: receive the at least one control message scheduling each SSB of the set of multiple SSBs within a different frequency hop of the hopping pattern that each occur within a respective measurement window of the set of multiple measurement windows.

Aspect 83: The non-transitory computer-readable medium of any of aspects 79 through 81, where the instructions are further executable by the processor to: perform measurements on each SSB of the set of multiple SSBs at each occurrence of the first frequency hop within the hopping pattern during each measurement window of the set of multiple measurement windows, where the hopping pattern includes a periodic hopping pattern.

Aspect 84: The non-transitory computer-readable medium of any of aspects 79 through 83, where the instructions are further executable by the processor to: perform measurements on each SSB of the set of multiple SSBs at each occurrence of the first frequency hop within the hopping pattern during each measurement window of the set of multiple measurement windows, where the hopping pattern includes a random hopping pattern or a pseudo random hopping pattern.

Aspect 85: The non-transitory computer-readable medium of aspect 84, where the instructions to receive the at least one control message are executable by the processor to: receive the at least one control message indicating the hopping pattern that includes a first hopping pattern that indicates to hop to the first frequency hop during each of the set of multiple measurement windows, and the random hopping pattern or the pseudo random hopping pattern that indicates to randomly hop or pseudo randomly hop for hops outside of the set of multiple measurement windows.

Aspect 86: The non-transitory computer-readable medium of any of aspects 79 through 81, where the instructions are further executable by the processor to: perform measurement on the first SSB within the first frequency hop during a second measurement window of the set of multiple measurement windows, where at least the first measurement window and the second measurement window occur within a duration of the first frequency hop; and perform measurement on a second SSB of the set of multiple SSBs within a second frequency hop of the set of multiple frequency hops during a third measurement window and a fourth measurement window of the set of multiple measurement windows, where at least the third measurement window and the fourth measurement window occur within a duration of the second frequency hop.

Aspect 87: The non-transitory computer-readable medium of any of aspects 79 through 86, where the at least one control message indicates a QCL relationship between the set of multiple SSBs.

Aspect 88: The non-transitory computer-readable medium of any of aspects 79 through 87, where each frequency hop of the hopping pattern is aligned with a beginning boundary, or an ending boundary, or both of a respective measurement window of the set of multiple measurement windows.

Aspect 89: The non-transitory computer-readable medium of any of aspects 79 through 87, where the instructions are further executable by the processor to: perform measurement on the first SSB within the first frequency hop having a duration that is extended to an ending boundary of the first measurement window based on at least a portion of the first SSB being scheduled outside of an initial duration of the first frequency hop, where an ending boundary of the initial duration of the first frequency hop occurs prior to the ending boundary of the first measurement window in time, and where the extended duration of the first frequency hop is greater than or equal to a duration of the first measurement window.

Aspect 90: The non-transitory computer-readable medium of any of aspects 79 through 87, where the instructions are further executable by the processor to: perform measurement on the first SSB within the first frequency hop having a duration that is extended to an ending boundary of a second frequency hop of the set of multiple frequency hops that is subsequent to the first frequency hop in the hopping pattern based on at least a portion of the first SSB being scheduled outside of an initial duration of the first frequency hop, where the extended duration of the first frequency hop is greater than or equal to a duration of the first measurement window.

Aspect 91: The non-transitory computer-readable medium of any of aspects 79 through 87, where the instructions are further executable by the processor to: perform measurement on the first SSB within the first frequency hop having a duration that is extended to a beginning boundary of the first measurement window based on at least a portion of the first SSB being scheduled outside of an initial duration of the first frequency hop, where a beginning boundary of the initial duration of the first frequency hop occurs subsequent to the beginning boundary of the first measurement window in time, and where the extended duration of the first frequency hop is greater than or equal to a duration of the first measurement window.

Aspect 92: The non-transitory computer-readable medium of any of aspects 79 through 87, where the instructions are further executable by the processor to: perform measurement on the first SSB within the first frequency hop having a duration that is extended to a beginning boundary of a second frequency hop of the set of multiple frequency hops that is prior to the first frequency hop in the hopping pattern based on at least a portion of the first SSB being scheduled outside of an initial duration of the first frequency hop, where the extended duration of the first frequency hop is greater than or equal to a duration of the first measurement window.

Aspect 93: The non-transitory computer-readable medium of any of aspects 79 through 87, where the instructions are further executable by the processor to: perform measurement on the first SSB within the first frequency hop having a duration that is extended to an ending boundary of the first measurement window based on at least a portion of the first SSB being scheduled within an initial duration of the first frequency hop and the initial duration of the first frequency hop overlapping or aligning with a beginning boundary of the first measurement window, where the initial duration of the first frequency hop is less than a duration of the first measurement window.

Aspect 94: The non-transitory computer-readable medium of any of aspects 79 through 87, where the instructions are further executable by the processor to: perform measurement on the first SSB within the first frequency hop having a duration that is extended to a beginning boundary of the first measurement window based on at least a portion of the first SSB being scheduled within an initial duration of the first frequency hop and the initial duration of the first frequency hop overlapping or aligning with an ending boundary of the first measurement window, where the initial duration of the first frequency hop is less than a duration of the first measurement window.

Aspect 95: The non-transitory computer-readable medium of any of aspects 79 through 87, where the instructions are further executable by the processor to: perform measurement on the first SSB within the first frequency hop having a duration that is extended to a beginning boundary and an ending boundary of the first measurement window based on at least a portion of the first SSB being scheduled within a frequency including the first frequency hop, where an initial duration of the first frequency hop is less than a duration of the first measurement window.

Aspect 96: The non-transitory computer-readable medium of any of aspects 79 through 95, where the instructions are further executable by the processor to: transmit a UE capability report indicating support for a frequency hopping measurement configuration; and receive the at least one control message indicating the set of multiple SSBs each scheduled within a respective frequency hop of the hopping pattern that each occur within a respective measurement window of the set of multiple measurement windows in accordance with the UE capability report.

Aspect 97: A non-transitory computer-readable medium storing code for wireless communication at a network entity, the code including instructions executable by a processor to: transmit, to a UE: at least one control message indicate an active BWP for the UE, a set of multiple measurement windows, a hop pattern associated with the active BWP, and a set of multiple SSBs respectively occur within a set of multiple frequency hops of the hopping pattern; transmit, to the UE, a first SSB of the set of multiple SSBs within a first frequency hop of the set of multiple frequency hops during a first measurement window of the set of multiple measurement windows; and receive, from the UE, a measurement report associated with the transmitting of the first SSB.

Aspect 98: The non-transitory computer-readable medium of aspect 97, where the instructions to transmit the at least one control message are executable by the processor to: transmit the at least one control message indicating that the set of multiple frequency hops occur within a bandwidth of the active BWP.

Aspect 99: The non-transitory computer-readable medium of aspect 97, where the instructions to transmit the at least one control message are executable by the processor to: transmit the at least one control message indicating that the active BWP includes the first frequency hop in which the first SSB is scheduled.

Aspect 100: The non-transitory computer-readable medium of any of aspects 97 through 99, where the instructions to transmit the at least one control message are executable by the processor to: transmit the at least one control message scheduling each SSB of the set of multiple SSBs within a different frequency hop of the hopping pattern that each occur within a respective measurement window of the set of multiple measurement windows.

Aspect 101: The non-transitory computer-readable medium of any of aspects 97 through 99, where the instructions are further executable by the processor to: transmit each SSB of the set of multiple SSBs at each occurrence of the first frequency hop within the hopping pattern during each measurement window of the set of multiple measurement windows, where the hopping pattern includes a periodic hopping pattern.

Aspect 102: The non-transitory computer-readable medium of any of aspects 97 through 99, where the instructions are further executable by the processor to: transmit each SSB of the set of multiple SSBs at each occurrence of the first frequency hop within the hopping pattern during each measurement window of the set of multiple measurement windows, where the hopping pattern includes a random hopping pattern or a pseudo random hopping pattern.

Aspect 103: The non-transitory computer-readable medium of aspect 102, where the instructions to transmit the at least one control message are executable by the processor to: transmit the at least one control message indicating the hopping pattern includes a first hopping pattern that that indicates to hop to the first frequency hop during each of the set of multiple measurement windows, and the random hopping pattern or the pseudo random hopping pattern that indicates to randomly hop or pseudo randomly hop for hops outside of the set of multiple measurement windows.

Aspect 104: The non-transitory computer-readable medium of any of aspects 97 through 99, where the instructions are further executable by the processor to: transmit the first SSB within the first frequency hop during a second measurement window of the set of multiple measurement windows, where at least the first measurement window and the second measurement window occur within a duration of the first frequency hop; and transmit a second SSB of the set of multiple SSBs within a second frequency hop of the set of multiple frequency hops during a third measurement window and a fourth measurement window of the set of multiple measurement windows, where at least the third measurement window and the fourth measurement window occur within a duration of the second frequency hop.

As used herein, the term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, or any processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, such as one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in some combinations and even initially claimed as such, one or more features from a claimed combination can be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some implementations, the actions recited in the claims can be performed in a different order and still achieve desirable results.

What is claimed is:

1. An apparatus for wireless communications at a user equipment (UE), comprising:
    a first interface configured to:
        obtain at least one control message indicating an active bandwidth part (BWP) for the UE, a plurality of measurement windows, a hopping pattern associated with the active BWP, and a plurality of synchronization signal blocks (SSBs) occurring within a plurality of frequency hops of the hopping pattern, each frequency hop of the hopping pattern aligned with a beginning boundary, or an ending boundary, or both of a respective measurement window of the plurality of measurement windows;
    a processing system configured to:
        perform measurement on a first SSB of the plurality of SSBs within a first frequency hop of the plurality of frequency hops during a first measurement window of the plurality of measurement windows; and
    the first interface or a second interface configured to:
        output a measurement report associated with the measurement of the first SSB.

2. The apparatus of claim 1, wherein to obtain the at least one control message, the first interface is further configured to:
    obtain the at least one control message indicating that the plurality of frequency hops occur within a bandwidth of the active BWP.

3. The apparatus of claim 1, wherein to obtain the at least one control message, the first interface is further configured to:
    obtain the at least one control message indicating that the active BWP comprises the first frequency hop in which the first SSB is scheduled.

4. The apparatus of claim 1, wherein to obtain the at least one control message, the first interface is further configured to:
    obtain the at least one control message scheduling each SSB of the plurality of SSBs within a different frequency hop of the hopping pattern that each occur within a respective measurement window of the plurality of measurement windows.

5. The apparatus of claim 1, wherein the processing system is further configured to:
perform measurements on each SSB of the plurality of SSBs at each occurrence of the first frequency hop within the hopping pattern during each measurement window of the plurality of measurement windows, wherein the hopping pattern comprises a periodic hopping pattern.

6. The apparatus of claim 1, wherein the processing system is further configured to:
perform measurements on each SSB of the plurality of SSBs at each occurrence of the first frequency hop within the hopping pattern during each measurement window of the plurality of measurement windows, wherein the hopping pattern comprises a random hopping pattern or a pseudo random hopping pattern, and wherein to obtain the at least one control message, the first interface is further configured to:
obtain the at least one control message indicating the hopping pattern that comprises a first hopping pattern that indicates to hop to the first frequency hop during each of the plurality of measurement windows, and the random hopping pattern or the pseudo random hopping pattern that indicates to randomly hop or pseudo randomly hop for hops outside of the plurality of measurement windows.

7. The apparatus of claim 1, wherein the processing system is further configured to:
perform measurement on the first SSB within the first frequency hop during a second measurement window of the plurality of measurement windows, wherein at least the first measurement window and the second measurement window occur within a duration of the first frequency hop; and
perform measurement on a second SSB of the plurality of SSBs within a second frequency hop of the plurality of frequency hops during a third measurement window and a fourth measurement window of the plurality of measurement windows, wherein at least the third measurement window and the fourth measurement window occur within a duration of the second frequency hop.

8. The apparatus of claim 1, wherein the at least one control message indicates a quasi-colocation (QCL) relationship between the plurality of SSBs.

9. The apparatus of claim 1, wherein the processing system is further configured to:
perform measurement on the first SSB within the first frequency hop having a duration that is extended to an ending boundary of the first measurement window based at least in part on at least a portion of the first SSB being scheduled outside of an initial duration of the first frequency hop, wherein an ending boundary of the initial duration of the first frequency hop occurs prior to the ending boundary of the first measurement window in time, and wherein the extended duration of the first frequency hop is greater than or equal to a duration of the first measurement window.

10. The apparatus of claim 1, wherein the processing system is further configured to:
perform measurement on the first SSB within the first frequency hop having a duration that is extended to an ending boundary of a second frequency hop of the plurality of frequency hops that is subsequent to the first frequency hop in the hopping pattern based at least in part on at least a portion of the first SSB being scheduled outside of an initial duration of the first frequency hop, wherein the extended duration of the first frequency hop is greater than or equal to a duration of the first measurement window.

11. The apparatus of claim 1, wherein the processing system is further configured to:
perform measurement on the first SSB within the first frequency hop having a duration that is extended to a beginning boundary of the first measurement window based at least in part on at least a portion of the first SSB being scheduled outside of an initial duration of the first frequency hop, wherein a beginning boundary of the initial duration of the first frequency hop occurs subsequent to the beginning boundary of the first measurement window in time, and wherein the extended duration of the first frequency hop is greater than or equal to a duration of the first measurement window.

12. The apparatus of claim 1, wherein the processing system is further configured to:
perform measurement on the first SSB within the first frequency hop having a duration that is extended to a beginning boundary of a second frequency hop of the plurality of frequency hops that is prior to the first frequency hop in the hopping pattern based at least in part on at least a portion of the first SSB being scheduled outside of an initial duration of the first frequency hop, wherein the extended duration of the first frequency hop is greater than or equal to a duration of the first measurement window.

13. The apparatus of claim 1, wherein the processing system is further configured to:
perform measurement on the first SSB within the first frequency hop having a duration that is extended to an ending boundary of the first measurement window based at least in part on at least a portion of the first SSB being scheduled within an initial duration of the first frequency hop and the initial duration of the first frequency hop overlapping or aligning with a beginning boundary of the first measurement window, wherein the initial duration of the first frequency hop is less than a duration of the first measurement window.

14. The apparatus of claim 1, wherein the processing system is further configured to:
perform measurement on the first SSB within the first frequency hop having a duration that is extended to a beginning boundary of the first measurement window based at least in part on at least a portion of the first SSB being scheduled within an initial duration of the first frequency hop and the initial duration of the first frequency hop overlapping or aligning with an ending boundary of the first measurement window, wherein the initial duration of the first frequency hop is less than a duration of the first measurement window.

15. The apparatus of claim 1, wherein the processing system is further configured to:
perform measurement on the first SSB within the first frequency hop having a duration that is extended to a beginning boundary and an ending boundary of the first measurement window based at least in part on at least a portion of the first SSB being scheduled within a frequency comprising the first frequency hop, wherein an initial duration of the first frequency hop is less than a duration of the first measurement window.

16. The apparatus of claim 1, wherein the first interface or the second interface is further configured to:
output a UE capability report indicating support for a frequency hopping measurement configuration; and obtain the at least one control message indicating the plurality of SSBs each scheduled within a respective frequency hop of the hopping pattern that each occur within a respective measurement window of the plurality of measurement windows in accordance with the UE capability report.

17. An apparatus for wireless communications at a network entity, comprising:
a first interface configured to:
output, to a user equipment (UE), at least one control message indicating an active bandwidth part (BWP) for the UE, a plurality of measurement windows, a hopping pattern associated with the active BWP, and a plurality of synchronization signal blocks (SSBs) respectively occurring within a plurality of frequency hops of the hopping pattern, each frequency hop of the hopping pattern aligned with a beginning boundary, or an ending boundary, or both of a respective measurement window of the plurality of measurement windows;
output, to the UE, a first SSB of the plurality of SSBs within a first frequency hop of the plurality of frequency hops during a first measurement window of the plurality of measurement windows; and
the first interface or a second interface configured to:
obtain, from the UE, a measurement report associated with the transmitting of the first SSB.

18. The apparatus of claim 17, wherein to output the at least one control message, the first interface is further configured to:
output the at least one control message indicating that the plurality of frequency hops occur within a bandwidth of the active BWP.

19. The apparatus of claim 17, wherein to output the at least one control message, the first interface is further configured to:
output the at least one control message indicating that the active BWP comprises the first frequency hop in which the first SSB is scheduled.

20. The apparatus of claim 17, wherein to output the at least one control message, the first interface is further configured to:
output the at least one control message scheduling each SSB of the plurality of SSBs within a different frequency hop of the hopping pattern that each occur within a respective measurement window of the plurality of measurement windows.

21. The apparatus of claim 17, wherein the first interface is further configured to:
output each SSB of the plurality of SSBs at each occurrence of the first frequency hop within the hopping pattern during each measurement window of the plurality of measurement windows, wherein the hopping pattern comprises a periodic hopping pattern.

22. A method for wireless communication at a user equipment (UE), comprising:
receiving:
at least one control message indicating an active bandwidth part (BWP) for the UE,
a plurality of measurement windows,
a hopping pattern associated with the active BWP, each frequency hop of the hopping pattern aligned with a beginning boundary, or an ending boundary, or both of a respective measurement window of the plurality of measurement windows, and
a plurality of synchronization signal blocks (SSBs) occurring within a plurality of frequency hops of the hopping pattern;
performing measurement on a first SSB of the plurality of SSBs within a first frequency hop of the plurality of frequency hops during a first measurement window of the plurality of measurement windows; and
transmitting a measurement report associated with the measurement of the first SSB.

23. The method of claim 22, wherein receiving the at least one control message comprises:
receiving the at least one control message indicating that the plurality of frequency hops occur within a bandwidth of the active BWP.

24. The method of claim 22, wherein receiving the at least one control message comprises:
receiving the at least one control message indicating that the active BWP comprises the first frequency hop in which the first SSB is scheduled.

25. The method of claim 22, wherein receiving the at least one control message comprises:
receiving the at least one control message scheduling each SSB of the plurality of SSBs within a different frequency hop of the hopping pattern that each occur within a respective measurement window of the plurality of measurement windows.

26. A method for wireless communication at a network entity, comprising:
transmitting, to a user equipment (UE):
at least one control message indicating an active bandwidth part (BWP) for the UE,
a plurality of measurement windows,
a hopping pattern associated with the active BWP, each frequency hop of the hopping pattern aligned with a beginning boundary, or an ending boundary, or both of a respective measurement window of the plurality of measurement windows, and
a plurality of synchronization signal blocks (SSBs) respectively occurring within a plurality of frequency hops of the hopping pattern;
transmitting, to the UE, a first SSB of the plurality of SSBs within a first frequency hop of the plurality of frequency hops during a first measurement window of the plurality of measurement windows; and
receiving, from the UE, a measurement report associated with the transmitting of the first SSB.

27. The method of claim 26, wherein transmitting the at least one control message comprises:
transmitting the at least one control message indicating that the plurality of frequency hops occur within a bandwidth of the active BWP.

28. The method of claim 26, wherein transmitting the at least one control message comprises:
transmitting the at least one control message indicating that the active BWP comprises the first frequency hop in which the first SSB is scheduled.

29. The method of claim 26, wherein transmitting the at least one control message comprises:
transmitting the at least one control message scheduling each SSB of the plurality of SSBs within a different frequency hop of the hopping pattern that each occur within a respective measurement window of the plurality of measurement windows.

* * * * *